United States Patent
Morimoto et al.

(10) Patent No.: US 12,336,445 B2
(45) Date of Patent: Jun. 24, 2025

(54) AGRICULTURAL MACHINE AND AGRICULTURAL ASSISTANCE SYSTEM

(71) Applicant: KUBOTA CORPORATION, Osaka (JP)

(72) Inventors: Takanori Morimoto, Sakai (JP); Kotaro Yamaguchi, Sakai (JP); Ryota Kikuchi, Sakai (JP); Kuya Kaihori, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 273 days.

(21) Appl. No.: 18/075,455

(22) Filed: Dec. 6, 2022

(65) Prior Publication Data

US 2023/0200284 A1 Jun. 29, 2023

(30) Foreign Application Priority Data

Dec. 28, 2021 (JP) .................................. 2021-214365

(51) Int. Cl.
- *A01B 69/04* (2006.01)
- *A01B 63/111* (2006.01)
- *G05D 1/00* (2006.01)

(52) U.S. Cl.
CPC .......... *A01B 69/008* (2013.01); *A01B 63/111* (2013.01); *G05D 1/0219* (2013.01)

(58) Field of Classification Search
None
See application file for complete search history.

(56) References Cited

U.S. PATENT DOCUMENTS

| | | | |
|---|---|---|---|
| 2009/0082930 A1* | 3/2009 | Peters | G05B 13/00 701/50 |
| 2019/0261550 A1* | 8/2019 | Damme | B60W 50/00 |
| 2021/0146995 A1 | 5/2021 | Miyashita et al. | |

FOREIGN PATENT DOCUMENTS

| | | | | |
|---|---|---|---|---|
| GB | 2147783 A | * | 5/1985 | ........... A01B 33/085 |
| JP | 2002354905 A | * | 12/2002 | |

(Continued)

OTHER PUBLICATIONS

English Translation of JP-2002354905-A (wherein the paragraph numbering provided coincides with any relevant citations to this reference within the accompanying Office action) (Year: 2002).*

(Continued)

*Primary Examiner* — Thomas E Worden
*Assistant Examiner* — Bryant Tang
(74) *Attorney, Agent, or Firm* — Keating & Bennett, LLP

(57) ABSTRACT

An agricultural machine includes a traveling vehicle body, a position detector to detect a position of the traveling vehicle body, a lifting device to link a working device to the traveling vehicle body, and an automatic operation controller to perform an automatic operation to cause the traveling vehicle body to travel and cause the working device to perform an agricultural job based on a travel route and the position of the traveling vehicle body. The lifting device is operable to, during the automatic operation, place the working device in a work position in which the working device performs the agricultural job, and the automatic operation controller is operable to cause the lifting device to keep the working device in the work position even after stopping the traveling vehicle body and/or the working device to end the automatic operation at a location short of an unworked area of the agricultural field.

14 Claims, 38 Drawing Sheets

(56) References Cited

FOREIGN PATENT DOCUMENTS

| | | |
|---|---|---|
| JP | 5080855 B2 | 11/2012 |
| JP | 2017135995 A * | 8/2017 |
| JP | 2020-108378 A | 7/2020 |
| JP | 2021077190 A | 5/2021 |

OTHER PUBLICATIONS

English Translation of JP-2017135995-A (wherein the paragraph numbering provided coincides with any relevant citations to this reference within the accompanying Office action) (Year: 2017).*
NPL version of GB-2147783-A (wherein the paragraph numbering provided coincides with any relevant citations to this reference within the accompanying Office action) (Year: 1985).*
Official Communication issued in corresponding Japanese Patent Application No. 2021-214365, mailed on Jul. 9, 2024, 7 pages.
Official Communication issued in corresponding European Patent Application No. 22210503.3, mailed on Jun. 2, 2023.

* cited by examiner

<Agricultural job in known automatic operation is discontinued>

<Agricultural job is resumed by known manual operation>

<Agricultural job in automatic operation is discontinued>

<Agricultural job in automatic operation is completed>

AGRICULTURAL MACHINE AND AGRICULTURAL ASSISTANCE SYSTEM

CROSS REFERENCE TO RELATED APPLICATIONS

This application claims the benefit of priority to Japanese Patent Application No. 2021-214365 filed on Dec. 28, 2021. The entire contents of this application are hereby incorporated herein by reference.

BACKGROUND OF THE INVENTION

1. Field of the Invention

The present invention relates to an agricultural machine to perform an agricultural job while traveling in an agricultural field, and an agricultural assistance system to assist an agricultural job performed by the agricultural machine.

2. Description of the Related Art

Japanese Unexamined Patent Application Publication No. 2017-135995 discloses a technique to provide assistance in performing an agricultural job with a working device linked to an agricultural machine while causing the agricultural machine to travel in automatic operation over an agricultural field. The agricultural machine disclosed in Japanese Unexamined Patent Application Publication No. 2017-135995 includes a controller to cause the vehicle body of the agricultural machine to automatically travel (autonomously travel) along a work route created by a work route creator, and cause a working device (working machine) linked to the vehicle body to perform an agricultural job on a work area of the agricultural field. The controller calculates the position of a tine shaft of the working device during the travel of the vehicle body, and, once the position of the tine shaft has entered the work area of the agricultural field, causes a lifting device (lifting actuator) to lower the working device to place the working device in a work position in which the working device performs the agricultural job, and once the position of the tine shaft has entered a non-work area of the agricultural field, causes the lifting device to raise the working device to place the working device in a retracted position in which the working device does not perform the agricultural job.

SUMMARY OF THE INVENTION

In the central portion of the agricultural field, the agricultural machine travels in automatic operation to cause the working device to perform the agricultural job. In contrast, in a surrounding area of the central portion of the agricultural field, the agricultural machine is caused to travel by manual operation to cause the working device to perform the agricultural job in order to avoid the collision of the agricultural machine or the working device with a ridge or the like, in most instances. If the agricultural machine performs the agricultural job in automatic operation on the central portion of the agricultural field and then, upon completion of the automatic operation, the lifting device moves the working device to a position in which the working device is unable to perform the agricultural job as in Japanese Unexamined Patent Application Publication No. 2017-135995, the lifting device thereafter needs to move the working device to a position in which the working device is able to perform the agricultural job when the agricultural machine is caused to perform the agricultural job by manual operation on the surrounding area of the central portion of the agricultural field. This makes it impossible to immediately start the agricultural job by manually operating the agricultural machine, resulting in a reduction in work efficiency. Furthermore, in the case where the working device is of a type which contacts the soil in the agricultural field to perform an agricultural job, if the working device is separated from the soil and then contacts the soil, a mark is left on the soil, resulting in poor quality of the finished agricultural job. If the agricultural machine is manually operated to travel rearward and then travel forward and the working device resumes the agricultural job, the mark disappears but the number of steps of the manual operation increases, resulting in a reduction in work efficiency.

Preferred embodiments of the present invention provide improved work efficiency in cases where an agricultural machine automatically operates to cause a working device to perform an agricultural job in an agricultural field and thereafter the agricultural machine is manually operated to cause the working device to perform the agricultural job.

Preferred embodiments of the present invention are described below.

An agricultural machine according to an aspect of a preferred embodiment of the present invention includes a traveling vehicle body to travel, a position detector to detect a position of the traveling vehicle body, a lifting device to link a working device to the traveling vehicle body and to raise and lower the working device, and an automatic operation controller to perform an automatic operation to cause the traveling vehicle body to travel and cause the working device to perform an agricultural job on an agricultural field based on a prepared travel route and the position of the traveling vehicle body detected by the position detector, wherein the lifting device is operable to, during the automatic operation, place the working device in a heightwise work position in which the working device performs the agricultural job, and the automatic operation controller is configured or programmed to cause the lifting device to keep the working device in the work position even after stopping the traveling vehicle body and/or the working device to end the automatic operation at a location short of an unworked area of the agricultural field.

An agricultural assistance system according to an aspect of a preferred embodiment of the present invention includes a position detector to detect a position of an agricultural machine, a lifting device to link a working device to the agricultural machine and to raise and lower the working device, and an automatic operation controller to perform an automatic operation to cause the agricultural machine to travel and cause the working device to perform an agricultural job on an agricultural field based on a prepared travel route and the position of the agricultural machine detected by the position detector, wherein the lifting device is operable to, during the automatic operation, place the working device in a heightwise work position in which the working device performs the agricultural job, and the automatic operation controller is configured or programmed to cause the lifting device to keep the working device in the work position even after stopping the agricultural machine and/or the working device to end the automatic operation at a location short of an unworked area of the agricultural field.

In an aspect of a preferred embodiment of the present invention, the automatic operation controller may be configured or programmed to cause the lifting device to keep the working device in the work position even after stopping travel of the traveling vehicle body during the automatic operation to discontinue the automatic operation before the traveling vehicle body and the working device reach an end point of the travel route.

In an aspect of a preferred embodiment of the present invention, the travel route may include work route portions on which the working device performs the agricultural job during the travel of the traveling vehicle body. The automatic operation controller may be configured or programmed to, if a reference work route portion based on which the traveling vehicle body was traveling before the automatic operation was discontinued is the last one of the work route portions of the travel route, cause the lifting device to keep the working device in the work position even after discontinuing the automatic operation.

In an aspect of a preferred embodiment of the present invention, the agricultural machine and the agricultural assistance system may each further include a detector to detect a distance from the traveling vehicle body of the agricultural machine to an end of the agricultural field in a direction of travel of the traveling vehicle body. The automatic operation controller may be configured or programmed to stop travel of the traveling vehicle body and the agricultural machine to discontinue the automatic operation when the distance detected by the detector during the automatic operation is equal to or less than a predetermined threshold.

In an aspect of a preferred embodiment of the present invention, the automatic operation controller may be configured or programmed to cause the lifting device to keep the working device in the work position from when the automatic operation is ended to when travel of the traveling vehicle body and the agricultural job performed by the working device are resumed by manual operation.

In an aspect of a preferred embodiment of the present invention, the automatic operation controller may be configured or programmed to, if the agricultural job that was being performed before the automatic operation was ended is a first agricultural job including leveling the agricultural field, cause the lifting device to keep the working device in the work position even after ending the automatic operation, and if the agricultural job that was being performed before the automatic operation was ended is a second agricultural job not including leveling the agricultural field, cause the lifting device to place the working device in a non-work position in which the working device does not perform the second agricultural job upon ending of the automatic operation.

In an aspect of a preferred embodiment of the present invention, the automatic operation controller may be configured or programmed to, if travel of the traveling vehicle body in the automatic operation is stopped at a stop location not short of the unworked area of the agricultural field, cause the lifting device to place the working device in a non-work position in which the working device does not perform the agricultural job.

In an aspect of a preferred embodiment of the present invention, the agricultural machine and the agricultural assistance system may each further include a notifier to provide a notification of a heightwise position of the working device.

In an aspect of a preferred embodiment of the present invention, the automatic operation controller may be configured or programmed to, if the working device is a first working device to perform a first agricultural job including leveling the agricultural field, cause the lifting device to lower the first working device to place the first working device in the work position in which the first working device contacts soil in the agricultural field and performs the first agricultural job, and cause the lifting device to raise the first working device to place the first working device in a non-work position in which the first working device is spaced from the soil in the agricultural field and does not perform the first agricultural job.

In an aspect of a preferred embodiment of the present invention, if the working device is a second working device to perform a second agricultural job not including leveling the agricultural field, the second working device may be placed by the lifting device in the work position in which the second working device contacts or is separated from soil in the agricultural field and performs the second agricultural job, or the second working device may be placed by the lifting device in a non-work position in which the second working device is spaced from the soil in the agricultural field and does not perform the second agricultural job.

In an aspect of a preferred embodiment of the present invention, the automatic operation controller may be configured or programmed to, if the agricultural job involving raising and lowering of the working device was being performed before the automatic operation was ended, cause the lifting device to keep the working device in the work position even after ending the automatic operation, and if the agricultural job not involving raising or lowering of the working device was being performed before the automatic operation was ended, cause the lifting device to keep a heightwise position of the working device even after ending the automatic operation.

In an aspect of a preferred embodiment of the present invention, the working device may be one of working devices including a first working device to perform a first agricultural job and a second working device to perform a second agricultural job, the first agricultural job including leveling the agricultural field, the second agricultural job not including leveling the agricultural field. The first agricultural job may be one of jobs including a tillage job. The first working device may be one of devices including a tiller. The second agricultural job may be one of jobs including a stubble cultivation job and a spreading job. The second working device may be one of devices including a stubble cultivator and a spreader.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
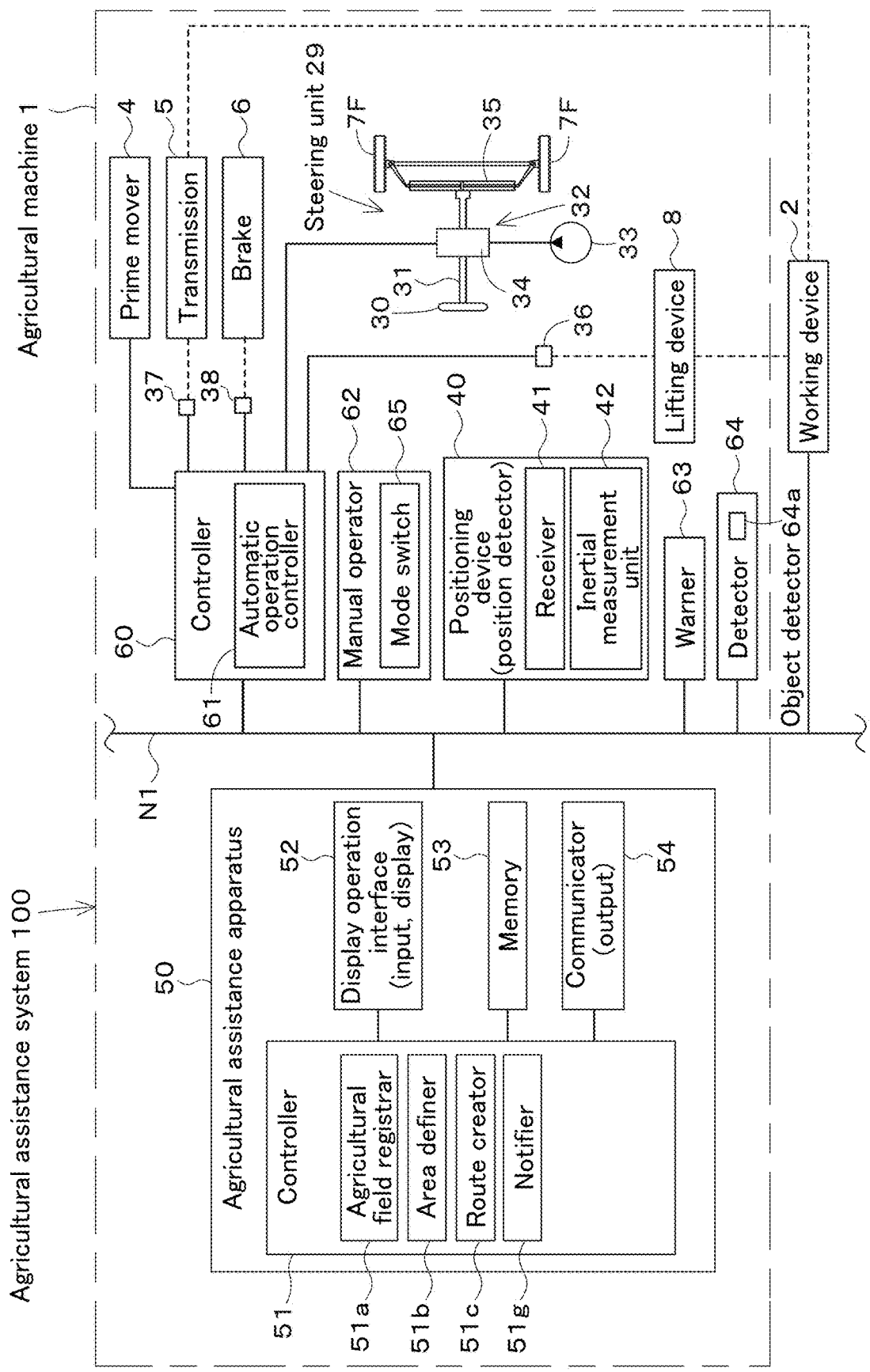
FIG. 1 is a block diagram of an agricultural assistance system.

Preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of the present invention with reference to drawings.

Figure 22:
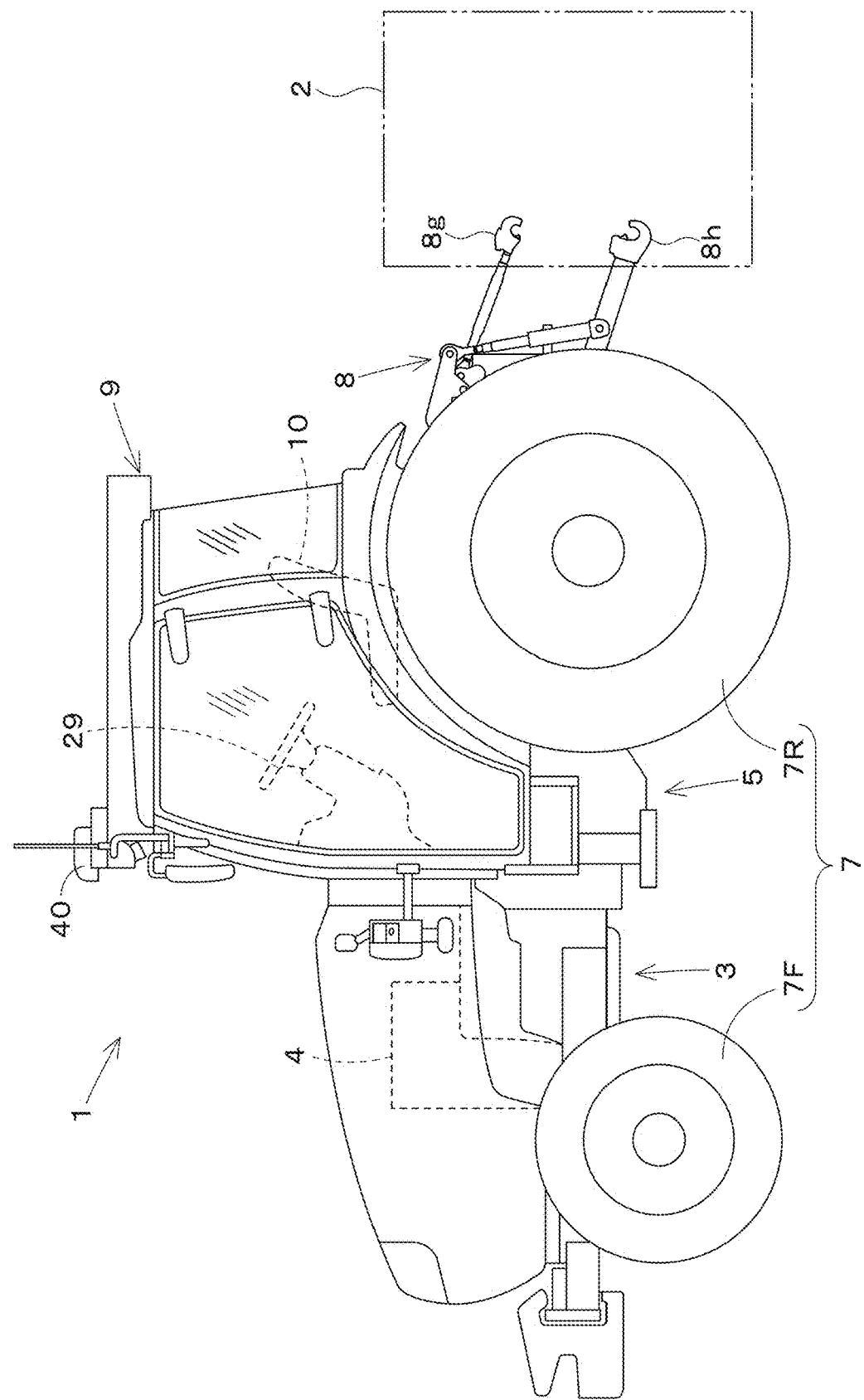
FIG. 22 is a side view of an agricultural machine.

First, an agricultural machine 1 according to the present preferred embodiment is discussed. FIG. 22 is a side view of the agricultural machine 1. The agricultural machine 1 is a tractor. Note that the agricultural machine 1 is not limited to a tractor, and may be, for example, some other agricultural machine such as a rice transplanter or a combine, a working vehicle which performs agricultural jobs other than the tractor, or the like.

The agricultural machine 1 includes a traveling vehicle body 3, a prime mover 4, a transmission 5, and a traveling device 7. Front wheels 7F of the traveling device 7 may be tire wheels or crawler wheel(s). Rear wheels 7R of the traveling device 7 may also be tire wheels or crawler wheel(s). The prime mover 4 is a diesel engine, an electric motor, and/or the like. In the present preferred embodiment, the prime mover 4 is a diesel engine. The transmission 5 is capable of changing the propelling force of the traveling device 7 by changing speed stages, and is also capable of switching between forward travel and rearward travel of the traveling device 7. The driving force from the prime mover 4 is transmitted to the traveling device 7 via the transmission 5 to drive the traveling device 7, causing the traveling vehicle body 3 to travel forward or rearward. Note that the left side of FIG. 22 corresponds to the front of the traveling vehicle body 3, and the right side of FIG. 22 corresponds to the rear of the traveling vehicle body 3. The far side in FIG. 22 corresponds to the right side of the traveling vehicle body 3, and the near side in FIG. 22 corresponds to the left side of the traveling vehicle body 3.

The traveling vehicle body 3 is provided with a cabin 9. The cabin 9 is provided with an operator's seat 10 therein. The traveling vehicle body 3 is provided, at the rear thereof, a lifting device 8 which is a three-point linkage and/or the like. The lifting device 8 can have connected thereto a working device 2 to perform an agricultural job. Specifically, the lifting device 8 includes connectors 8g and 8h to which the working device 2 can be connected. When the working device 2 is connected to the connectors 8g and 8 h, the working device 2 and the traveling vehicle body 3 (agricultural machine 1) are linked together to allow the traveling vehicle body 3 to tow the working device 2.

The working device 2 does ground work (work may be hereinafter referred to as a "job") on an agricultural field. Examples of the working device 2 include tillers (rotary tillers) for tilling in an agricultural field, stubble cultivators for stubble cultivation, harrows for puddling, spreaders for spreading fertilizer, agricultural chemicals, and/or the like, seeders for seeding, transplanters for transplanting seedlings, and harvesters for harvesting.

Next, an agricultural assistance system 100 according to the present preferred embodiment is discussed. FIG. 1 is a block diagram of the agricultural assistance system 100. The agricultural assistance system 100 includes an agricultural assistance apparatus 50. The agricultural assistance system 100 and the agricultural assistance apparatus 50 provide assistance in performing an agricultural job with the working device 2 while causing the agricultural machine 1 to travel in an agricultural field.

The agricultural machine 1 includes a controller 60, a manual operator 62, the prime mover 4, the transmission 5, a brake 6, a steering unit 29, the lifting device 8, a position detector 40, a warner 63, and a detector 64. On the agricultural machine 1, there is an in-vehicle network N1 such as local area network (LAN) or control area network (CAN). The controller 60, the manual operator 62, the position detector 40, the warner 63, and the detector 64 are connected to the in-vehicle network N1. Such elements of the agricultural machine 1 are included in the agricultural assistance system 100.

The controller 60 includes an electric circuit including a central processing unit (CPU) (or a microcomputer) and one or more memories, and/or the like. Examples of the one or more memories of the controller 60 include volatile memories and nonvolatile memories. The controller 60 controls operation of the elements of the agricultural machine 1. The controller 60 includes an automatic operation controller 61 to control travel of the agricultural machine 1 and operation of the working device 2. The manual operator 62 includes switch(es), lever(s), pedal(s), other key(s), and/or the like that can be operated by a user (operator) such as a human operator seated on the operator's seat 10 or a worker in the vicinity of the agricultural machine 1. The manual operator 62 includes a mode switch 65. The mode switch 65 is operated to switch the agricultural machine 1 between different modes.

The prime mover 4 (engine) is controlled by the controller 60 in terms of driving, stopping, and rotation speed. The transmission 5 is connected to control valve(s) 37. The control valve 37 is a solenoid valve actuated based on a control signal sent from the controller 60. The control valve 37 is supplied with hydraulic fluid delivered by a hydraulic pump 33. The control valve 37 in FIG. 1 is represented by a single block, but a plurality of the control valves 37 may be provided depending on the number of hydraulic devices such as hydraulic clutch(es), hydraulic cylinder(s), and/or the like of the transmission 5.

The brake 6 is connected to control valve(s) 38. The control valve 38 is a solenoid valve actuated based on a control signal sent from the controller 60. The control valve 38 is supplied with hydraulic fluid delivered by the hydraulic pump 33. The automatic operation controller 61 actuates the brake 6 by electrically controlling the switching position and the opening of the control valve 38, thus braking the traveling vehicle body 3.

The automatic operation controller 61 controls driving of the transmission 5 by electrically controlling the switching position (opening) of the control valve 37. The transmission 5 transmits the driving force from the prime mover 4 to the traveling device 7 to actuate the traveling device 7, causing the traveling vehicle body 3 to travel forward or rearward. For example, when the working device 2 does ground work or the like, the transmission 5 transmits the driving force from the prime mover 4 to the working device 2. This increases the force to actuate the working device 2.

The automatic operation controller 61 communicates with the working device 2 via the in-vehicle network N1. Specifically, the working device 2 includes a controller and a communicator (which are not illustrated). The automatic operation controller 61 sends a work command to the working device 2 via the in-vehicle network N1. Upon receipt of the work command by the communicator, the controller of the working device 2 controls the operation of element(s) of the working device 2 according to the work command to cause the working device 2 to perform an agricultural job (ground work). The controller of the working device 2 transmits, to the controller 60, information or data indicative of the manner in which a job is performed and/or the like via the communicator over the in-vehicle network N1. The automatic operation controller 61 detects the manner in which a job is performed by the working device 2 and/or the like based on the information or data received from the working device 2 via the in-vehicle network N1.

Note that some working devices 2 do not include a controller or a communicator. In the case of such a working device 2, the automatic operation controller 61 does not communicate with the working device 2 over the in-vehicle network N1. The automatic operation controller 61 causes the lifting device 8 to raise or lower the working device 2 to change the position of the working device 2, thus controlling the operation of the working device 2 and detecting the manner in which the working device 2 does work and/or the like (described later).

The steering unit 29 includes a steering wheel 30, a steering shaft (rotary shaft) 31, and an assist mechanism (power steering mechanism) 32. The steering wheel 30 is provided inside the cabin 9 (FIG. 22). The steering shaft 31 rotates as the steering wheel 30 rotates. The assist mechanism 32 assists in performing steering using the steering wheel 30.

The assist mechanism 32 includes a control valve 34 and a steering cylinder 35. The control valve 34 is a solenoid valve actuated based on a control signal sent from the controller 60. Specifically, the control valve 34 is a three-way switching valve which achieves multi-position switching by movement of a spool or the like. The control valve 34 is supplied with hydraulic fluid delivered by the hydraulic pump 33. The controller 60 adjusts the hydraulic pressure applied to the steering cylinder 35 by electrically controlling the switching position and the opening of the control valve 34, thus causing the steering cylinder 35 to extend or retract. The steering cylinder 35 is connected to knuckle arms 39 to change the orientation of the front wheels 7F.

The switching position and the opening of the control valve 34 can also be controlled by rotating the steering shaft 31. Specifically, when the steering wheel 30 is rotated, the steering shaft 31 rotates according to how the steering wheel 30 is rotated, and the switching position and the opening of the control valve 34 are changed. The steering cylinder 35 extends or retracts leftward or rightward with respect to the traveling vehicle body 3 according to the switching position and the opening of the control valve 34. The extending/retracting movement of the steering cylinder 35 changes the direction in which the front wheels 7F are steered. Note that the above-described steering unit 29 is an example, and is not limited to the above-described configuration.

The traveling vehicle body 3 of the agricultural machine 1 can be steered manually by manual operation of the steering wheel 30 and can be steered automatically by the automatic operation controller 61. The transmission 5 or the brake 6 is driven in response to the manual operation of an accelerator member (not illustrated) or a brake pedal (not illustrated) of the manual operator 62, thus causing the traveling vehicle body 3 to travel or stop. The traveling vehicle body 3 is also capable of traveling and stopping automatically in response to the control of the transmission 5 and the brake 6 by the automatic operation controller 61. That is, the agricultural machine 1 can operate in manual operation in which a user (driver) operates the agricultural machine 1 to travel and steers the agricultural machine 1, automatic operation in which the automatic operation controller 61 automatically operates the agricultural machine 1 to travel and steers the agricultural machine 1, and automatic steering control (also referred to as a "semi-automatic operation") in which the automatic operation controller 61 automatically steers the agricultural machine 1 and the user operates the agricultural machine 1 to travel.

Figure 2:
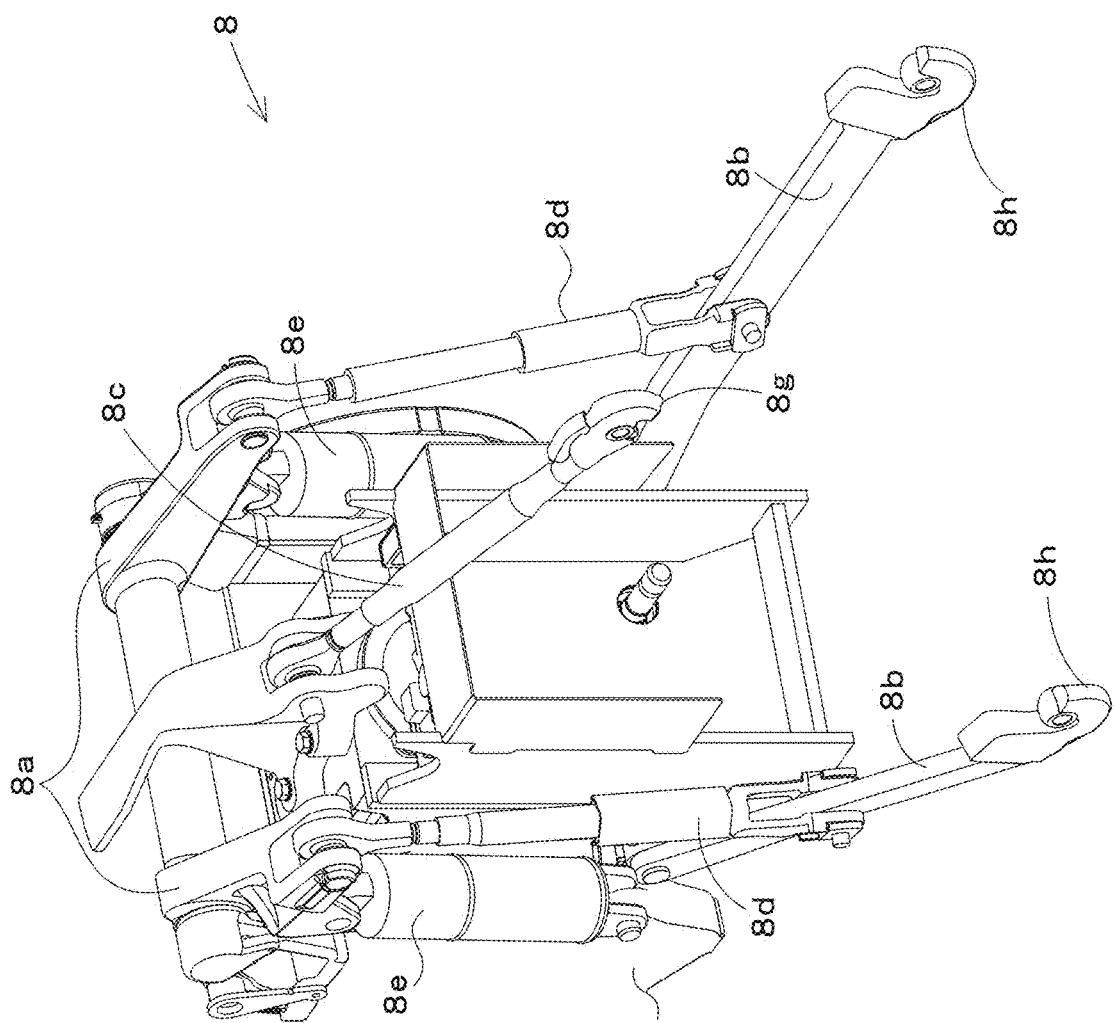
FIG. 2 is a perspective view of a lifting device.

FIG. 2 is a perspective view of the lifting device 8. The lifting device 8 includes one or more lift arms 8a, one or more lower links 8b, at least one top link 8c, one or more lift rods 8d, and one or more lift cylinders 8e. The front ends of the lift arms 8a are supported on an upper rear portion of a case (transmission case) housing the transmission 5 such that the lift arms 8a are swingable up and down. The lift arms 8a are driven by the lift cylinders 8e to swing (raised or lowered). The lift cylinders 8e are hydraulic cylinders. The lift cylinders 8e are connected to control valve(s) 36 (FIG. 1). The control valve 36 is a solenoid valve actuated based on a control signal sent from the controller 60. The control valve 36 is supplied with hydraulic fluid delivered by the hydraulic pump 33.

The front ends of the lower links 8b as illustrated in FIG. 2 are supported on a lower rear portion of the transmission 5 (FIGS. 1 and 22) such that the lower links 8b are swingable up and down. The front end of the top link 8c is supported, at a position higher than the lower links 8b, on a rear portion of the transmission 5 such that the top link 8c is swingable up and down. The lift rods 8d connect the lift arms 8a and the lower links 8b. The rear ends of the lower links 8b and the top link 8c are provided with the connectors 8g and 8h to which the working device 2 can be connected.

The automatic operation controller 61 as illustrated in FIG. 1 adjusts hydraulic pressure applied to the lift cylinders 8e by electrically controlling the switching position and the opening of the control valve 36, thus causing the lift cylinders 8e to extend or retract. The extension or retraction of the lift cylinders 8e raises or lowers the lift arms 8a and raises or lowers the lower links 8b connected to the lift arms 8a via the lift rods 8d. With this, the working device 2 swings up or down (raised or lowered) about front portions of the lower links 8b (the opposite ends of the lower links 8b from the connectors 8g and 8h).

The position detector 40 as illustrated in FIG. 1 includes a receiver 41 and an inertial measurement unit (IMU) 42. The receiver 41 receives satellite signal(s) (position(s) of positioning satellite(s), time of transmission, correction information, and/or the like) sent from a satellite positioning system (positioning satellite(s)) such as D-GPS, GPS, GLONASS, BeiDou, Galileo, and/or Michibiki. The position detector 40 detects the current position (for example, latitude and longitude) based on the satellite signal(s) received at the receiver 41. That is, the position detector 40 is a position detector to detect the position of the traveling vehicle body 3 of the agricultural machine 1. The inertial measurement unit 42 includes an acceleration sensor, a gyroscope sensor, and/or the like. The inertial measurement unit 42 detects the roll angle, pitch angle, yaw angle, and/or the like of the traveling vehicle body 3. The warner 63 includes a buzzer (beeper), a speaker, a warning lamp, and/or the like provided on the traveling vehicle body 3. The warner 63 provides a warning using sound and/or light to people in the vicinity of the traveling vehicle body 3.

The detector 64 includes sensor(s) and/or the like (which may include camera(s)) provided at some position(s) on the agricultural machine 1 and/or the working device 2. The detector 64 detects the operating states (driven or stopped state, current position, and/or the like) of respective elements of the agricultural machine 1 such as the transmission 5, the brake 6, the traveling device 7, the lifting device 8, the steering unit 29, and/or the manual operator 62 based on signal(s) outputted from the sensor(s) and/or the like. The detector 64 also detects the operating state of the working device 2 based on signal(s) outputted from the sensor(s) and/or the like. The detector 64 also includes an object detector 64a, laser sensor(s) such as LiDAR, ultrasonic sensor(s), and/or the like. The laser sensor(s), the ultrasonic sensor(s) and/or the like are located at the front, rear, left side, and/or right side of the traveling vehicle body 3. The object detector 64a detects the presence/absence of objects in the vicinity of the agricultural machine 1, the distance to an object, and/or the like based on signal(s) outputted from the laser sensor(s) and/or the ultrasonic sensor(s).

The agricultural assistance apparatus 50 includes, for example, a portable tablet terminal and/or the like. The agricultural assistance apparatus 50 is provided, for example, inside the cabin 9 of the agricultural machine 1, and is attachable to and detachable from the agricultural machine 1. That is, the agricultural machine 1 includes the agricultural assistance apparatus 50.

The agricultural assistance apparatus 50 includes a controller 51, a display operation interface 52, a memory 53, and a communicator 54. The controller 51 includes a CPU (or a microcomputer), one or more volatile memories, and one or more nonvolatile memories. The controller 51 controls elements of the agricultural assistance apparatus 50. The controller 51 includes an agricultural field registrar 51a, an area definer 51b, a route creator 51c, a turn mode changer 51d, and a notifier 51g. Such elements are software programs in the present example, but may alternatively be, for example, hardware such as semiconductor device(s) and/or electric circuit(s) (e.g., application specific integrated circuit(s) (ASIC)).

The display operation interface 52 includes a touchscreen and displays various types of information on the screen. It is also possible to perform various input operations by performing predetermined actions on the display screen of the display operation interface 52. The display operation interface 52 functions as a display and an input. The agricultural assistance apparatus 50 may include an independent display and an independent operation interface (input) instead of the display operation interface 52.

The memory 53 includes nonvolatile memory (memories) and/or the like. The memory 53 is a read/write memory which stores information and/or data for assisting the travel and work of the agricultural machine 1. The communicator 54 includes an interface for connection with the in-vehicle network N1. The controller 51 communicates with the controller 60, the manual operator 62, the position detector 40, the warner 63, the detector 64, and the working device 2 through the communicator 54 via the in-vehicle network N1. The communicator 54 is an output to output information and/or data to the controller 60 of the agricultural machine 1.

The agricultural field registrar 51a registers information relating to agricultural field(s) in which agricultural job(s) is/are to be performed by the agricultural machine 1 and working device(s) 2. The area definer 51b defines predetermined area(s) in the agricultural field registered by the agricultural field registrar 51a. The route creator 51c creates a travel route to be traveled by the agricultural machine 1 in the agricultural field registered by the agricultural field registrar 51a. The notifier 51g provides a notification by causing the display operation interface 52 to display the content of certain information and/or data. The notifier 51g may provide a notification by outputting, via a speaker of the warner 63, sound indicative of the content of certain information and/or data.

Figure 3:
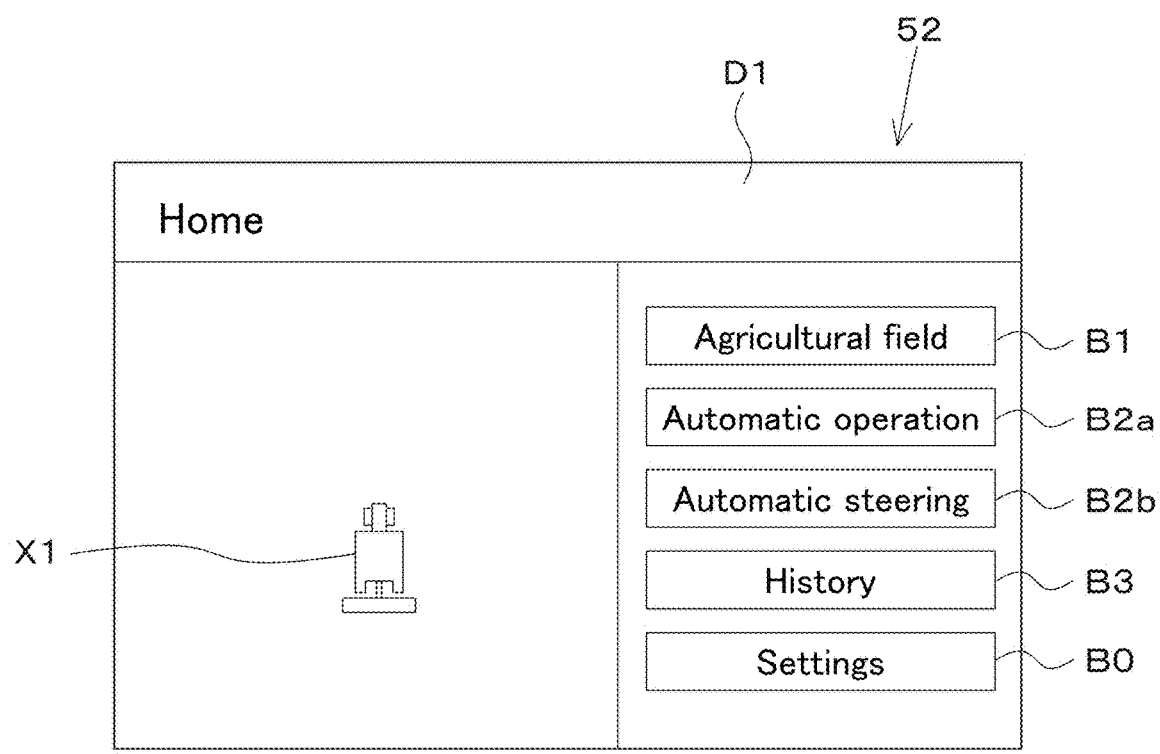
FIG. 3 illustrates an example of a home screen.

The following description discusses operation of elements of the agricultural assistance system 100. Upon startup of the agricultural assistance apparatus 50, the controller 51 causes the display operation interface 52 to display a home screen D1 as illustrated in FIG. 3. The data of the home screen D1 and data of screens described later are stored in the memory 53. The controller 51 reads the data from the memory 53 when needed, and causes the display operation interface 52 to display the screen based on the data.

The home screen D1 displays an agricultural machine symbol X1, an "agricultural field" key B1, an "automatic operation" key B2a, an "automatic steering" key B2b, a "history" key B3, and a "settings" key B0. The "settings" key B0 is used to make various settings. The "settings" key B0 is selected (tapped) to make settings and registration for certain items. Examples of the items include matters relating to the agricultural machine 1 provided with the agricultural assistance apparatus 50, a working device 2 linked to the agricultural machine 1, an agricultural job to be performed by the agricultural machine 1 and the working device 2, an agricultural field in which the agricultural job is to be performed, and the display operation interface 52.

The "history" key B3 is used to cause the history of job(s) performed by the agricultural machine 1 to be displayed. The "agricultural field" key B1 is used to register an agricultural field in which an agricultural job is performed by the agricultural machine 1. The "automatic operation" key B2a is used to make settings and estimation regarding an automatic traveling-and-working mode of the agricultural machine 1. The "automatic steering" key B2b is used to make settings and estimation regarding an automatic steering-and-working mode of the agricultural machine 1.

The automatic traveling-and-working mode is a mode in which the traveling vehicle body 3 of the agricultural machine 1 is caused to travel in automatic operation while the working device 2 is caused to perform an agricultural job (ground work). The automatic operation of the agricultural machine 1 indicates that the travel speed of the traveling vehicle body 3 is changed automatically and the traveling vehicle body 3 is steered automatically. The automatic steering-and-working mode is a mode in which the traveling vehicle body 3 is steered automatically while the working device 2 is caused to perform an agricultural job (ground work). When the agricultural machine 1 is in the automatic steering-and-working mode, the operator of the agricultural machine 1 operates the accelerator member or the brake member of the manual operator 62 (FIG. 1), so that the travel speed of the traveling vehicle body 3 is changed in response to the operation of the accelerator member or the brake member. That is, in the automatic steering-and-working mode, the travel speed of the traveling vehicle body 3 is changed based on manual operation.

It is also possible to cause the agricultural machine 1 to travel by manual operation, and possible, during the travel, to cause the working device 2 to do ground work. The manual operation of the agricultural machine 1 indicates that the operator operates the accelerator member or the brake member of the manual operator 62 to change the travel speed of the traveling vehicle body 3, and moves the steering wheel 30 (FIG. 1) to steer the traveling vehicle body 3.

Figure 4:
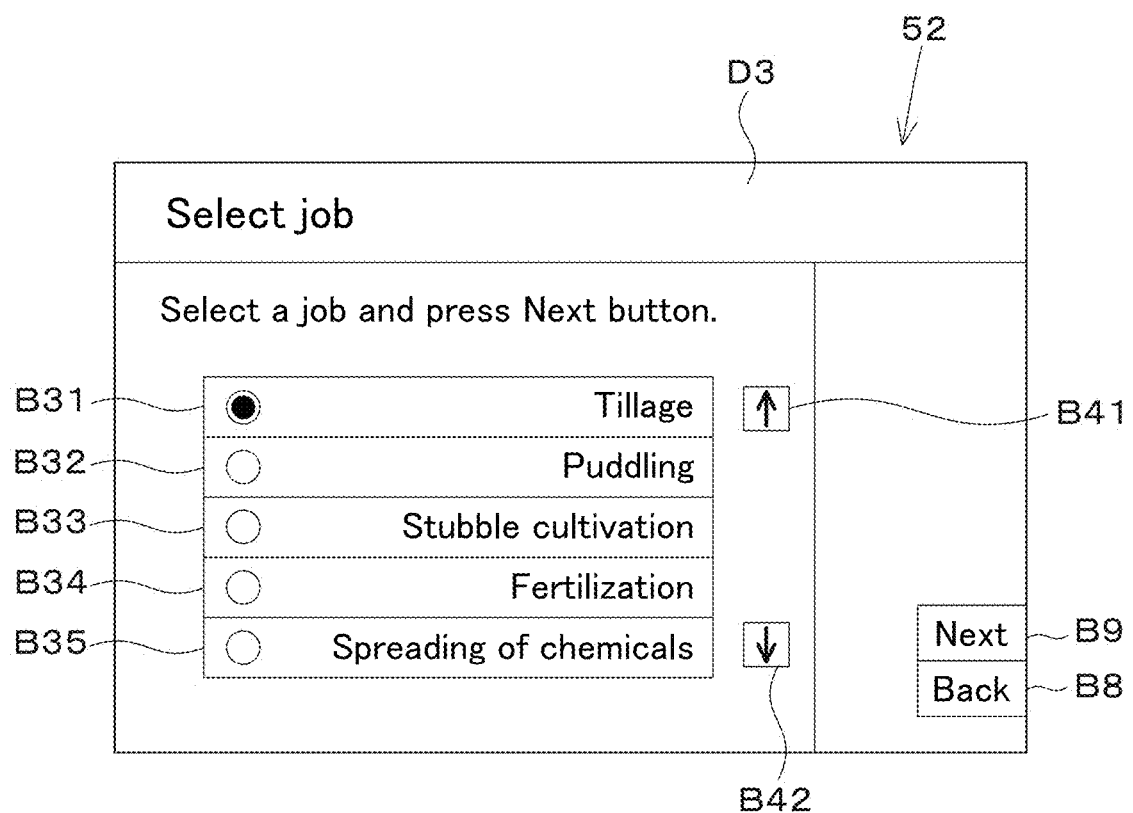
FIG. 4 illustrates an example of a "select job" screen.

Upon selection of the "automatic operation" key B2a by the user on the home screen D1 illustrated in FIG. 3, the controller 51 causes the display operation interface 52 to display a "select job" screen D3 as illustrated in FIG. 4. The "select job" screen D3 displays a message indicative of instructions for input operations. The "select job" screen D3 also displays job keys B31 to B35, an up-pointing arrow key B41, a down-pointing arrow key B42, a "next" key B9, and a "back" key B8. The job keys B31 to B35 indicate agricultural jobs that can be performed by the agricultural machine 1 and working device(s) 2 linked to the agricultural machine 1. In FIG. 4, five job keys B31, B32, B33, B34, and B35 are displayed. If the number of the agricultural jobs that can be performed by the agricultural machine 1 and the working device(s) 2 is six or more, the controller 51 causes job key(s) indicating another type(s) of job(s) to be displayed on the "select job" screen D3 upon selection of the up-pointing arrow key B41 or the down-pointing arrow key B42 by the user.

Figure 5A:
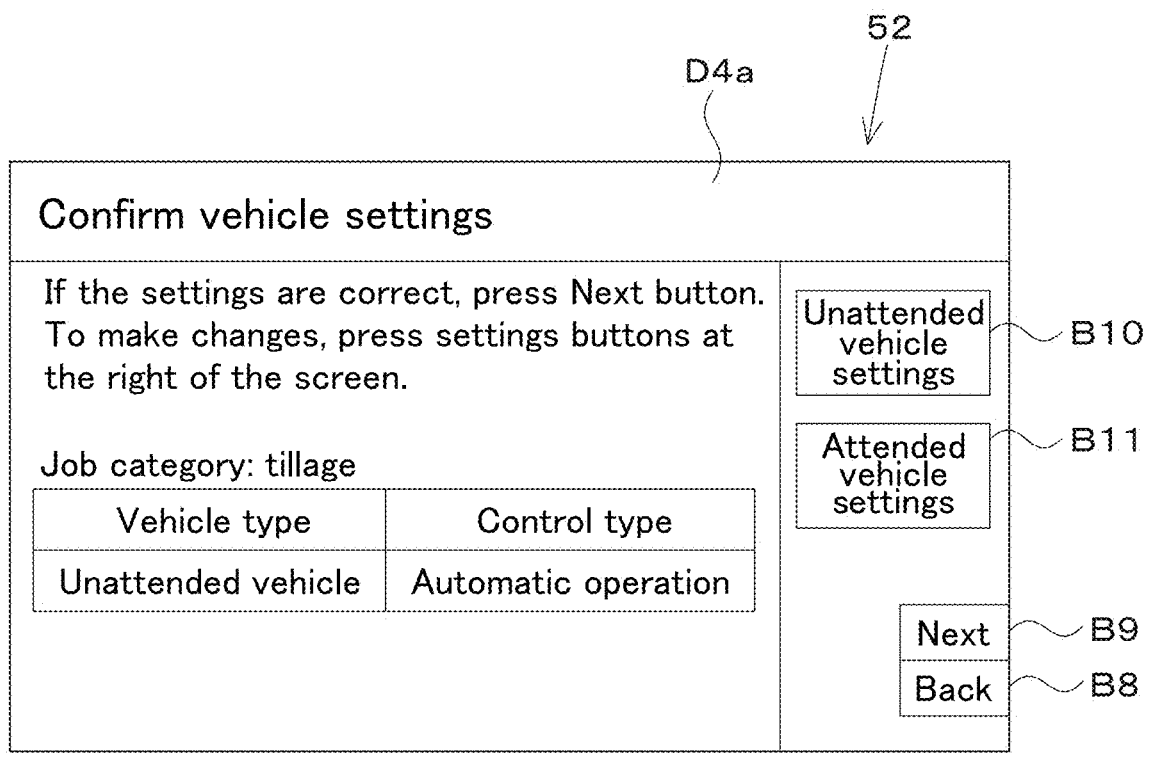
FIG. 5A illustrates an example of a "confirm vehicle settings" screen.

Upon selection of any one of the job keys B31 to B35 by the user, the controller 51 causes the selected job key to be displayed on the "select job" screen D3 in a manner that differs from the other job keys. In the example in FIG. 4, only the selected job key ("tillage" key B31) is assigned a filled circle. Upon selection of the "next" key B9 by the user when any one of the job keys B31, B32, B33, and B34 is in the selected state, the controller 51 causes the display operation interface 52 to display a "confirm vehicle settings" screen D4a as illustrated in FIG. 5A. That is, the "next" key B9 is used to move from the current screen to the next screen on the display operation interface 52. Note that, upon selection of the "back" key B8 by the user, the controller 51 causes the display operation interface 52 to display the home screen D1 as illustrated in FIG. 3. That is, the "back" key B8 is used to go back from the current screen to the previous screen on the display operation interface 52.

The "confirm vehicle settings" screen D4a as illustrated in FIG. 5A displays a message indicating instructions for input operations, the category of the agricultural job, the type of agricultural machine 1, an "unattended vehicle settings" key B10, an "attended vehicle settings" key B11, a "next" key B9, and a "back" key B8. The agricultural job selected on the "select job" screen D3 is displayed in the "job category" portion. The type of agricultural machine 1 includes vehicle type and control type. In FIG. 5A, the preregistered (preset) type of agricultural machine 1 is displayed on the "confirm vehicle settings" screen D4a.

Note that the user can input the type of agricultural machine 1 by, for example, selecting the "settings" key B0 on the home screen D1 (FIG. 3) and performing predetermined input operation(s) on the display operation interface 52. In so doing, the user can also input the specifications such as the name and/or the size of the agricultural machine 1 by performing predetermined input operation(s). Upon the user's further predetermined input operation(s), the controller 51 registers the inputted type and specifications of the agricultural machine 1 by causing the memory 53 to store them in a predetermined area thereof. It is also possible to input information about the agricultural machine 1 (described later) and information about the working device 2 (described later) and register (store) them in the memory 53 in the same manner starting from the home screen D1.

Figure 5B:
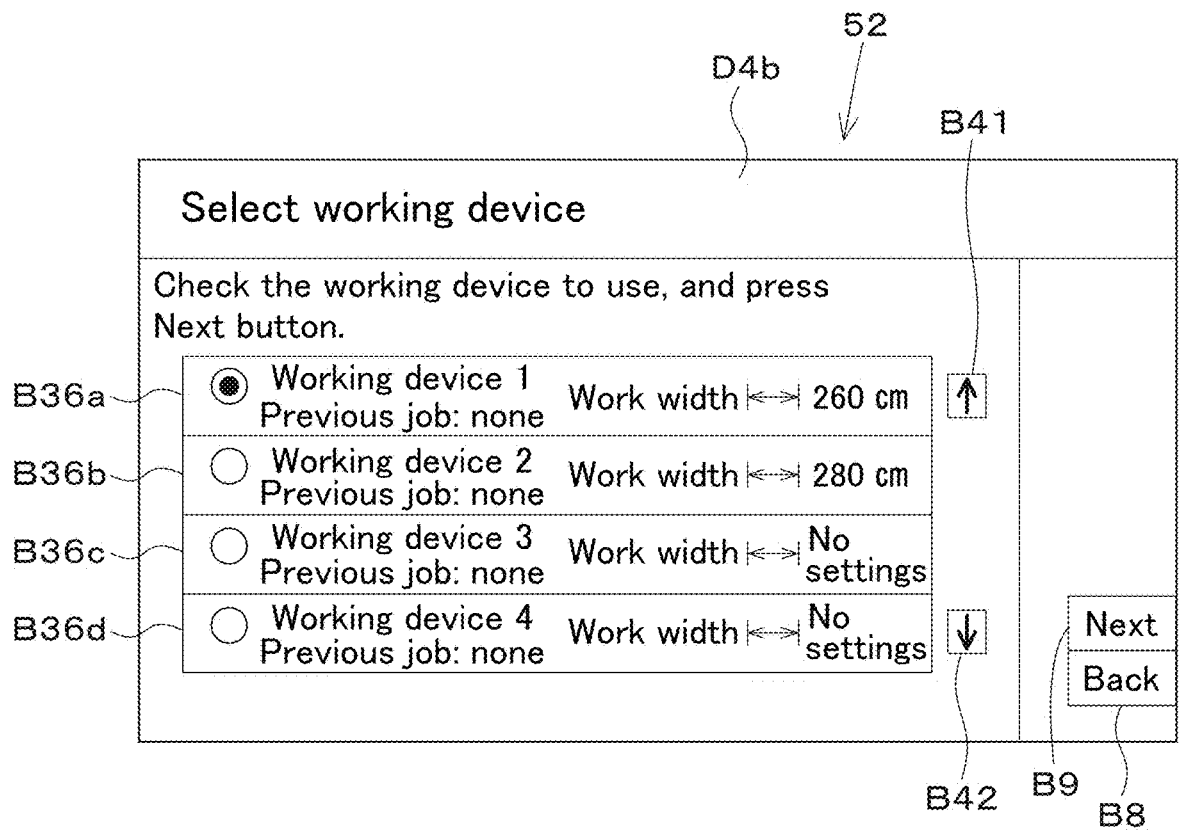
FIG. 5B illustrates an example of a "select working device" screen.

The user can change the type of agricultural machine 1 by selecting the "unattended vehicle settings" key B10 or the "attended vehicle settings" key B11 on the "confirm vehicle settings" screen D4a and performing predetermined input operation(s). Upon selection of the "next" key B8 on the "confirm vehicle settings" screen D4a by the user, the controller 51 causes an internal memory to store settings information (the category of agricultural job and the type of agricultural machine 1) displayed on the "confirm vehicle settings" screen D4a, and causes the display operation interface 52 to display a "select working device" screen D4b as illustrated in FIG. 5B.

The "select working device" screen D4b displays a message indicating instructions for input operations, working device keys B36*a* to B36*d*, an up-pointing arrow key B41, a down-pointing arrow key B42, a "next" key B9, and a "back" key B8. The working device keys B36*a* to B36*d* indicate preregistered representative information specific to respective working devices 2. The representative information specific to a working device 2 includes the name of the working device 2, the presence or absence of previous job(s) performed by the working device 2, and work width. The work width refers to the sideways dimension, which is perpendicular to the direction of travel in a horizontal plane, of the portion of the working device 2 that does ground work. In FIG. 5B, four working device keys B36*a* to B36*d* are displayed. If the number of working devices 2 registered in the agricultural assistance apparatus 50 is five or more, the controller 51 causes working device key(s) indicating another working device(s) 2 to be displayed on the "select working device" screen D4*b* upon selection of the up-pointing arrow key B41 or the down-pointing arrow key B42 by the user.

Upon selection of any one of the working device keys B36*a* to B36*d* by the user, the controller 51 causes the selected working device key to be displayed on the "select working device" screen D4*b* in a manner that differs from the other working device keys. In the example in FIG. 5B, only the selected working device key (working device key B36*a*) is assigned a filled circle. Upon selection of the "next" key B9 by the user when any one of the working device keys B36*a* to B36*d* is in the selected state, the controller 51 causes the display operation interface 52 to display a "confirm working device settings" screen D4*c* as illustrated in FIG. 5C.

The "confirm working device settings" screen D4*c* displays a message indicating instructions for input operations, information specific to the working device 2 selected on the "select working device" screen D4*b* (FIG. 5B), settings keys B37 to B39, a "next" key B9, and a "back" key B8. The information specific to the working device 2 includes the name of the working device 2, the presence or absence of previous job(s) performed by the working device 2, size information of the working device 2, and the type of the working device 2. That is, the "confirm working device settings" screen D4*c* displays detailed specifications of the working device 2 selected on the "select working device" screen D4*b*. In FIGS. 5B and 5C, preregistered information specific to the working device(s) 2 is displayed on the screens D4*b* and D4*c*.

Figure 5C:
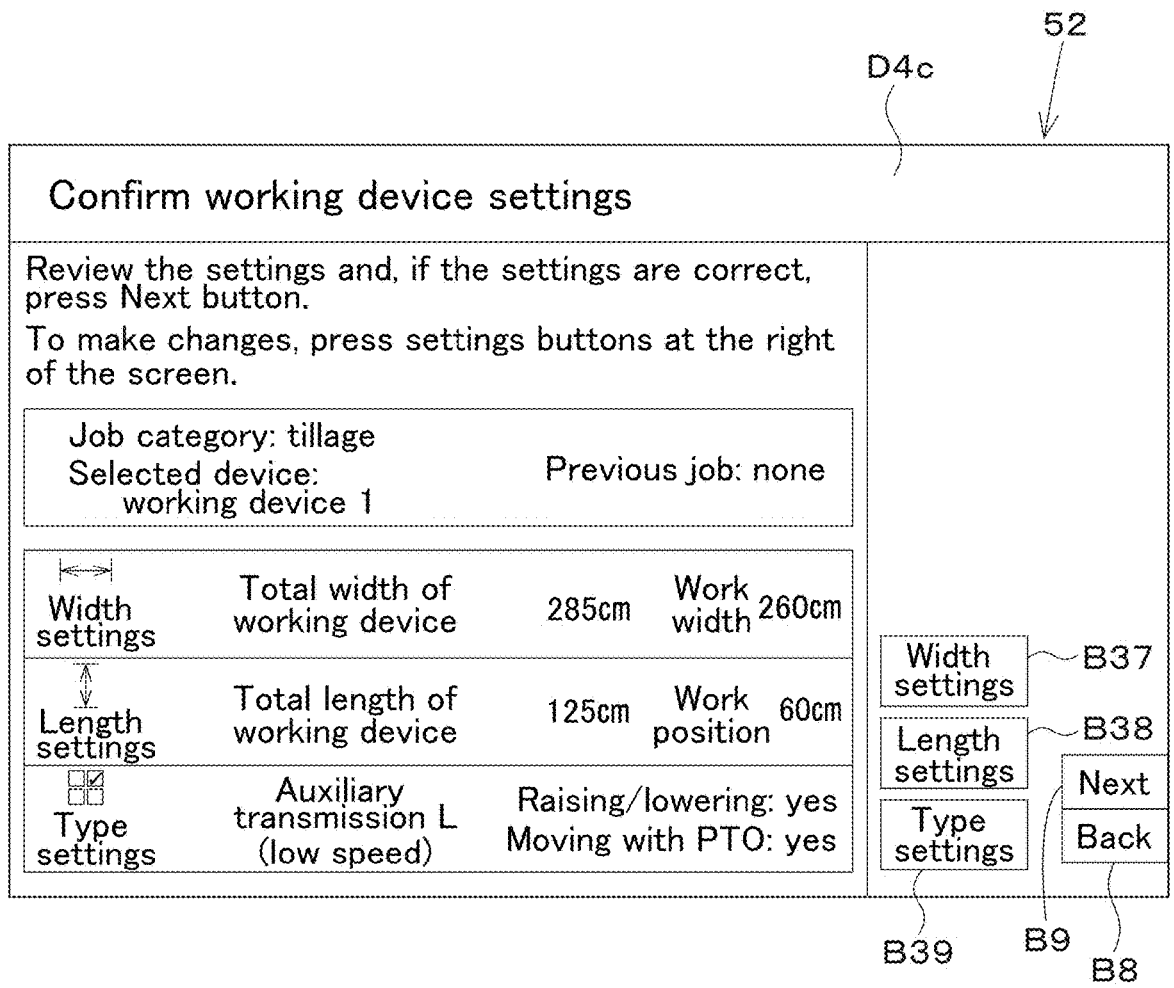
FIG. 5C illustrates an example of a "confirm working device settings" screen.

As illustrated in FIG. 5C, the size information of the working device 2 includes the total width, work width, total length, and work position of the working device 2. The type of the working device 2 includes the speed stage of an auxiliary transmission (not illustrated) to drive the working device 2 to rotate, whether or not the working device 2 is to be raised and lowered by the lifting device 8, and whether or not the working device 2 is to move together with a power take-off (PTO) of the agricultural machine 1.

The settings keys B37 to B39 are each used to set and change the size information or the type of the working device 2. Specifically, the user can input and change the set values of the total width and the work width of the working device 2 by selecting the "width settings" key B37 and performing predetermined input operation(s). The total width of the working device 2 indicates an outer dimension of the working device 2 in a sideways direction perpendicular to the front-rear direction and the up-and-down direction of the agricultural machine 1. The user can input and change the set values of the total length and the work position of the working device 2 by selecting the "length settings" key B38 and performing predetermined input operation(s). The total length of the working device 2 is the dimension of the working device 2 from the portion of the working device 2 at which the working device 2 is linked to the lower links 8*b* (FIG. 2) of the lifting device 8 to the rear edge of the working device 2 (the opposite edge of the working device 2 from the traveling vehicle 3 of the agricultural machine 1). The work position of the working device 2 is the distance from the portion of the working device 2 at which the working device 2 is linked to the lower links 8*b* to the front edge of the portion of the working device 2 that does ground work (the traveling vehicle body 3-side edge of the portion that does ground work).

The user can input and change the low-speed stage (L (low speed)) or the medium-speed stage (M (medium speed)) as the speed stage of the auxiliary transmission by selecting the "type settings" key B39 and performing predetermined input operation(s). In the present example, the movement of the working device 2 together with the PTO of the agricultural machine 1 and the raising/lowering of the working device 2 by the lifting device 8 are both fixed to "yes", and cannot be changed. For another example, "yes" or "no" may be selected for the movement of the working device 2 together with the PTO of the agricultural machine 1 and the raising/lowering of the working device 2 by the lifting device 8.

Figure 6:
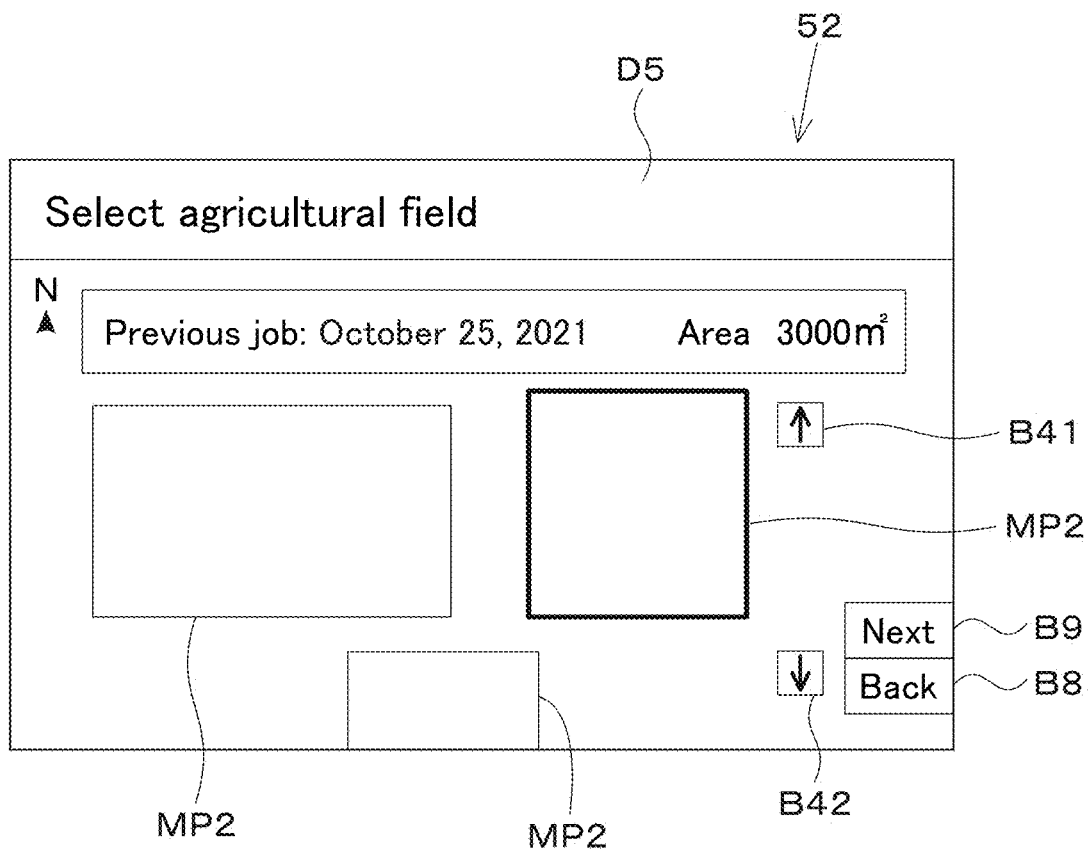
FIG. 6 illustrates an example of a "select agricultural field" screen.

Upon selection of the "next" key B9 by the user on the "confirm working device settings" screen D4*c*, the controller 51 causes the internal memory to store the settings information displayed on the "confirm working device settings" screen D4*c*, and causes the display operation interface 52 to display a "select agricultural field" screen D5 as illustrated in FIG. 6. The "select agricultural field" screen D5 displays one or more registered agricultural field maps MP2, an up-pointing arrow key B41, a down-pointing arrow key B42, a "next" key B9, and a "back" key B8. The number of the registered agricultural field maps MP2 displayed in FIG. 6 is three. If the number of the registered agricultural field maps MP2 is four or more, the controller 51 causes another agricultural field map(s) MP2 to be displayed on the "select agricultural field" screen D5 upon selection of the up-pointing arrow key B41 or the down-pointing arrow key B42 by the user.

Figure 7:
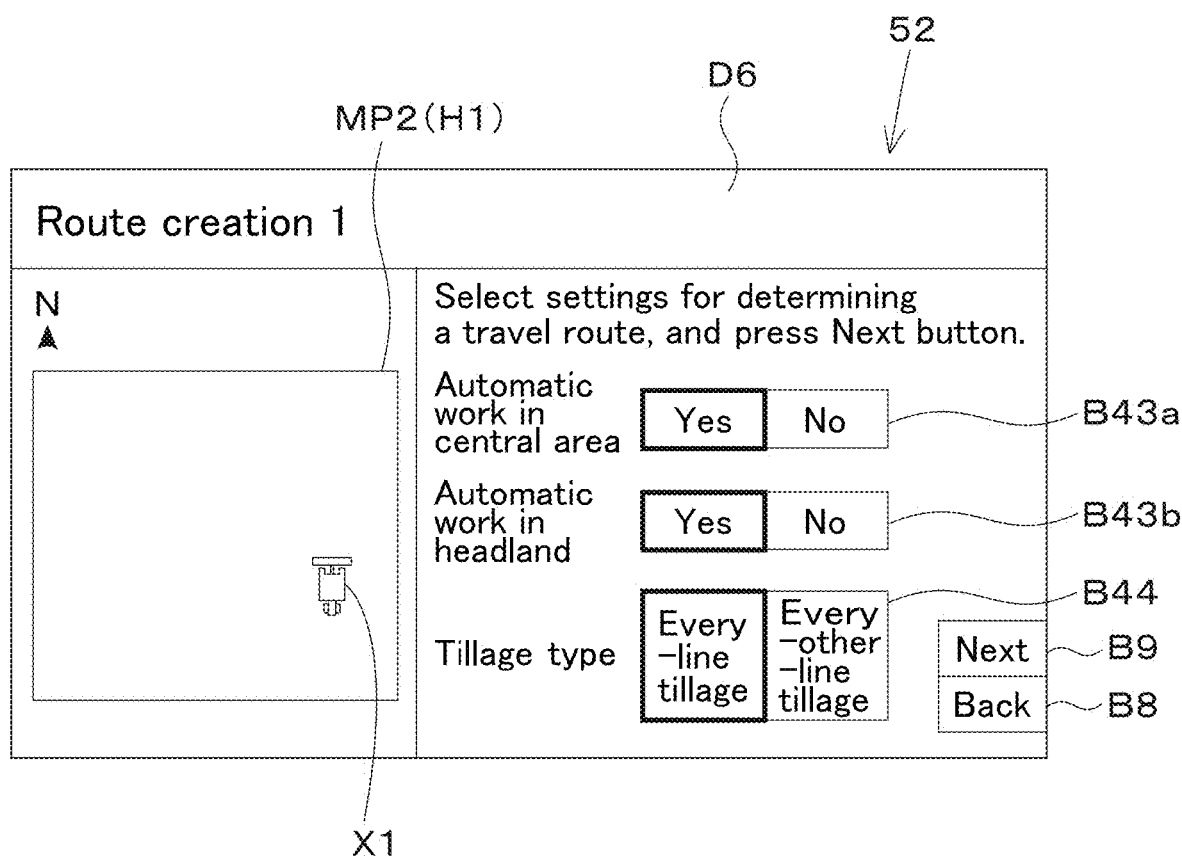
FIG. 7 illustrates an example of a "route creation 1" screen.

Upon selection of any of the agricultural field maps MP2 by the user, the controller 51 causes the selected agricultural field map MP2 to be displayed in a manner differing from the other agricultural field maps MP2. The selected agricultural field map MP2 only is enclosed by a bold line in FIG. 6. The controller 51 causes the date/time of the previous agricultural job performed in the agricultural filed shown in the selected agricultural field map MP2 and the area of the agricultural filed shown in the selected agricultural field map MP2 to be displayed on the "select agricultural field" screen D5. Upon selection of the "next" key B9 by the user when any of the agricultural field maps MP2 is in the selected state, the controller 51 reads agricultural field information including the selected agricultural field map MP2 from the memory 53, causes the internal memory to store the agricultural field information, and causes the display operation interface 52 to display a "route creation 1" screen D6 as illustrated in FIG. 7. The agricultural field information at the time of setting includes the identification information, outline, and the area of the selected agricultural field map MP2 as information about the agricultural field map MP2, and includes the identification information, position, outline, and/or the like of the agricultural field as information about the agricultural field corresponding to the agricultural field map MP2. The agricultural field information also includes the date/time of the previous job.

The "route creation 1" screen D6 as illustrated in FIG. 7 displays the selected agricultural field map MP2 (outline H1 of the agricultural field), an agricultural machine symbol X1, a message indicating instructions for input operations, job keys B43a, B43b, and B44, a "next" key B9, and a "back" key B8. The job keys B43a, B43b, and B44 are used to select settings for creation of a travel route for the agricultural machine 1. In other words, the job keys B43a, B43b, and B44 are used to make job settings for the agricultural job to be performed by the agricultural machine 1 (traveling vehicle body 3) and the working device 2 on the agricultural field.

More specifically, the "automatic work in central area" key B43a is used to select whether or not to perform the agricultural job with the working device 2 while causing the traveling vehicle body 3 of the agricultural machine 1 to travel in automatic operation in the central area defined in the agricultural field map MP2 (described later). The "automatic work in headland" key B43b is used to select whether or not to perform the agricultural job with the working device 2 while causing the traveling vehicle body 3 of the agricultural machine 1 to travel in automatic operation in the headland(s) defined in the agricultural field map MP2 (described later).

The job type key B44 is used to select the manner in which the job is performed by the working device 2. The present preferred embodiment assumes that tillage is selected on the "select job" screen D3 in FIG. 4 for example, and therefore the job type key B44 in FIG. 7 is a key used to select whether the type of the tillage is every-line tillage or every-other-line tillage. If some other job is selected on the "select job" screen D3 in FIG. 4, the job type key B44 in FIG. 7 is a key used to select the manner in which the other job is performed.

Figure 8A:
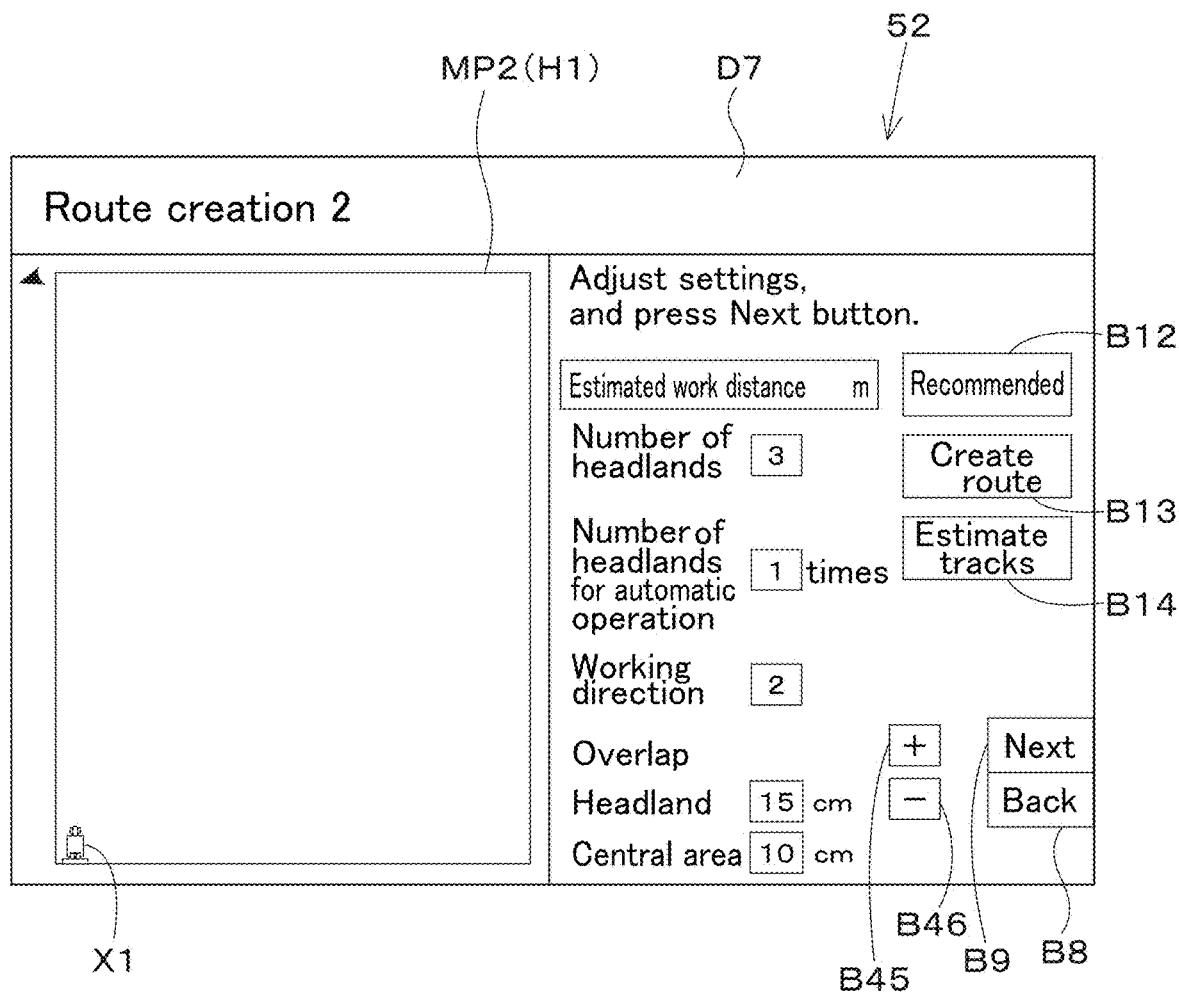
FIG. 8A illustrates an example of a "route creation 2" screen.

In FIG. 7, "agricultural job is performed by the working device 2 while the agricultural machine 1 travels in automatic operation in the central area of the agricultural field" is selected using the "automatic work in central area" key B43a, "agricultural job is performed by the working device 2 while the agricultural machine 1 travels in automatic operation in the headland(s) of the agricultural field" is selected using the "automatic work in headland" key B43b, and every-line tillage is selected as the type of tillage using the job type key B44. Upon selection of the "next" key B9 by the user, the controller 51 causes the internal memory to store job settings (settings made using the job keys B43a, B43b, and B44) displayed on the "route creation 1" screen D6, and causes the display operation interface 52 to display a "route creation 2" screen D7 as illustrated in FIG. 8A.

The "route creation 2" screen D7 displays the selected agricultural field map MP2, an agricultural machine symbol X1, a message indicating instructions for input operations, setting items and their corresponding value input fields, a "recommended" key B12, a "create route" key B13, an "estimate tracks" key B14, a plus sign key B45, a minus sign key B46, a "next" key B9, and a "back" key B8. While the "route creation 2" screen D7 is displayed, the controller 51 may cause the communicator 54 to acquire the actual position of the traveling vehicle body 3 detected by the position detector 40 and cause the agricultural machine symbol X1 to be displayed at the point on the agricultural field map MP2 that corresponds to the actual position of the traveling vehicle body 3.

The setting items on the "route creation 2" screen D7 indicate settings for use in creating a travel route and also job settings for use in performing the agricultural job with the agricultural machine 1 and the working device 2 on the agricultural field. The setting items include estimated work distance, the number of headlands, the number of headlands for automatic operation, working direction, overlap-on-headland, and overlap-in-central-portion. It is possible to input values of the items except for the estimated work distance. The number of headlands indicates the number of headland(s) extending inside and along the outline H1 of the registered agricultural field (agricultural field map MP2). The number of headlands for automatic operation indicates in how many of the above defined headlands the agricultural job is performed by the working device 2 while the agricultural machine 1 travels in automatic operation (how many times the agricultural machine 1 runs around the central area C1 in automatic operation).

The working direction refers to the direction in which the working device 2 is caused to perform the job while the traveling vehicle body 3 is caused to travel straight back and forth in the central portion located inward of the headland(s) of the agricultural field. Upon input of a predetermined value (such as any of "1" to "4") into the value input field for the working direction, the upward, downward, leftward, or rightward direction corresponding to that value is set on the "route creation 2" screen D7. The overlap-on-headland indicates an overlap of the work width of the working device 2 with a headland. The overlap-in-central-portion indicates an overlap between work widths when the job is performed by the working device 2 while the traveling vehicle body 3 is caused to travel straight back and forth in the central portion of the agricultural field.

On the "route creation 2" screen D7, the user can, by selecting any of the value input fields for the setting items and operating the plus sign key B45 or the minus sign key B46, input a value in the selected value input field. Furthermore, upon selection of the "recommended" key B12 by the user, the controller 51 reads recommended values for the respective setting items corresponding to the agricultural job selected on the "select job" screen D3 (FIG. 4) from recommended values pre-stored in the memory 53, and inputs (displays) the read recommended values into the value input fields.

Figure 8B:
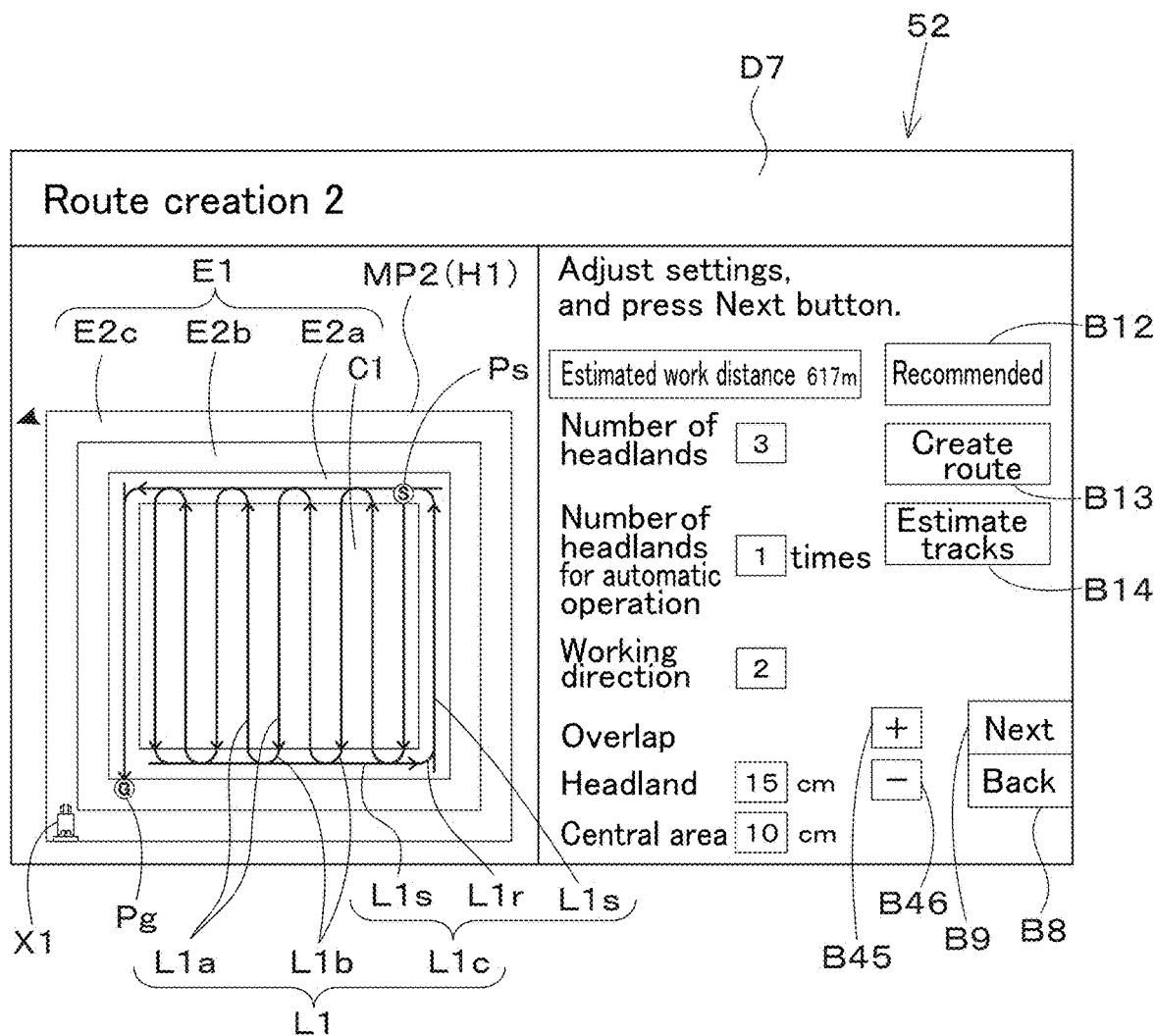
FIG. 8B illustrates an example of the "route creation 2" screen.

After the input of the values of the setting items on the "route creation 2" screen D7 by the user, upon selection of the "create route" key B13 by the user, the controller 51 causes the internal memory to store the values of the setting items. The area definer 51b (FIG. 1) defines a central area (second area) C1 and a headland area (first area) E1 on the agricultural field map MP2 as illustrated in FIG. 8B. The route creator 51c (FIG. 1) creates a travel route (planned travel route) L1 on the agricultural field map MP2.

Specifically, upon selection of the "create route" key B13 by the user, the area definer 51b defines the central area C1 and the headland area E1 (see FIG. 9A) based on the agricultural field information, the size information of the working device 2, and the number of headlands and/or the overlap-on-headland inputted on the "route creation 2" screen D7. More specifically, for example, the area definer 51b calculates outlines Hc, Hb, and Ha by displacing the outline H1 of the agricultural field inward by a width (which is obtained by subtracting the overlap-on-headland from the work width of the working device 2 (or the total width of the working device 2) one or more times corresponding to the number of headlands. Then, the area definer 51b defines, as the central area C1, an area (central portion) enclosed by the outline Ha which is the innermost outline.

The area definer 51*b* defines, as the headland area E1, an area in the form of a frame (such an area is "outer frame portion") located outward of the central area C1 and inward of the outline H1 of the agricultural field. The area definer 51*b* defines, as headlands E2*c*, E2*b*, and E2*c*, areas each between adjacent ones of the outline H1 of the agricultural field and the outlines Hc, Hb, and Ha obtained by displacing the outline H1, in the headland area E1. The area definer 51*b* causes the memory 53 to store data of the positions indicative of the areas C1 and E1 (including the headlands E2*c*, E2*b*, and E2*c*) and/or the like.

The route creator 51*c* creates the travel route L1 based on the agricultural field information, the areas C1 and E1, the size information of the agricultural machine 1 and the working device 2, and the working direction, the overlap-on-headland, and the overlap-in-central-portion inputted on the "route creation 2" screen D7. Specifically, the route creator 51*c* first creates unit work sections in the central area C1 from one of the opposite edges (the right edge in drawings such as FIG. 9A) of the central area C1 each extending parallel to the working direction (up-and-down direction in FIG. 9A) such that the unit work sections each have a width obtained by subtracting the overlap-in-central-portion from the work width of the working device 2. The route creator 51*c* then creates a straight route portion L1*a*, along which the traveling vehicle body 3 travels straight, on the widthwise (sideways direction in FIG. 9A) centerline of each unit work section.

Next, the route creator 51*c* creates turn route portions L1*b* each connecting adjacent ones of the straight route portions L1*a* in the headland area E1. Each of the turn route portions L1*b* extends from one of the two adjacent straight route portions L1*a* to the other. The route creator 51*c*, when creating the turn route portions L1*b*, defines, in the headland area E1, a turn space for the agricultural machine 1 and the working device 2 to turn.

Figure 9A:
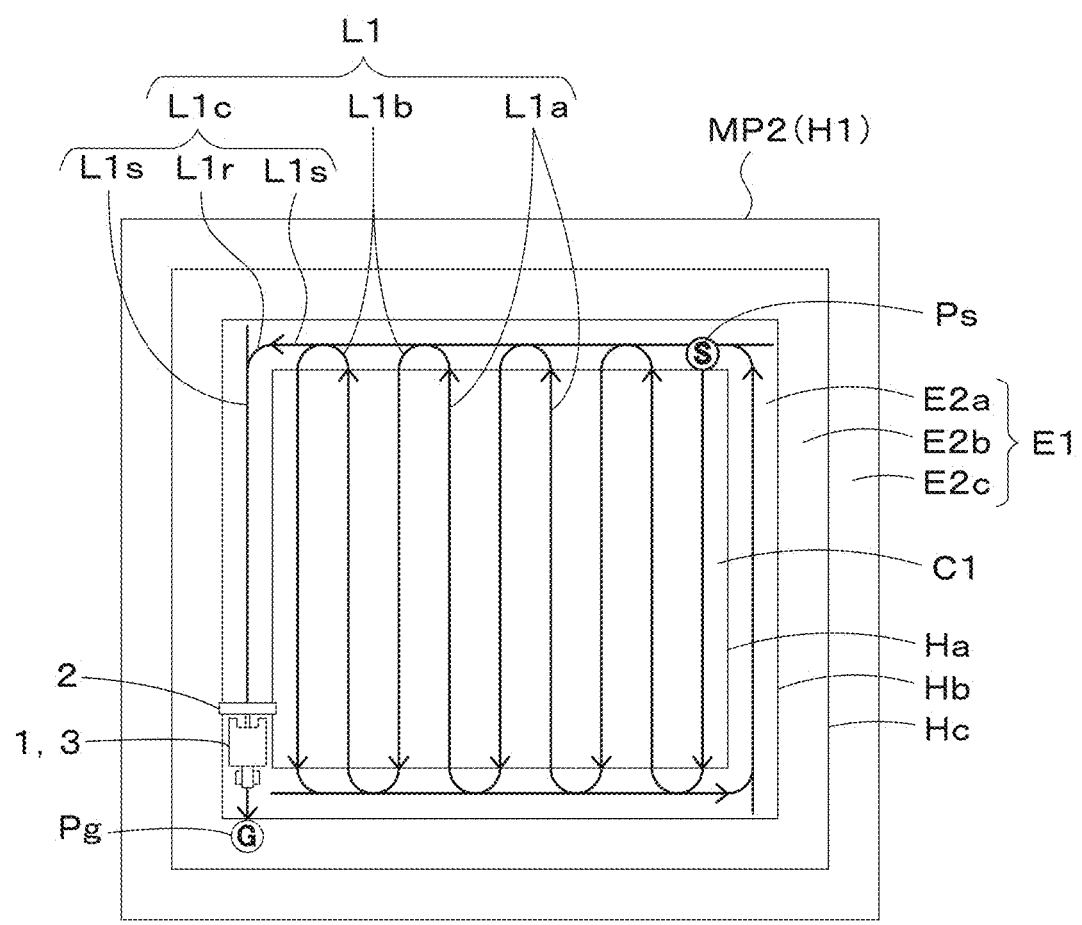
FIG. 9A illustrates an example of a travel route.

The turn route portions L1*b* in the form of a simple semicircle are shown as an example in FIG. 9A for convenience of description, such as for ease of displaying the turn route portions L1*b* on the display screen of the display operation interface 52 and for easy visual recognition of the travel route L1 on the display screen. When the traveling vehicle body 3 of the agricultural machine 1 and the working device 2 actually travel along one of adjacent straight route portions L1*a* and then turn toward the other of the adjacent straight route portions L1*a*, the traveling vehicle body 3 and the like may make multi-point turn or travel rearward in addition to traveling forward, forming a path of a more complex shape than the simple semicircle. That is, the turn route portions L1*b* are for display on the display operation interface 52, and there may be cases in which the agricultural machine 1 does not turn along the turn route portions L1*b*. The route creator 51*c* may create the turn route portions L1*b* in the form different from a semicircle.

The automatic operation controller 61 (FIG. 1) of the agricultural machine 1 causes the lifting device 8 (FIG. 2) to lower the working device 2 to cause the working device 2 to do ground work while causing the traveling vehicle body 3 to travel based on the straight route portions L1*a*. The automatic operation controller 61 causes the lifting device 8 to raise the working device 2 to stop the working device 2 from doing the ground work when causing the traveling vehicle body 3 to turn in an area corresponding to each of the turn route portions L1*b*, i.e., when causing the traveling vehicle body 3 to turn from one of adjacent straight route portions L1*a* toward the other.

That is, the straight route portions L1*a* are work route portions on which ground work is done by the working device 2 while the traveling vehicle body 3 of the agricultural machine 1 is caused to travel in automatic operation. The central area C1 in which the straight route portions L1*a* are created is a work area in which ground work is done by the working device 2 while the traveling vehicle body 3 is caused to travel straight back and forth in automatic operation. Note that the work route portions are not limited to those in the form of a straight line such as the straight route portions L1*a*, and may be curved route portions. It is only necessary that one or more work route portions in the form of a straight line and/or one or more work route portions in the form of a curve be created in the work area.

For example, assume that doing work in the central area C1 is selected via the "automatic work in central area" key B43*a*, doing no work in headland(s) is selected via the "automatic work in headland" key B43*b*, and every-line tillage is selected via the job type key B44 on the "route creation 1" screen D6 in FIG. 7. In such a case, the route creator 51*c* creates the travel route L1 including the straight route portions L1*a* and the turn route portions L1*b*. The route creator 51*c* sets a starting point Ps at the end of one endmost strait route portion L1*a* that is not connected to any turn route portions L1*b* in the central area C1, and sets a goal point Pg at the end of the opposite endmost strait route portion L1*a* in the central area C1. The route creator 51*c* then causes the internal memory to store, as route information, information indicative of the areas C1 and E1, the travel route L1, the starting point Ps, the goal point Pg, and the turn space.

Assume that doing work in the central area C1 is selected via the "automatic work in central area" key B43*a*, doing work in headland(s) is selected via the "automatic work in headland" key B43*b*, and every-line tillage is selected via the job type key B44 on the "route creation 1" screen D6 in FIG. 7. In such a case, the route creator 51*c* creates, in the headland area E1, a go-around route portion L1*c* which extends around the central area C1 in addition to the straight route portions L1*a* and the turn route portions L1*b*, as illustrated in FIG. 9A. For example, in the case where the number of headlands for automatic operation is set to 1 (one) on the "route creation 2" screen D7, the route creator 51*c* creates the go-around route portion L1*c* in the headland E2*a* that is nearest the central area C1 of the one or more headlands E2*a*, E2*b*, and/or E2*c* defined outside the central area C1 by the area definer 51*b*, as illustrated in FIG. 9A.

The go-around route portion L1*c* is a work route portion on which ground work is done by the working device 2 while the traveling vehicle body 3 of the agricultural machine 1 is caused to travel in automatic operation. The go-around route portion L1*c* includes straight route portions L1*s* which are substantially straight and turn route portions L1*r* in the form of a curve with a curvature equal to or greater than a predetermined value. Each of the straight route portions L1*s* is created on the widthwise centerline of the headland E2*a* such that the straight route portions L1*s* correspond to respective straight portions of the outline H2*a* of the central area C1.

Each of the turn route portions L1*r* is a route portion extending from one of adjacent straight route portions L1*s* toward the other. The adjacent straight route portions L1*s* extend in different directions, but the end point of one of the straight route portions L1*s* is connected to the starting point of the other of the straight route portions L1*s* by a turn route portion L1*r*. Also when creating each turn route portion L1*r*, the route creator 51*c* defines, in the headland area E1, a turn space for the traveling vehicle body 3 of the agricultural machine 1 and the working device 2 to turn.

The turn route portions L1$r$ in the form of a simple arc are shown as an example in FIG. 9A for convenience of description. However, when the agricultural machine 1 or the like actually turns from one of adjacent straight route portions L1$s$ toward the other, the agricultural machine 1 or the like may make a multi-point turn or travel rearward in addition to traveling forward, forming a path of a more complex shape than the arc. That is, the turn route portions L1$r$ are for display on the display operation interface 52, and there may be cases in which the agricultural machine 1 does not turn along the turn route portions L1$r$. The route creator 51$c$ may create the turn route portions L1$r$ in the form different from an arc.

The go-around route portion L1$c$ may also include slightly curved portion(s) with a curvature less than the predetermined value (curved route portion(s), not illustrated) in addition to the straight route portions L1$s$ and the turn route portions L1$r$, depending on the shape of the outline H1 of the agricultural field (for example, when the outline H1 of the agricultural field has an irregular shape). In such a case, the automatic operation controller 61 may cause the working device 2 to do ground work while the traveling vehicle body 3 is traveling in automatic operation based on the straight route portions L1$s$ and the slightly curved portion(s) of the go-around route portion L1$c$. That is, the straight route portions L1$s$ and the slightly curved portion(s) are work route portions.

When the automatic operation controller 61 is about to cause the traveling vehicle body 3 to turn in an area corresponding to a turn route portion L1$r$, i.e., when the automatic operation controller 61 is about to cause the traveling vehicle body 3 to turn from one of straight route portions L1$s$ toward the other, the automatic operation controller 61 causes the lifting device 8 to raise the working device 2 to stop the ground work done by the working device 2. Also when the automatic operation controller 61 is about to cause the traveling vehicle body 3 to turn from one of the straight route portions L1$a$ in the central area C1 toward one of the straight route portions L1$s$ in the headland area E1, the automatic operation controller 61 causes the lifting device 8 to raise the working device 2 to stop the ground work done by the working device 2.

The headland E2$a$ in which the go-around route portion L1$c$ is created as described above is a work area in which ground work is done by the working device 2 while the traveling vehicle body 3 travels around the central area C1. For another example, the route creator 51$c$ may create go-around route portions also in the other headlands E2$b$ and E2$c$ located outward of the headland E2$a$. The "route creation 2" screen D7 may include a key used to input the number of headlands in which a go-round route portion is to be created.

The route creator 51$c$ may create a go-around route portion that goes through at least one of the headlands E2$a$, E2$b$, and E2$c$ two or more times. The route creator 51$c$ may create a go-around route portion that goes through each of adjacent headlands. That is, the route creator 51$c$ may create, in the headland area E1, a go-around route portion that goes around the central area C1 one or more times equal to or more than the number of headlands.

After creating the go-around route portion L1$c$, the route creator 51$c$ sets a starting point Ps at the end not connected to any turn route portion L1$b$ (the upper end of the rightmost straight route portion L1$a$ in FIG. 9A) of one of endmost straight route portions L1$a$ (the leftmost and rightmost straight route portions L1$a$ in FIG. 9A) in the central area C1, and connects the go-around route portion L1$c$ to the end of the other of the endmost straight route portions L1$a$ (to the lower end of the leftmost straight route portion L1$a$ in FIG. 8B). The route creator 51$c$ sets a goal point Pg at the end of the go-around route portion L1$c$ that is not connected to any straight route portion L1$a$. The route creator 51$c$ then causes the internal memory to store, as route information, information indicative of the areas C1 and E1, the travel route L1, the starting point Ps, the goal point Pg, and the turn space.

After the route creator 51$c$ creates the travel route L1, the controller 51 causes the route information such as the areas C1 and E1, the travel route L1, the starting point Ps, and the goal point Pg as illustrated in FIG. 9A to be displayed on the "route creation 2" screen D7. The route creator 51$c$ also calculates an estimated work distance over which ground work is done by the working device 2 while the traveling vehicle body 3 is caused to travel based on all the straight route portions L1$a$ and L1$s$. The controller 51 causes the estimated work distance to be displayed on the "route creation 2" screen D7.

Figure 9B:
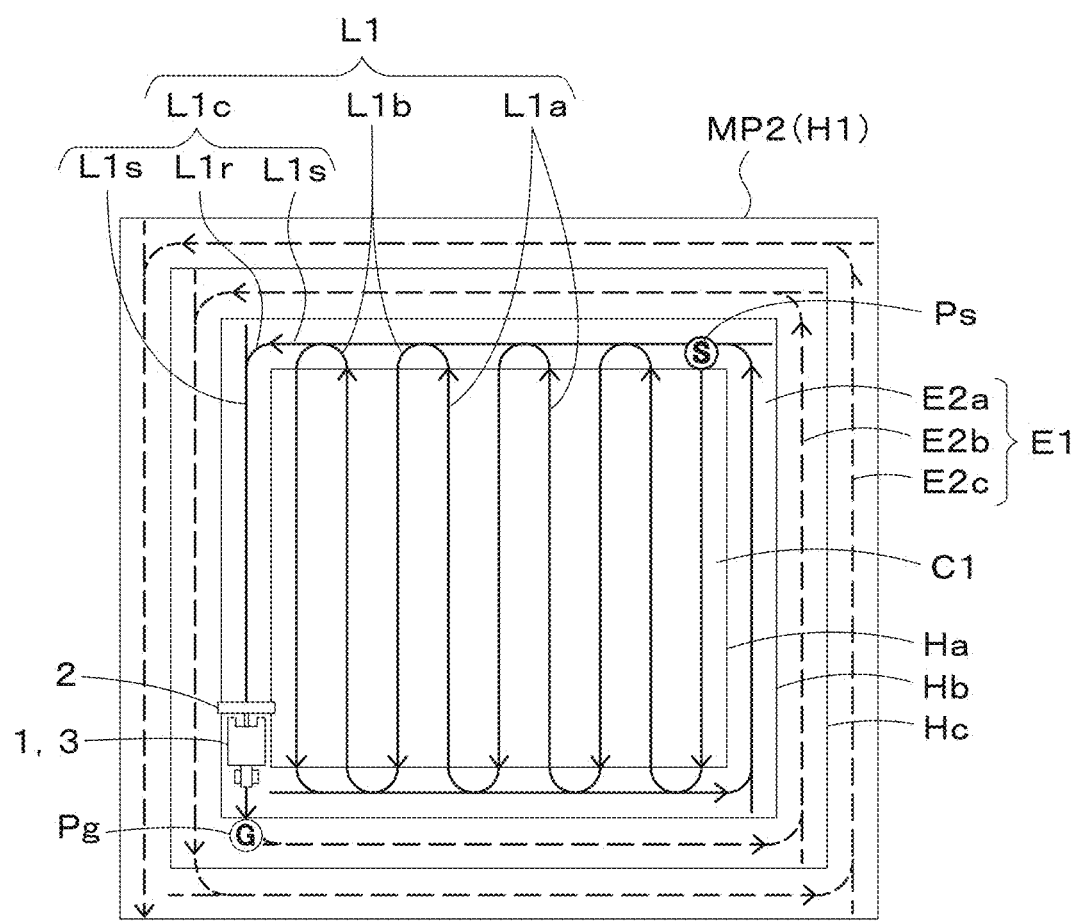
FIG. 9B illustrates an example of a travel route and a manual operation route.

In FIG. 9A, in the headlands E2$b$ and E2$c$ located outward of the headland E2$a$, the agricultural machine 1 is caused to travel by manual operation to cause the working device 2 to perform the agricultural job in order to avoid the collision of the agricultural machine 1 or the working device 2 with a ridge or the like across the boundary of the agricultural field. In such a case, the agricultural machine 1 is caused to travel by manual operation to cause the working device 2 to perform the agricultural job along, for example, the route represented by dashed line in FIG. 9B. Such a manual operation route represented by dashed line in FIG. 9B is continuous from the travel route L1 for automatic operation of the agricultural machine 1. This manual operation route is not displayed on the display operation interface 52 in the present example. However, for another example, the manual operation route may be displayed on the display operation interface 52 together with the travel route L1.

Figure 10A:
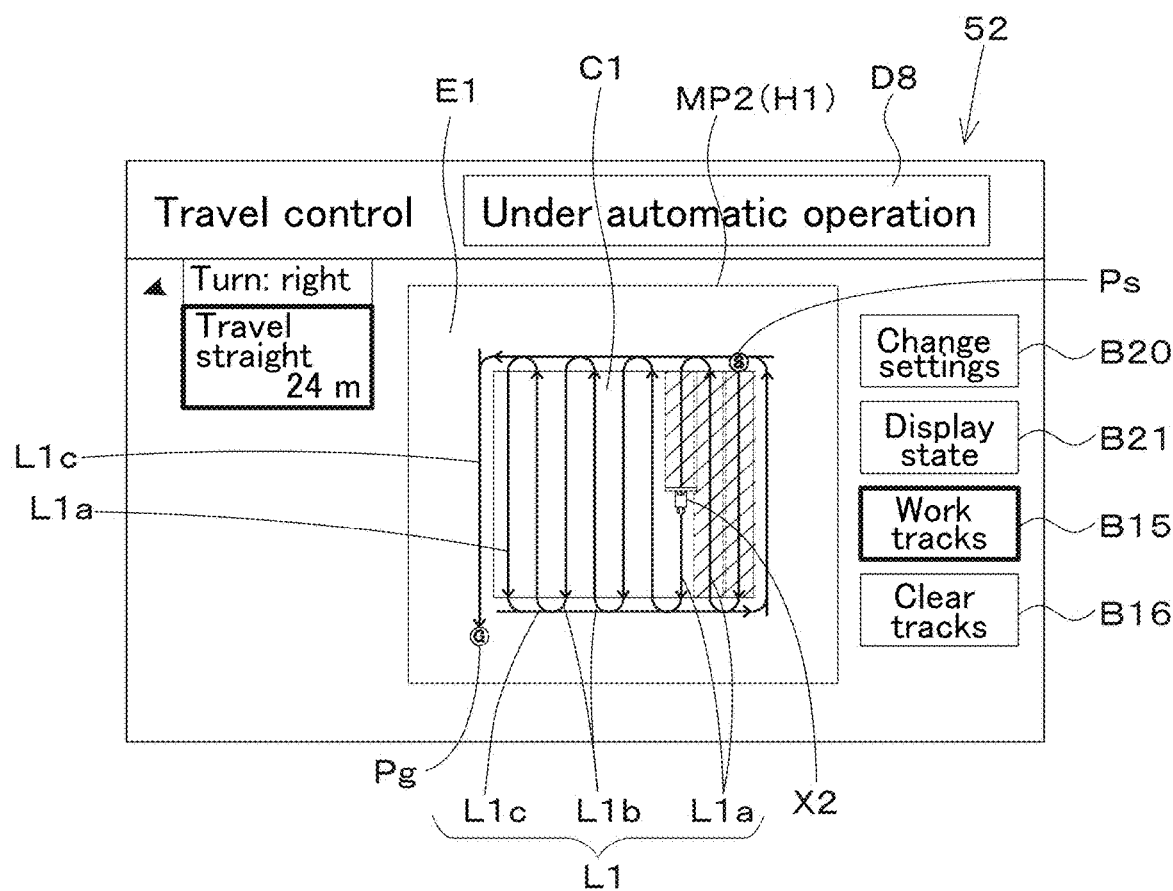
FIG. 10A illustrates an example of a "travel control" screen.

Upon selection of the "next" key B9 by the user after the travel route L1 and the like are displayed on the "route creation 2" screen D7 as illustrated in FIG. 8B, the controller 51 causes the display operation interface 52 to display a "travel control" screen D8 as illustrated in FIG. 10A. The controller 51 generates automatic travel data based on the settings information stored in the internal memory, and transmits (outputs) the automatic travel data to the controller 60 of the agricultural machine 1 via the communicator 54. The automatic travel data includes the route information, the settings information of the agricultural machine 1, the settings information of the working device 2, the automatic operation/work information, and/or the like. The information of the travel route L1 included in the route information in the automatic travel data includes information indicative of the positions of the straight route portions L1$a$ and/or L1$s$ which are work route portions, and does not need to include information indicative of the positions of the turn route portions L1$b$ and/or L1$r$. The settings information of the agricultural machine 1 and the settings information of the working device 2 include size information of the agricultural machine 1 and size information of the working device 2, the category of the agricultural job to be performed by the agricultural machine 1 and/or working device 2, and/or the like.

The "travel control" screen D8 as illustrated in FIG. 10A displays the manner in which the agricultural machine 1 travels and the manner in which the working device 2 performs a job in the automatic traveling-and-working mode. Note that the "travel control" screen D8 in FIG. 10A displays the manner in which the agricultural machine 1 travels and the manner in which a job is performed, after a certain period from the start of the automatic traveling-and-working mode. The "travel control" screen D8 displays the agricultural field map MP2, the travel route L1, the starting point Ps, the goal point Pg, the agricultural machine symbol X2, the manner in which the agricultural machine 1 travels, a "change settings" key B20, a "display state" key B21, a "work tracks" key B15, and a "clear tracks" key B16.

The controller 51 acquires, via the communicator 54, the actual position of the traveling vehicle body 3 detected by the position detector 40 at predetermined intervals, and causes the agricultural machine symbol X2 to be always displayed at the point on the agricultural field map MP2 that corresponds to the actual position of the traveling vehicle body 3. That is, the agricultural machine symbol X2 on the "travel control" screen D8 indicates the actual position of the traveling vehicle body 3 of the agricultural machine 1.

For example, the user manually operates the agricultural machine 1 to move to the starting point Ps while looking at the "travel control" screen D8, and then performs a predetermined operation using the mode switch 65 (FIG. 1) to place the agricultural machine 1 in the automatic traveling-and-working mode. With this, the automatic operation controller 61 (FIG. 1) is brought into the automatic traveling-and-working mode, and causes the working device 2 to do ground work while causing the traveling vehicle body 3 to travel in automatic operation based on the automatic travel data received from the agricultural assistance apparatus 50 and the position of the traveling vehicle body 3 detected by the position detector 40.

Specifically, the automatic operation controller 61 first reads the route information included in the automatic travel data to acquire the areas C1 and E1, the travel route L1 (work route portions L1a and L1s), the starting point Ps, and the goal point Pg. Next, the automatic operation controller 61 causes the working device 2 to do ground work while causing the traveling vehicle body 3 to travel in automatic operation based on the straight route portions L1a of the travel route L1 from the starting point Ps. When the traveling vehicle body 3 (agricultural machine 1) reaches the end point of one of adjacent straight route portions L1a, the automatic operation controller 61 interrupts the ground work done by the working device 2, causes the working device 2 to be raised, and causes the traveling vehicle body 3 to turn toward the starting point of the other of the adjacent route portions L1a. That is, the automatic operation controller 61 causes the agricultural machine 1 and the working device 2 to turn in an area corresponding to a turn route portion L1b. In so doing, the automatic operation controller 61 causes the agricultural machine 1 and the working device 2 to turn based on position information of the areas C1 and E1, position information of the straight route portions L1a, size information of the agricultural machine 1 and the working device 2, the position of the traveling vehicle body 3 detected by the position detector 40, the result of detection by the detector 64, and/or the like.

Next, when the traveling vehicle body 3 reaches the starting point of the other of the adjacent straight route portions L1a, the automatic operation controller 61 causes the working device 2 to be lowered, and resumes the ground work by the working device 2 when causing the traveling vehicle body 3 to start traveling in automatic operation based on the other of the adjacent straight route portions L1a. With this, the traveling vehicle body 3 travels straight back and forth in automatic operation in the central area C1 and ground work is done by the working device 2 on the central area C1.

Then, the automatic operation controller 61 causes the working device 2 to do ground work while causing the traveling vehicle body 3 to travel in automatic operation based on the go-around route portion L1c and the position of the traveling vehicle body 3. In so doing, the automatic operation controller 61 causes the working device 2 to do ground work while causing the traveling vehicle body 3 to travel in automatic operation based on the straight route portions L1s, and, when causing the traveling vehicle body 3 to turn in an area corresponding to a turn route portion L1r, causes the working device 2 to be raised to stop the ground work. The turn is performed in the following manner: the automatic operation controller 61 causes the agricultural machine 1 and the working device 2 to turn based on the position information of the areas C1 and E1, the position information of the straight route portions L1s, the size information of the agricultural machine 1 and the working device 2, the position of the traveling vehicle body 3 detected by the position detector 40, the results of detection by the detector 64, and/or the like. With this, the traveling vehicle body 3 travels around the central area C1 in automatic operation, and the working device 2 does ground work on the headland E2a surrounding the central area C1 (see FIG. 9B).

FIGS. 11A to 11D illustrate automatic steering of the agricultural machine 1. In the automatic traveling-and-working mode, the automatic operation controller 61 calculates the deviation of the position of the traveling vehicle body 3 detected by the position detector 40 from the travel route L1 (work route portions L1a and L1s), while causing the traveling vehicle body 3 to travel automatically. If the deviation is less than a threshold (for example, FIG. 11A), the automatic operation controller 61 maintains the angle of rotation of the steering shaft 31 (FIG. 1). If the deviation of the position of the traveling vehicle body 3 from the travel route L1 is equal to or more than the threshold and the traveling vehicle body 3 is positioned leftward of the travel route L1 (for example, FIG. 11B), the automatic operation controller 61 rotates the steering shaft 31 so that the traveling vehicle body 3 is steered right. If the deviation of the position of the traveling vehicle body 3 from the travel route L1 is equal to or more than the threshold and the traveling vehicle body 3 is positioned rightward of the travel route L1 (for example, FIG. 11C), the automatic operation controller 61 rotates the steering shaft 31 so that the traveling vehicle body 3 is steered left.

Figure 11A:
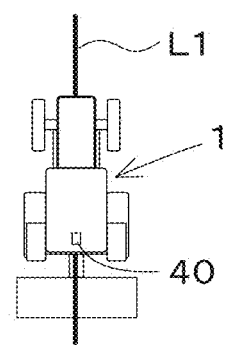
FIG. 11A is an illustration of automatic operation of an agricultural machine.
Figure 11B:
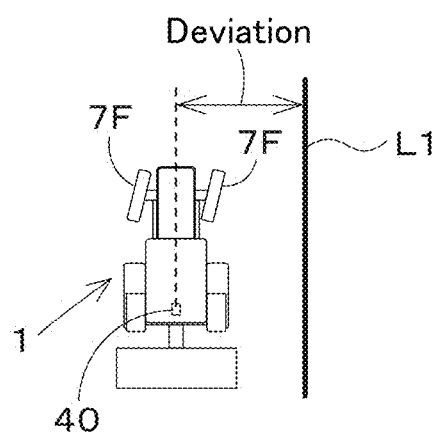
FIG. 11B is an illustration of the automatic operation of the agricultural machine.
Figure 11C:
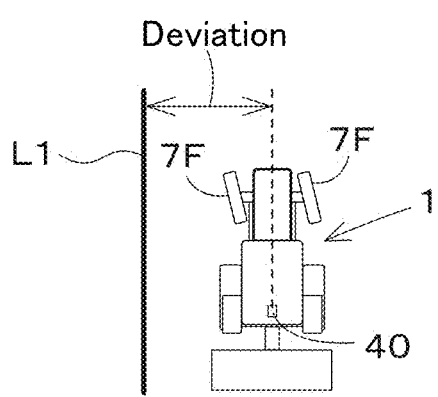
FIG. 11C is an illustration of the automatic operation of the agricultural machine.
Figure 11D:
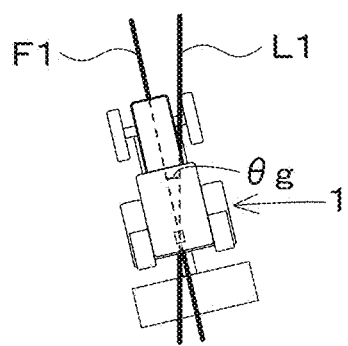
FIG. 11D is an illustration of the automatic operation of the agricultural machine.

The steering angle of (the steering angle achieved by) the steering unit 29 is changed based on the deviation of the position of the traveling vehicle body 3 from the travel route L1 in the above example. Note, however, that, for another example, the steering angle of the steering unit 29 may be changed based on the angle θg of the direction-of-travel F1 of the traveling vehicle body 3 to the travel route L1 as illustrated in FIG. 11D. In such a case, for example, the automatic operation controller 61 calculates the direction-of-travel F1 of the traveling vehicle body 3 from changes in position of the traveling vehicle body 3, and calculates the angle θg of the direction-of-travel F1 to the travel route LL. If the angle θg is equal to or greater than a threshold, the automatic operation controller 61 rotates the steering shaft 31 so that the direction-of-travel F1 of the traveling vehicle body 3 matches the direction of the travel route L1 (i.e., so that the angle θg is zero degrees).

For another example, the automatic operation controller 61 may calculate a first steering angle based on the deviation of the position of the traveling vehicle body 3 from the travel route L1 and calculate a second steering angle based on the travel route L1 and the direction-of-travel F1 of the traveling vehicle body 3. The automatic operation controller 61 may then calculate a third steering angle based on the first steering angle and the second steering angle and rotate the steering shaft 31 based on the third steering angle.

The automatic operation controller 61 calculates the actual vehicle speed of the traveling vehicle body 3 based on changes in position of the traveling vehicle body 3 while the automatic operation controller 61 is causing the traveling vehicle body 3 to travel automatically based on the travel route L1. The automatic operation controller 61 then controls the driving of the transmission 5, the brake 6, and the prime mover 4 so that the actual vehicle speed matches the vehicle speed associated with a corresponding one of the straight route portions L1a, the turn route portions L1b, and the go-around route portion L1c.

As has been discussed, when the agricultural machine 1 is in the automatic traveling-and-working mode, the automatic operation controller 61 automatically steers the traveling vehicle body 3 while automatically changing the travel speed of the traveling vehicle body 3 based on the travel route L1 and the position of the traveling vehicle body 3 (agricultural machine 1). The automatic operation controller 61 also automatically causes the working device 2 to perform an agricultural job (ground work) and stop the agricultural job (ground work). The automatic operation controller 61 controls the heightwise position of the working device 2 using the lifting device 8 during the automatic operation of the agricultural machine 1. While the agricultural machine 1 is being manually operated, the heightwise position of the working device 2 may be controlled by the automatic operation controller 61 using the lifting device 8 and may be changed by the user (driver) operating a switch of the manual operator 62 (FIG. 1).

Figure 12A:
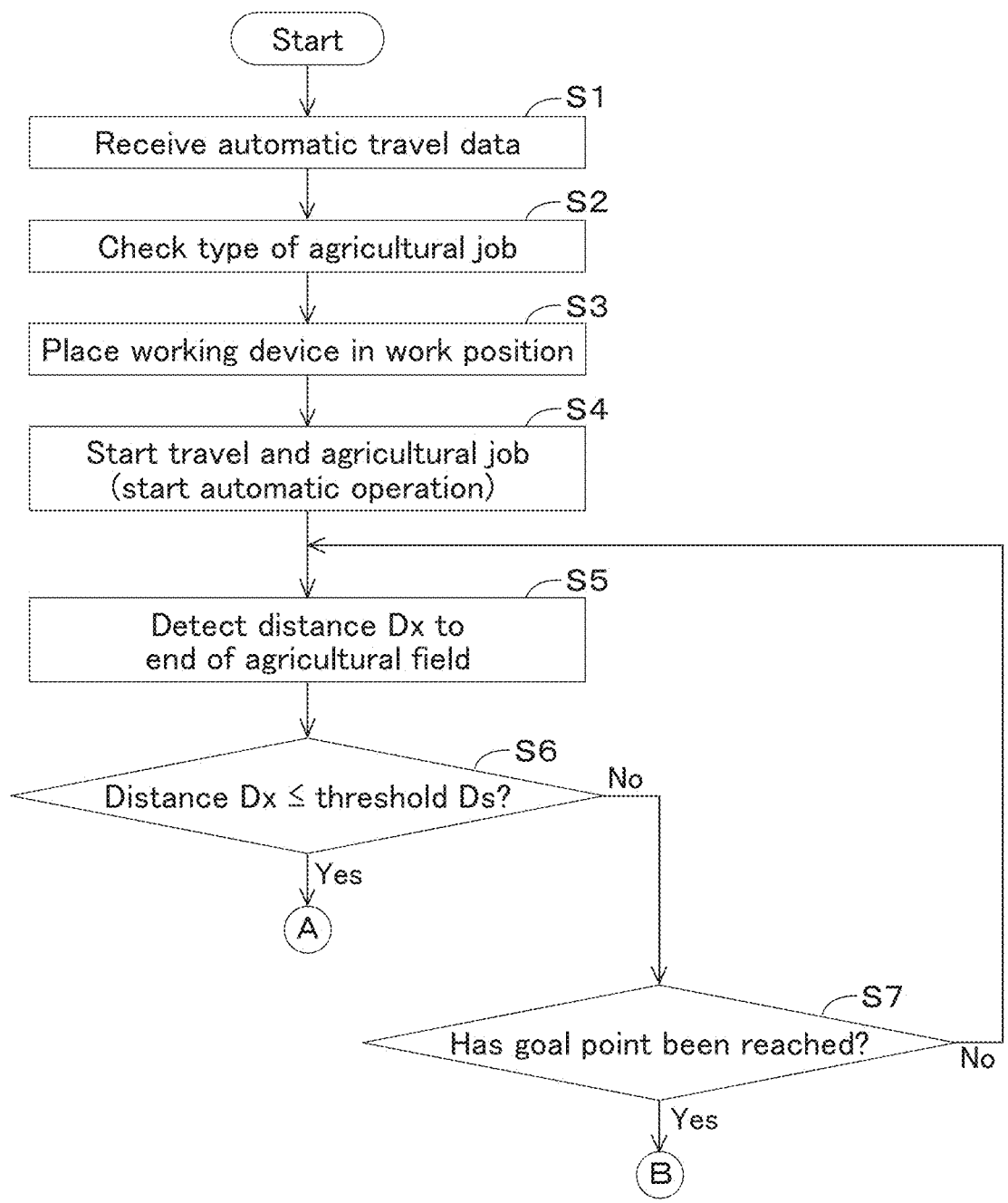
FIG. 12A is a flowchart showing an example of operation of an agricultural machine.
Figure 12B:
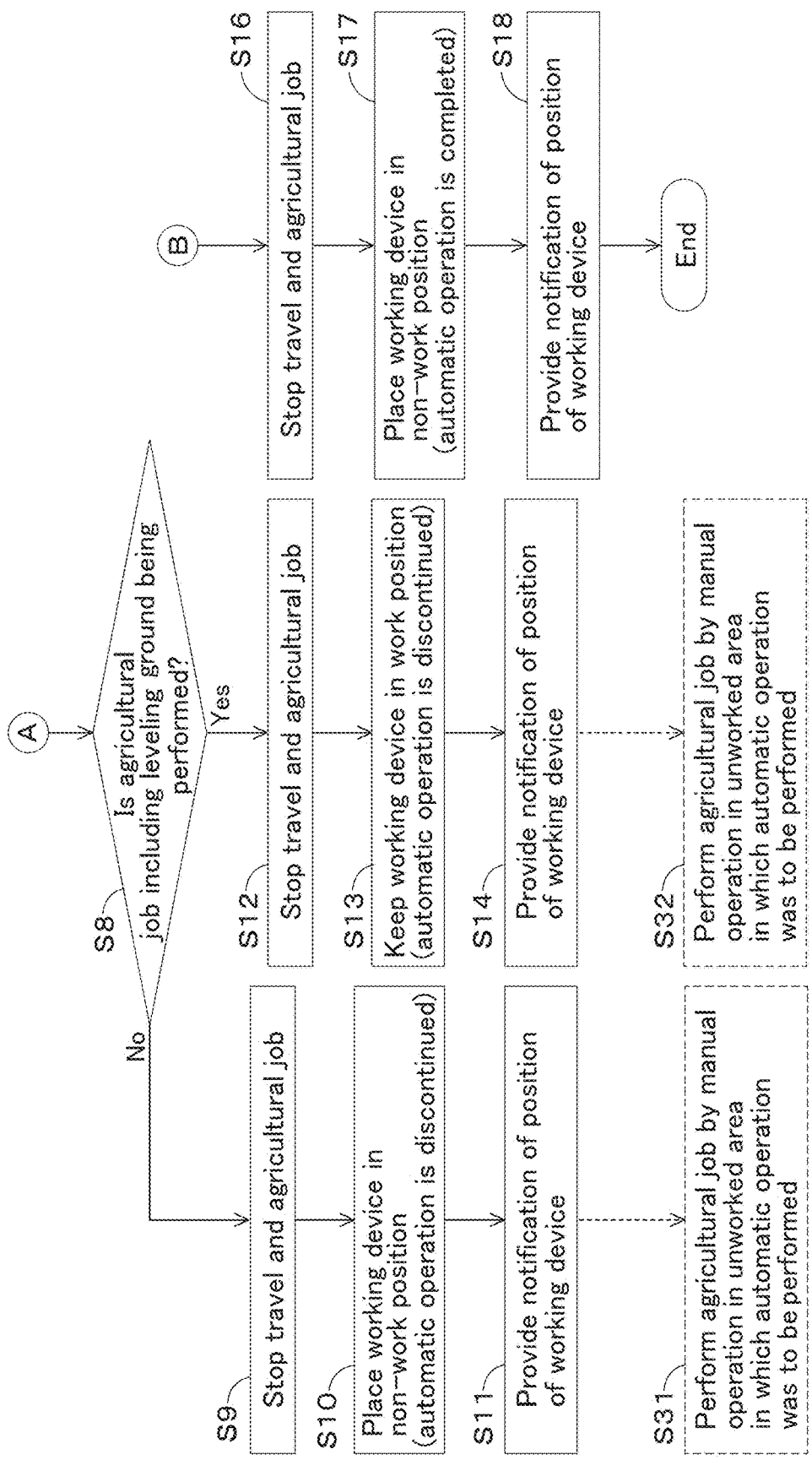
FIG. 12B is a flowchart continuing from FIG. 12A.

FIGS. 12A and 12B are flowcharts showing an example of operation of the agricultural machine 1. In the agricultural machine 1, upon receipt of automatic travel data from the communicator 54 of the agricultural assistance apparatus 50 (S1 in FIG. 12A), the automatic operation controller 61 checks (reads) the category of the agricultural job included in the automatic travel data (S2). In so doing, the automatic operation controller 61 may detect the category of the agricultural job performed by the working device 2 based on the category of the working device 2 included in the automatic travel data. Next, the automatic operation controller 61 causes, according to the checked category of the agricultural job, the lifting device 8 to place the working device 2 in a predetermined work position P1, P3, or P5 in which the working device 2 performs the agricultural job (S3).

Figure 19A:
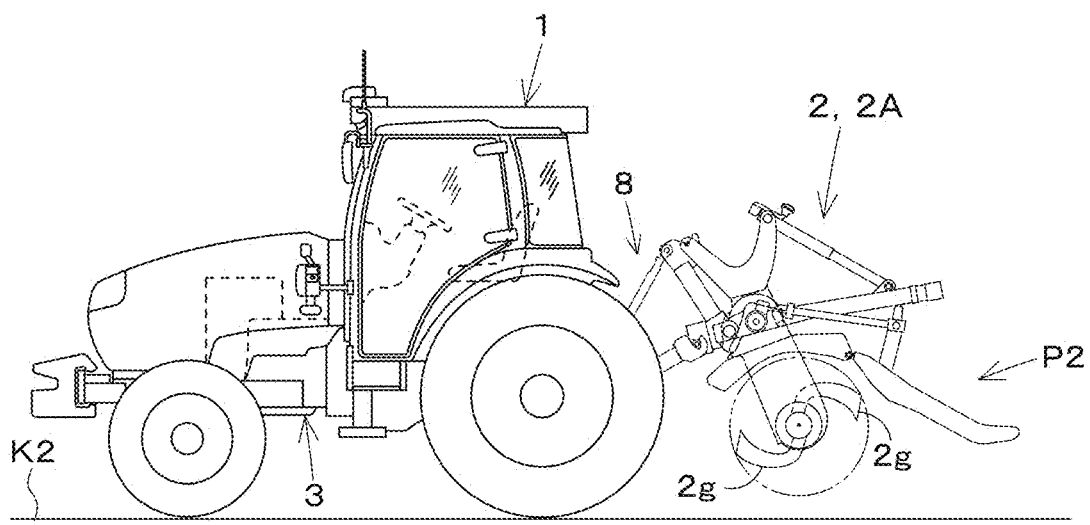
FIG. 19A illustrates an example of a non-work position of a tiller.
Figure 19B:
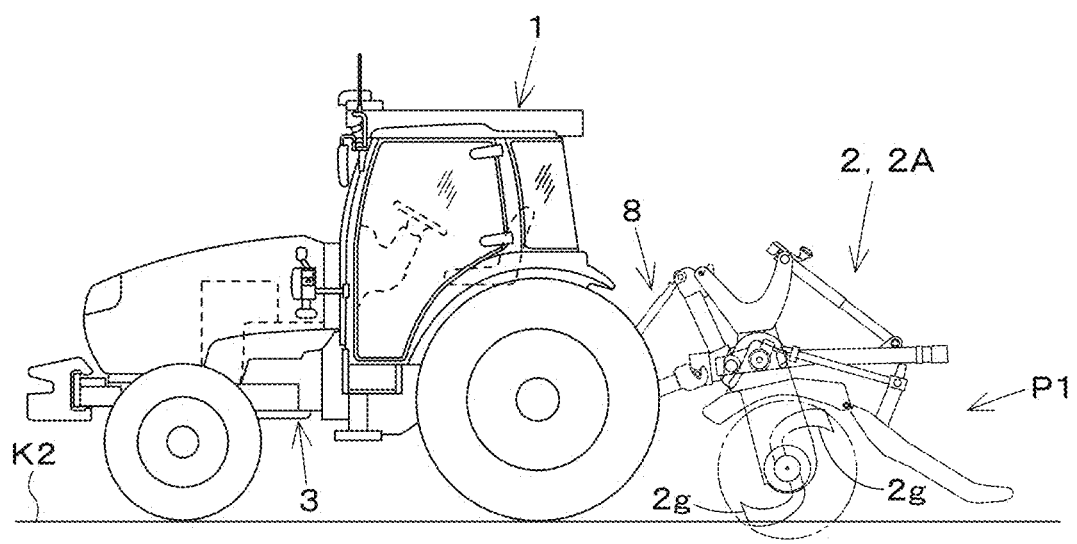
FIG. 19B illustrates an example of a work position of the tiller.

For example, in the case where the agricultural job is a tillage job including leveling (making flat, smooth, or even) the agricultural field and the working device 2 linked to the agricultural machine 1 is a tiller 2A as illustrated in FIG. 19A, the automatic operation controller 61 causes the lifting device 8 to lower the tiller 2A to place the tiller 2A in a work position P1 in which tillage tines 2g of the tiller 2A contact soil K2 in the agricultural field and are able to perform the tillage job, as illustrated in FIG. 19B. When, for example, the tiller 2A is to be carried, the automatic operation controller 61 causes the lifting device 8 to raise the tiller 2A to place the tiller 2A in a non-work position P2 in which the tillage tines 2g are separated from the soil K2 in the agricultural field and are not able to perform the tillage job, as illustrated in FIG. 19A.

For example, also in cases of an agricultural job including leveling the agricultural field other than tillage such as puddling or making ridges/furrows, the automatic operation controller 61 causes the lifting device 8 to lower the working device 2 for such an agricultural job (such as a puddler or a lister) to place the working device 2 in the work position in which the working device 2 contacts the soil K2 in the agricultural field, and causes the lifting device 8 to raise the working device 2 to place the working device 2 in the non-work position in which the working device 2 is separated from the soil K2 in the agricultural field. The tillage job, the puddling job, and the job to make ridges/furrows each including leveling the agricultural field are examples of a "first agricultural job" in one or more preferred embodiments of the present invention, whereas the tiller 2A, the puddler, and the lister for such agricultural jobs are examples of a "first working device" in one or more preferred embodiments of the present invention.

Figure 20:
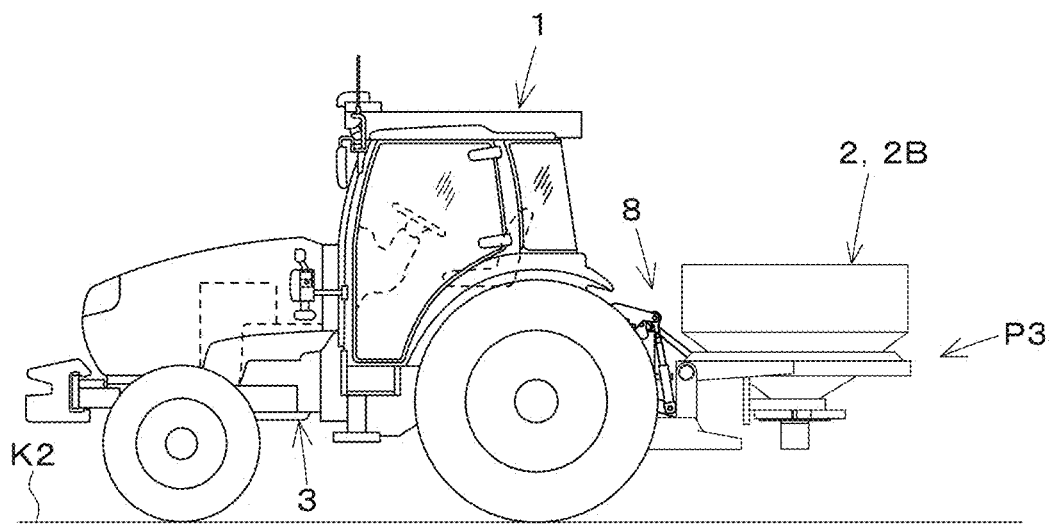
FIG. 20 illustrates a work position and a non-work position of a spreader.

In contrast, for example, in the case where the agricultural job is a job to spread fertilizer, an agricultural chemical, and/or the like and the working device 2 linked to the agricultural machine 1 is a spreader 2B as illustrated in FIG. 20, the automatic operation controller 61 causes the lifting device 8 to place the spreader 2B in a predetermined position P3 in which the spreader 2B is separated from the soil K2 in the agricultural field both when the spreading job is performed and when the spreading job is not performed. That is, in the example in FIG. 20, the work position P3 in which the spreader 2B performs the spreading job and the non-work position P3 in which the spreader 2B does not perform the spreading work are the same position and are at the same height from the soil K2. For another example, the work position and the non-work position of the spreader 2B may be different from each other.

Figure 21A:
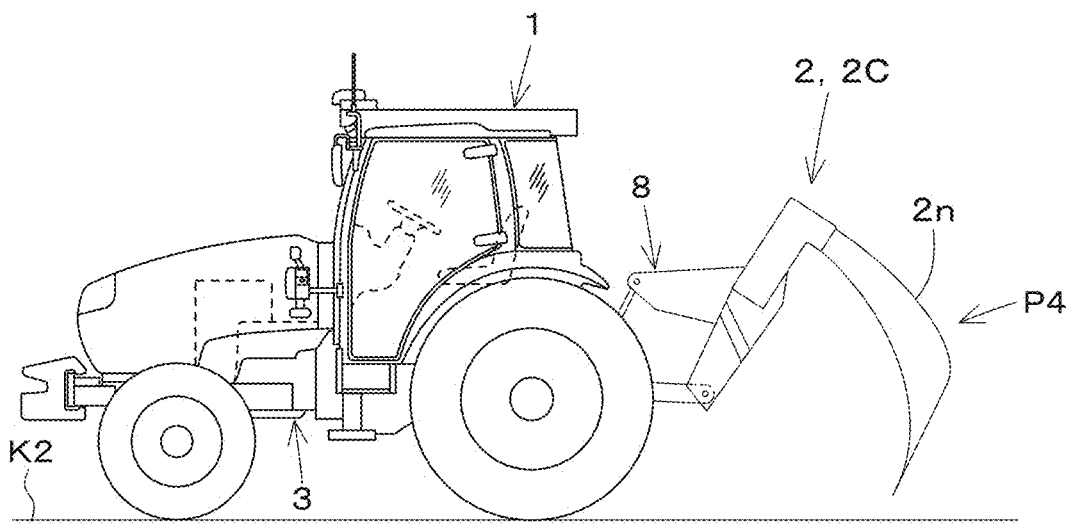
FIG. 21A illustrates an example of a non-work position of a stubble cultivator.
Figure 21B:
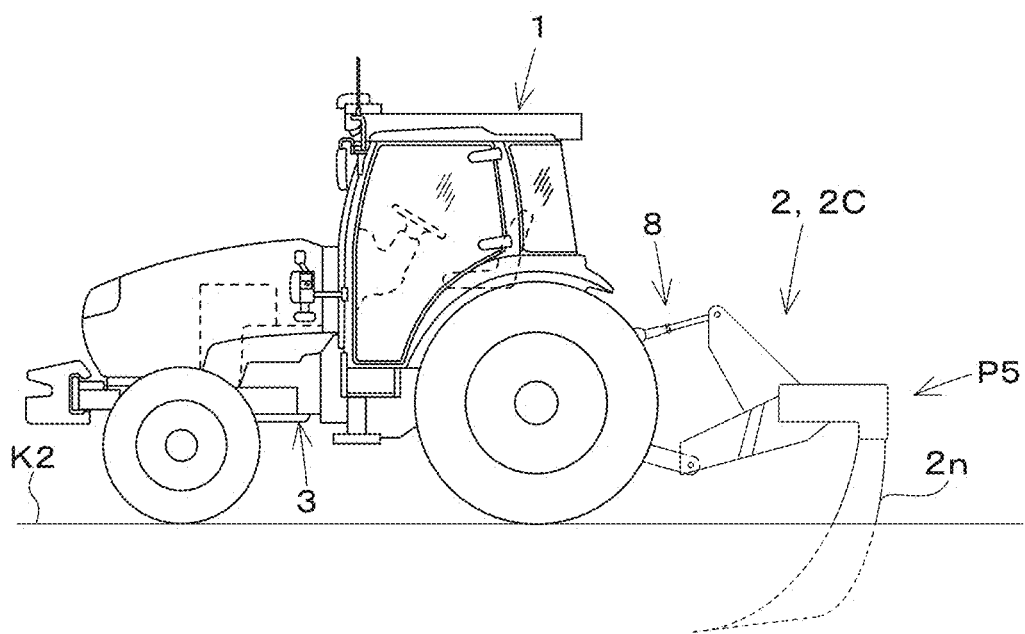
FIG. 21B illustrates an example of a work position of the stubble cultivator.

In the case where the agricultural job is a stubble cultivation job and the working device 2 linked to the agricultural machine 1 is a stubble cultivator 2C as illustrated in FIG. 21A, the automatic operation controller 61 causes the lifting device 8 to lower the stubble cultivator 2C to place the stubble cultivator 2C in a work position P5 in which work tines 2n of the stubble cultivator 2C contact the soil K2 and are able to perform the stubble cultivation job as illustrated in FIG. 21B. When, for example, the stubble cultivator 2C is to be carried, the automatic operation controller 61 causes the lifting device 8 to raise the stubble cultivator 2C to place the stubble cultivator 2C in a non-work position P4 in which the work tines 2n are separated from the soil K2 and are not able to perform the stubble cultivation job as illustrated in FIG. 21A.

The spreading job and the stubble cultivation job are agricultural jobs not including leveling the agricultural field. Also in cases of an agricultural job not including leveling the agricultural filed other than the spreading job and the stubble cultivation job, such as a seeding job and a watering job, the automatic operation controller 61 causes the lifting device 8 to place the working device 2 for such an agricultural job (such as a seeder or a water sprinkler) in predetermined position(s) (work position and non-work position) in which the working device 2 is separated from the soil K2 in the agricultural field. The spreading job, the stubble cultivation job, the seeding job, and the watering job each not including leveling the agricultural filed are examples of a "second agricultural job" in one or more preferred embodiments of the present invention, whereas the spreader 2B, the stubble cultivator 2C, the seeder, and the water sprinkler for such agricultural jobs are examples of a "second working device" in one or more preferred embodiments of the present invention.

After the automatic operation controller 61 places the working device 2 in the work position P1 (S3 in FIG. 12A) as described above, the automatic operation controller 61 starts to cause the agricultural machine 1 (traveling vehicle body 3) to travel and cause the working device 2 to perform the agricultural job at the starting point Ps (in drawings such as FIG. 9A) based on the travel route L1 (work route portions L1a, L1s) and/or the like included in the automatic travel data and on the position of the agricultural machine 1 (traveling vehicle body 3) detected by the position detector 40 (S4). That is, the automatic operation controller 61 starts the automatic operation of the agricultural machine 1. With this, in the example in FIG. 9A, the automatic operation controller 61 causes the working device 2 to perform the agricultural job while causing the agricultural machine 1 to travel along the work route portions L1a in the central area C1 from the starting point Ps, and then causes the working device 2 to perform the agricultural job while causing the agricultural machine 1 to travel along the work route portions L1s in the headland E2a which is the innermost headland surrounding the central area C1.

Figure 14A:
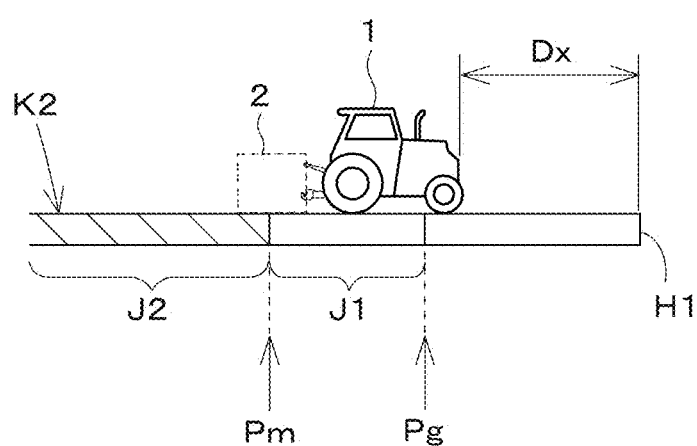
FIG. 14A illustrates an example of the state of a working device and the state of an agricultural field after automatic operation is discontinued.

During the automatic operation of the agricultural machine 1, the automatic operation controller 61 causes the detector 64 to detect a distance Dx from the agricultural machine 1 (traveling vehicle body 3) to an end of the agricultural field in the direction of travel of the agricultural machine 1 (S5 in FIG. 12A, see FIG. 14A). In so doing, the detector 64 detects the distance Dx from the traveling vehicle body 3 to the outline H1 of the agricultural field in the direction of travel of the traveling vehicle body 3 based on, for example, the outline of the headland area E1 and the position of the agricultural machine 1 (traveling vehicle body 3) detected by the position detector 40.

Alternatively, for example, the detector 64 detects the distance Dx from the traveling vehicle body 3 to an object such as a ridge defining the end of the agricultural field in the direction of travel of the traveling vehicle body 3 using an object detector 64a, a laser sensor, and/or the like. The automatic operation controller 61 compares the distance Dx detected by the detector 64 and a predetermined threshold Ds. The threshold Ds is, for example, the distance traveled by the traveling vehicle body 3 from when the travel of the agricultural machine 1 in automatic operation is stopped (braked by the brake 6) to when the traveling vehicle body 3 makes a complete stop (i.e., braking distance) or the distance within which objects are detectable by the object detector 64a (FIG. 1) in the direction of travel of the agricultural machine 1.

If the distance Dx from the agricultural machine 1 to the end of the agricultural field is greater than the threshold Ds (NO in S6), the automatic operation controller 61 determines whether or not the agricultural machine 1 and the working device 2 have reached the goal point Pg (in drawings such as FIG. 9A). If the agricultural machine 1 and the working device 2 have not reached the goal point Pg (NO in S7), the automatic operation controller 61 calculates the distance Dx from the agricultural machine 1 to the end of the agricultural field again (S5), and compares the distance Dx with the threshold Ds.

If the distance Dx from the agricultural machine 1 to the end of the agricultural field is equal to or less than the threshold Ds (YES in S6), the automatic operation controller 61 stops the travel of the agricultural machine 1 and the agricultural job performed by the working device 2 (S9) if an agricultural job not including leveling the agricultural field (second agricultural job) is performed (NO in S8 in FIG. 12B). It is noted here that, because the agricultural machine 1 (traveling vehicle body 3) or the working device 2 has not reached the goal point Pg of the automatic operation, the location at which the agricultural machine 1 has stopped is a location short of an unworked area in which the agricultural job was supposed to be performed by the automatic operation of the agricultural machine 1 in the agricultural filed (i.e. an unworked area which is included in the agricultural field and in which automatic operation was to be performed). Next, the automatic operation controller 61 causes the lifting device 8 to place the working device 2 in the non-work position P3 or P4 (S10). Thus, the automatic operation of the agricultural machine 1 is discontinued (terminated). It is noted here that when the working device 2 is, for example, the spreader 2B (FIG. 20), the non-work position P3 and the work position P3 are the same position separated from the soil K2 in the agricultural field, and therefore the automatic operation controller 61 causes the lifting device 8 to keep the working device 2 in the non-work position P3 (FIG. 20).

In the case where the working device 2 is, for example, the stubble cultivator 2C (FIG. 21A and FIG. 21B), because the stubble cultivation job performed by the stubble cultivator 2C is an agricultural job not including leveling the agricultural field, the automatic operation controller 61 causes the lifting device 8 to lower the stubble cultivator 2C to place the stubble cultivator 2C in the work position P5 in which the work tines 2n of the stubble cultivator 2C contact the soil K2 in the agricultural field in step S3 in FIG. 12A (FIG. 21B). Next, after the automatic operation controller 61 performs steps S4 to S6 in FIG. 12A and steps S8 and S9 in FIG. 12B, the automatic operation controller 61 causes the lifting device 8 to raise the stubble cultivator 2C to place the stubble cultivator 2C in the non-work position P4 in which the work tines 2n are separated from the soil K2 in step S10 (FIG. 21A).

Figure 10B:
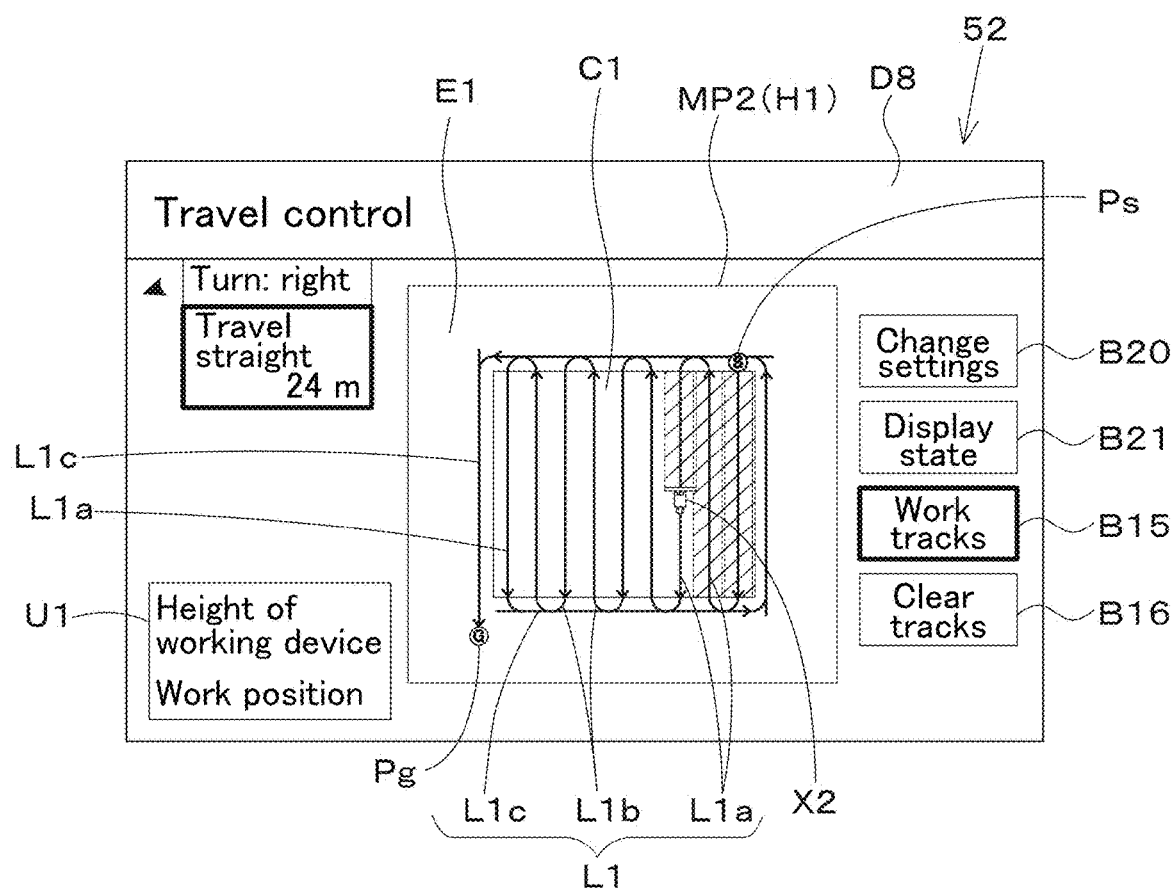
FIG. 10B illustrates an example of a notification displayed on the "travel control" screen.
Figure 10C:
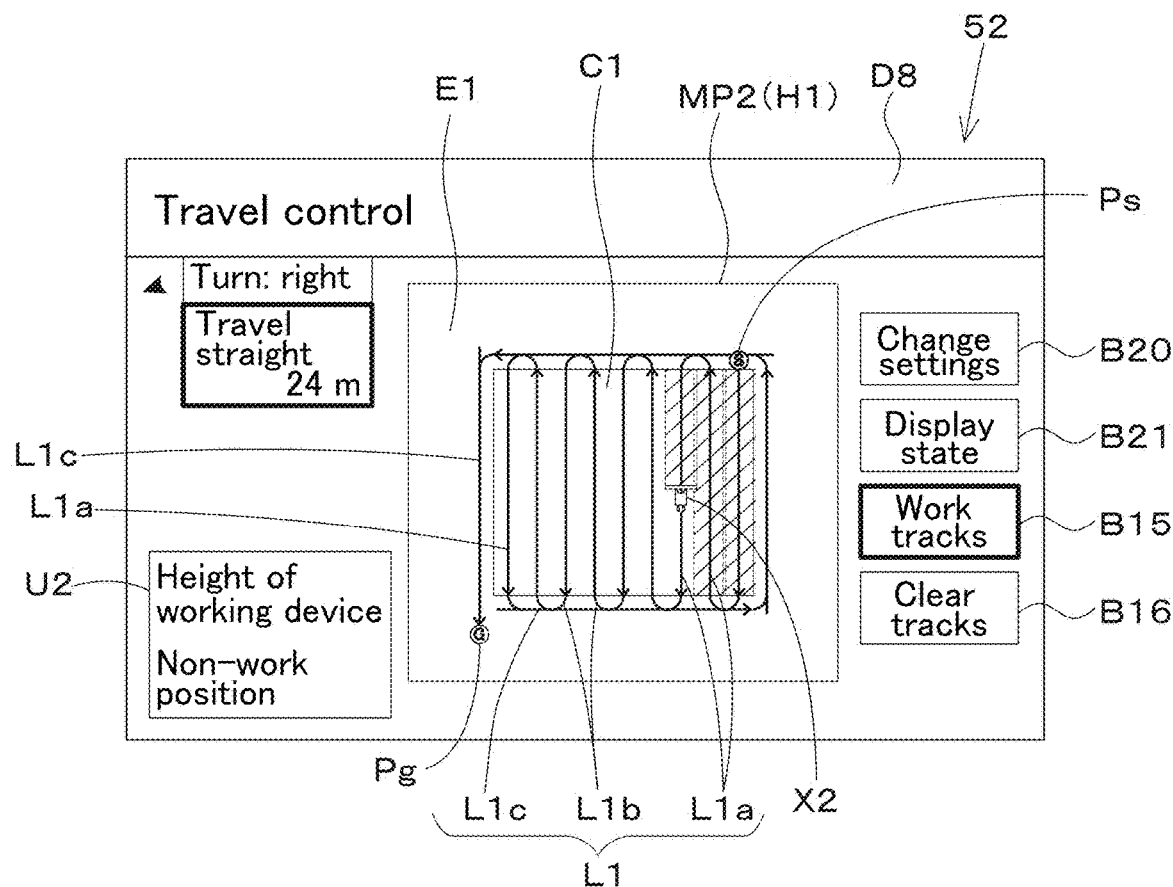
FIG. 10C illustrates an example of a notification displayed on the "travel control" screen.

After step S10 in FIG. 12B, the automatic operation controller 61 causes the notifier 51g to provide a notification indicating that the working device 2 is in the non-work position P3 or P4 (S11). It is noted here that, for example, as illustrated in FIG. 10C, the notifier 51g causes the display operation interface 52 to display, on the "travel control" screen D8, a notification U2 indicating that the working device 2 is in the non-work position P3 or P4.

In the case where, as described above, the automatic operation of the agricultural machine 1 is discontinued with the working device 2 (which is a second working device such as a spreader having performed a second agricultural job not including leveling the agricultural field such as a spreading job) in the non-work position P3 or P4, the user thereafter operates the manual operator 62 (FIG. 1) to cause the lifting device 8 to place the working device 2 in the work position P3 or P5 or the automatic operation controller 61 thereafter automatically causes the lifting device 8 to place the working device 2 in the work position P3 or P5. Next, the user manually operates the agricultural machine 1 using the manual operator 62 to cause the agricultural machine 1 (traveling vehicle body 3) to travel while causing the working device 2 to perform the agricultural job on the unworked area which is included in the agricultural field and in which the automatic operation was to be performed (S31). That is, after the working device 2 is placed in the work position P3 or P5, the user manually operates the agricultural machine 1 to cause the working device 2 to perform the agricultural job on the unworked area which is included in the agricultural field and in which the automatic operation was to be performed (the remainder of the innermost headland E2a in FIG. 9A).

When the distance Dx from the agricultural machine 1 to the end of the agricultural field is equal to or less than the threshold Ds (YES in S6 in FIG. 12A), if an agricultural job including leveling the agricultural field (first agricultural job) is being performed (YES in S8 in FIG. 12B), the automatic operation controller 61 stops the travel of the agricultural machine 1 and the agricultural job performed by the working device 2 (S12). Also in such a case, the location at which the agricultural machine 1 or the working device 2 has stopped is a location short of an unworked area which is included in the agricultural field and in which the automatic operation was to be performed. However, the automatic operation controller 61 causes the lifting device 8 to keep the working device 2 in the work position P1 (S13). Thus, the automatic operation of the agricultural machine 1 is discontinued. The automatic operation controller 61 causes the notifier 51g to provide a notification indicating that the working device 2 is in the work position P1 (S14). It is noted here that, for example, as illustrated in FIG. 10B, the notifier 51g causes the display operation interface 52 to display, on the "travel control" screen D8, a notification U1 indicating that the working device 2 is in the work position P1.

In the case where, as described above, the automatic operation of the agricultural machine 1 is discontinued with the working device 2 (which is a first working device such as a tiller having performed a first agricultural job including leveling the agricultural field such as a tillage job) in the work position P1, the user immediately thereafter manually operates, using the manual operator 62, the agricultural machine 1 to travel while causing the working device 2 to perform the agricultural job on the unworked area which is included in the agricultural field and in which the automatic operation was to be performed (S32). That is, without raising or lowering the working device 2 by the lifting device 8, the user manually operates the agricultural machine 1 to cause the working device 2 to perform the agricultural job on the unworked area which is included in the agricultural field and in which the automatic operation was to be performed (the remainder of the innermost headland E2a in FIGS. 9A and 9B).

On the contrary, if the agricultural machine 1 and the working device 2 reach the goal point Pg (YES in S7) before the distance Dx from the agricultural machine 1 to the end of the agricultural field becomes equal to or less than the threshold Ds (NO in S6 in FIG. 12A), the automatic operation controller 61 stops the travel of the agricultural machine 1 and the agricultural job performed by the working device 2 (S16). In such a case, because the unworked area in which the automatic operation was to be performed does not exist anymore in the agricultural field, the automatic operation controller 61 causes the lifting device 8 to place the working device 2 in the non-work position P2, P3, or P4 (S17). Thus, the automatic operation of the agricultural machine 1 is completed (ended entirely).

Next, the automatic operation controller 61 causes the notifier 51g and the display operation interface 52 to provide a notification indicating that the working device 2 is in the non-work position P2, P3, or P4 (S18 in FIG. 12B). In so doing, for example, as illustrated in FIG. 10C, the notifier 51g causes the display operation interface 52 to display, on the "travel control" screen D8, the notification U2 indicating that the working device 2 is in the non-work position P2, P3, or P4. Then, because the unworked area in which the automatic operation was to be performed does not exist anymore in the agricultural field, the agricultural job on the agricultural field is ended. Alternatively, in the case where there is an unworked area in which the automatic operation is not to be performed (headlands E2b and E2c in the examples in FIGS. 9A and 9B) in the agricultural field, the user may manually operate the agricultural machine 1 and the working device 2 to perform the agricultural job on the unworked area in which the automatic operation is not to be performed.

Figure 13A:
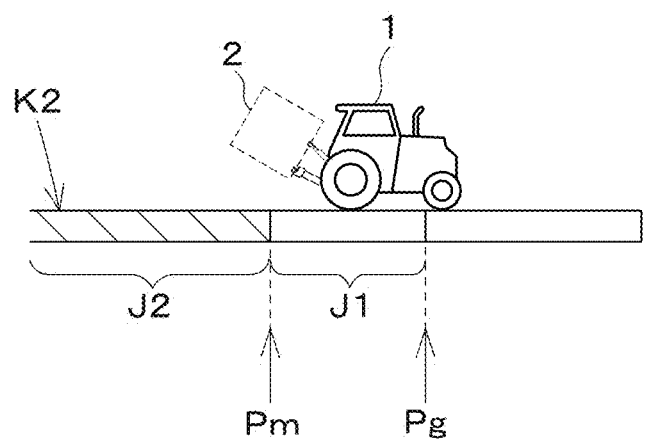
FIG. 13A illustrates an example of the state of a working device and the state of an agricultural field after automatic operation of a known agricultural machine is discontinued.
Figure 13B:
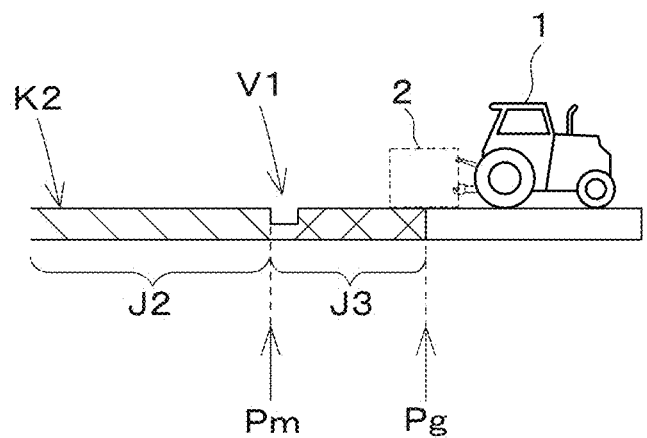
FIG. 13B illustrates an example of the state of the working device and the state of the agricultural field after the agricultural job is resumed by the known agricultural machine by manual operation.
Figure 14B:
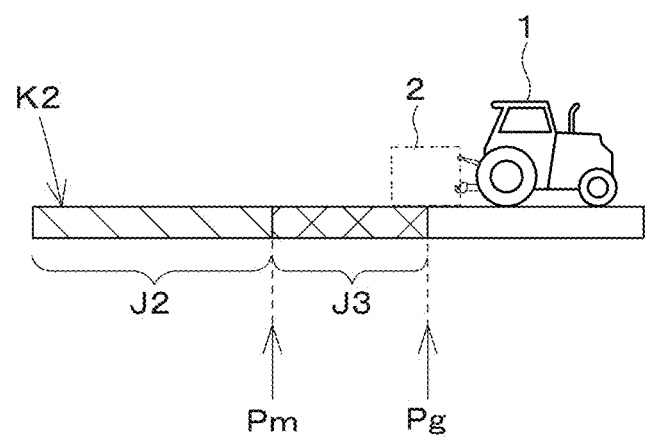
FIG. 14B illustrates an example of the state of the working device and the state of the agricultural field after the agricultural job is resumed by manual operation.
Figure 15:
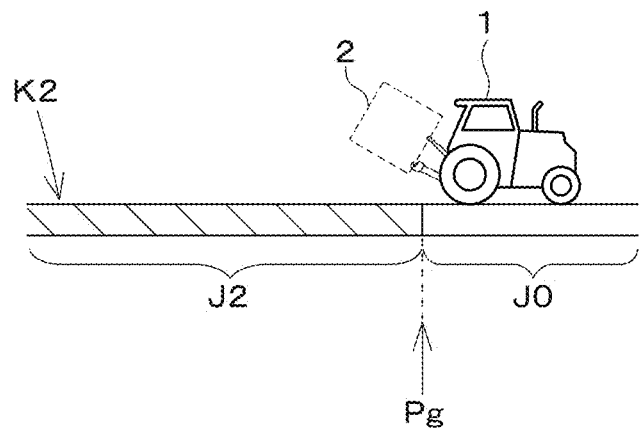
FIG. 15 illustrates an example of the state of the working device and the state of the agricultural field after the automatic operation is completed.

FIG. 13A illustrates an example of the state of the working device 2 and the state of the agricultural field after automatic operation of a known agricultural machine 1 is discontinued. FIG. 13B illustrates an example of the state of the working device 2 and the state of the agricultural field after the agricultural job is resumed by the known agricultural machine 1 by manual operation. FIG. 14A illustrates an example of the state of the working device 2 and the state of the agricultural field after the automatic operation of the agricultural machine 1 is discontinued. FIG. 14B illustrates an example of the state of the working device 2 and the state of the agricultural field after the agricultural job is resumed by the agricultural machine 1 by manual operation. FIG. 15 illustrates an example of the state of the working device 2 and the state of the agricultural field after the automatic operation of the agricultural machine 1 is completed.

In the case of a known agricultural machine 1, when the agricultural machine 1 automatically operates and the working device 2 (such as a tiller 2A) performs a first agricultural job including leveling an agricultural field (such as a tillage job), if the automatic operation of the agricultural machine 1 is discontinued before the working device 2 reaches the goal point Pg of the travel route L1, the working device 2 is raised by the lifting device 8 and placed in the non-work position P2 in which the working device 2 is spaced from the soil K2 in the agricultural field (see FIG. 13A). Therefore, when the user thereafter manually operates the agricultural machine 1 to perform the agricultural job on an unworked area J1 which is included in the agricultural field and in which the automatic operation was to be performed (which is located ahead (forward) of the stop location Pm at which the working device 2 stopped when the automatic operation was discontinued), the user needs to lower the working device 2 using the lifting device 8 to place it in the work position P1, making it impossible to immediately resume the agricultural job with the working device 2 by manually operating the agricultural machine 1.

In the case where the agricultural machine 1 is manually operated and the working device 2 resumes the agricultural job after the working device 2 (such as the tiller 2A) is separated from the soil K2 in the agricultural field and then brought into contact with the soil K2 by the lifting device 8, the contact/separation of the working device 2 with/from the soil K2 leaves a mark V1 (a dent in the example in FIG. 13B), resulting in poor quality of the finished agricultural job (such as the tillage job). In order to make the mark V1 of the working device 2 disappear, the user needs to manually operate the agricultural machine 1 and the working device 2 to resume the agricultural job with the working device 2 while moving the agricultural machine 1 rearward from the stop location Pm to a worked area J2 (in which the agricultural job has been performed in automatic operation) and then moving the agricultural machine 1 toward the unworked area J1, resulting in an increase in the number of steps of the manual operation.

In contrast, in the preferred embodiment discussed with reference to FIGS. 12A and 12B, when the automatic operation of the agricultural machine 1 is discontinued before the working device 2 performing a first agricultural job including leveling the agricultural field (such as a tillage job) reaches the goal point Pg, as illustrated in FIG. 14A, the lifting device 8 keeps the working device 2 in the work position P1 (S13 in FIG. 12B).

Therefore, when the user thereafter manually operates the agricultural machine 1 to cause the working device 2 to perform the agricultural job on the unworked area J1 of the agricultural field that is located ahead (forward) of the stop location Pm at which the working device 2 stopped when the automatic operation was discontinued, it is possible to immediately resume the agricultural job without having to raise or lower the working device 2 with the lifting device 8. Furthermore, because the lifting device 8 keeps the working device 2 in a state in which the working device 2 contacts the soil K2 in the agricultural field (see FIG. 19B), even if the agricultural machine 1 is manually operated and the working device 2 resumes the agricultural job, the mark V1 which would otherwise result from the contact/separation of the working device 2 with/to the soil K2 is not left on the soil K2, causing little or no reduction in quality of the finished agricultural job (such as the tillage job). Furthermore, it is not necessary to manually operate the agricultural machine 1 and the working device 2 to travel rearward from the stop location Pm to the worked area J2, causing little or no increase in the number of steps of the manual operation.

When the working device 2 performing a first agricultural job (such as a tillage job) reaches the goal point Pg and the automatic operation of the agricultural machine 1 is completed, as illustrated in, for example, FIG. 15, the lifting device 8 raises the working device 2 to place the working device 2 in the non-work position P2, because there is a non-work area J0 (in which the agricultural job is not to be performed) located ahead (forward) of the stop location instead of the unworked area J1 in which the automatic operation was to be performed (S17 in FIG. 12B). Therefore, the user thereafter can manually operate the agricultural machine 1 to stably move the agricultural machine 1 and the working device 2 to an intended place without having to perform an operation to raise the working device 2.

The foregoing preferred embodiments provide examples in which, when the agricultural machine 1 and the working device 2 reach the goal point Pg of the travel route L1 and the automatic operation of the agricultural machine 1 is completed (ended entirely), the travel of the agricultural machine 1 and the agricultural job performed by the working device 2 are stopped (S16 in FIG. 12B) and the lifting device 8 raises the working device 2 to place the working device 2 in the non-work position P2 (S17). However, also when the automatic operation of the agricultural machine 1 is completed, the working device 2 may be placed in the work position or the non-work position depending on, for example, the category of the agricultural job that was being performed before the automatic operation was completed or the stop location at which the agricultural machine 1 and the like stopped.

Figure 16A:
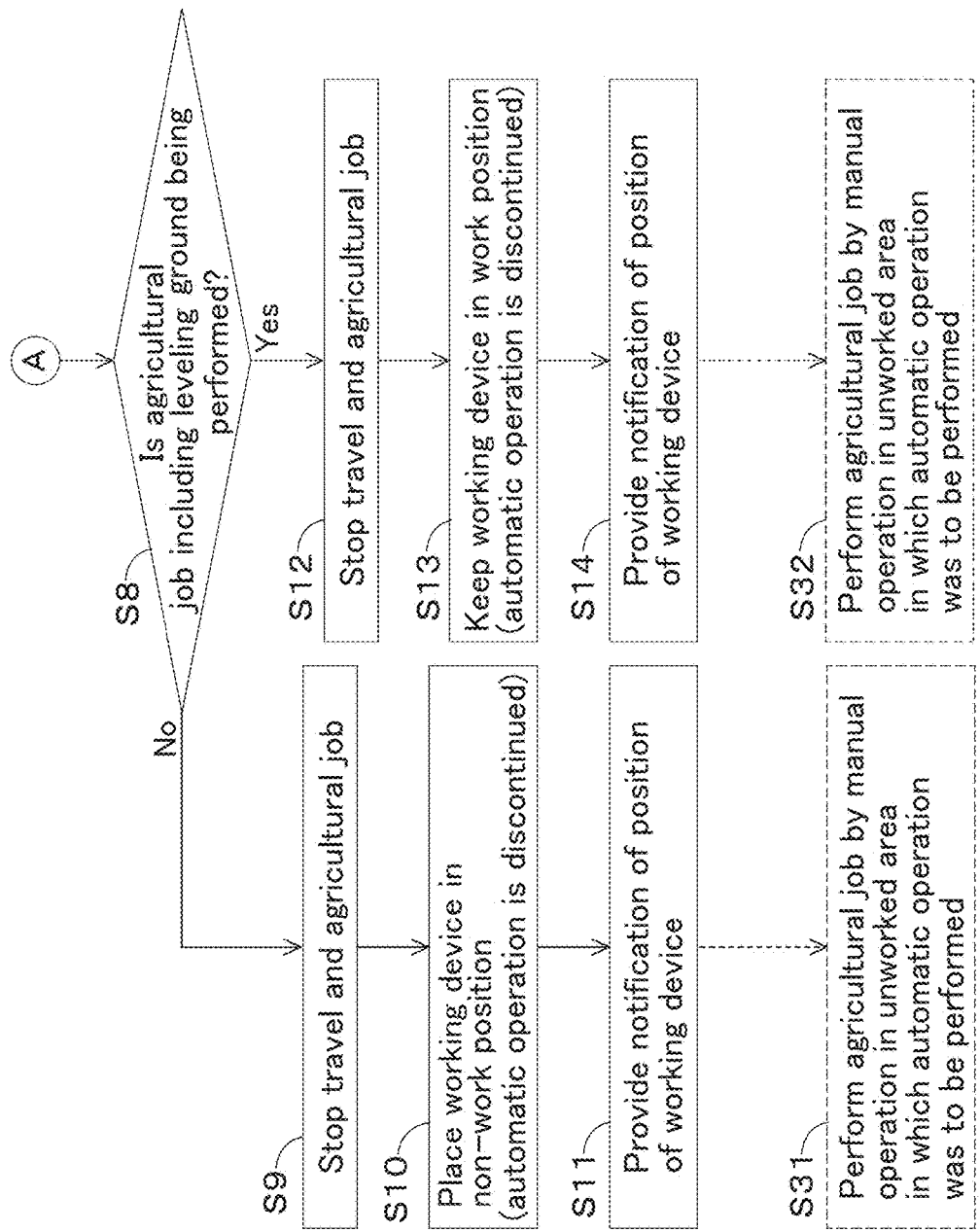
FIG. 16A is a flowchart showing another example of the operation of the agricultural machine
Figure 16B:
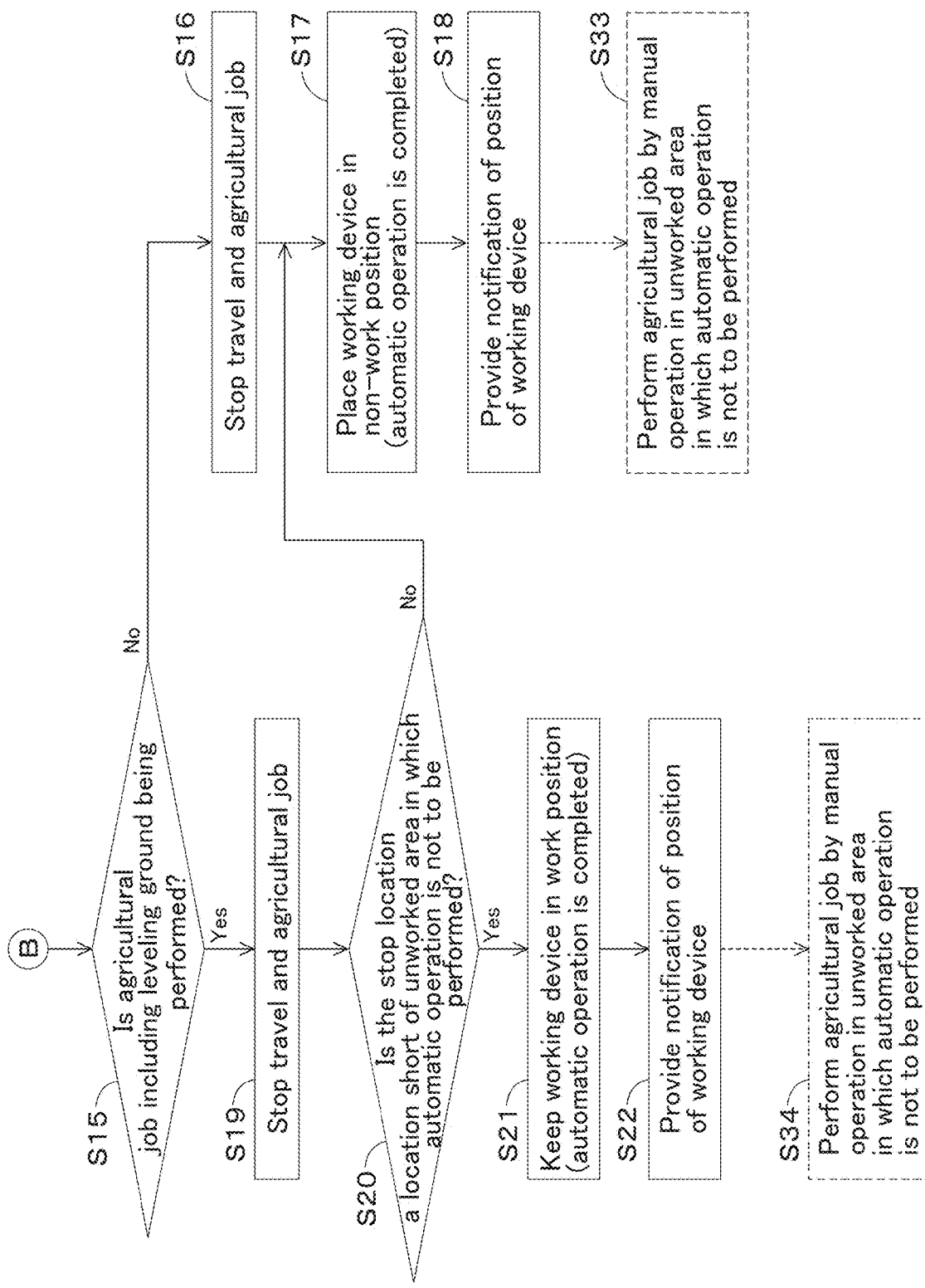
FIG. 16B is a flowchart showing another example of the operation of the agricultural machine.

FIGS. 16A and 16B are flowcharts showing another example of the operation of the agricultural machine 1. Specifically, FIGS. 16A and 16B are flowcharts continuing from the foregoing FIG. 12A. In FIG. 12A, when the agricultural machine 1 and the working device 2 reach the goal point Pg (YES in S7), the automatic operation controller 61 checks the agricultural job which is being performed. It is noted here that, if an agricultural job not including leveling the agricultural filed (second agricultural job) is being performed (NO in S15 in FIG. 16B), the automatic operation controller 61 stops the travel of the agricultural machine 1 and the agricultural job performed by the working device 2 (S16). Next, the automatic operation controller 61 causes the lifting device 8 to place the working device 2 in the non-work position P3 or P4 (S17), and the automatic operation of the agricultural machine 1 is completed (ended entirely). The automatic operation controller 61 causes the notifier 51g and the display operation interface 52 to provide a notification indicating that the working device 2 is in the non-work position P3 or P4 (S18 in FIG. 12B). In so doing, as illustrated in, for example, FIG. 10C, the notifier 51g causes the display operation interface 52 to display, on the "travel control" screen D8, a notification U2 indicating that the working device 2 is in the non-work position P3 or P4.

Thus, the automatic operation of the agricultural machine 1 is completed with the working device 2 (which is a second working device such as the spreader 2B or the stubble cultivator 2C having performed a second agricultural job not including leveling the agricultural field such as a spreading job or a stubble cultivation job) in the non-work position P3 or P4. It is noted here that the location at which the agricultural machine 1 (traveling vehicle body 3) or the working device 2 has stopped is a location short of an unworked area (headland E2b in the example in FIG. 9B) which is included in the agricultural field and in which the automatic operation is not to be performed. Therefore, when the user thereafter performs the agricultural job on the unworked area (headland E2b or E2c) which is included in the agricultural field and in which the automatic operation is not to be performed, it is necessary that the user first operate the manual operator 62 (FIG. 1) to cause the lifting device 8 to place the working device 2 in the work position P3 or P5 or the automatic operation controller 61 first automatically cause the lifting device 8 to place the working device 2 in the work position P3 or P5. After the working device 2 is placed in the work position P3 or P5, the user manually operates the agricultural machine 1 using the manual operator 62 to cause the agricultural machine 1 to travel and cause the working device 2 to perform the agricultural job on the unworked area (headland E2b or E2c) which is included in the agricultural field and in which the automatic operation is not to be performed (S33).

When the agricultural machine 1 and the working device 2 reach the goal point Pg (YES in S7 in FIG. 12A), if an agricultural job including leveling the agricultural filed (first agricultural job such as a tillage job) is being performed (YES in S15 in FIG. 16B), the automatic operation controller 61 stops the travel of the agricultural machine 1 and the agricultural job performed by the working device 2 (S19). In such a case, if the agricultural machine 1 and the working device 2 are not stopped at a location short of the unworked area (headland E2b or E2c) which is included in the agricultural field and in which the automatic operation is not to be performed (for example, when the agricultural machine 1 and the working device 2 are stopped outside the outline H1 of the agricultural field) (NO in S20), the automatic operation controller 61 causes the lifting device 8 to place the working device 2 in the non-work position P2 (S17), and the automatic operation of the agricultural machine 1 is completed. The automatic operation controller 61 causes the notifier 51g to provide a notification indicating that the working device 2 is in the non-work position P2 (S18). In so doing, as illustrated in, for example, FIG. 10C, the notifier 51g causes the display operation interface 52 to display, on the "travel control" screen D8, a notification U2 indicating that the working device 2 is in the non-work position P2.

Thus, the automatic operation of the agricultural machine 1 is completed at a location other than locations short of the unworked area in which the automatic operation is not to be performed, with the working device 2 (which is a first working device such as a tiller having performed a first agricultural job including leveling the agricultural field such as a tillage job) in the non-work position P2. In such a case, because the unworked area does not exist anymore in the agricultural field, the user thereafter does not perform manual operation of the agricultural machine 1, and the agricultural job is not resumed in the same agricultural field (S33 in FIG. 16B is not performed).

If the agricultural machine 1 and the working device 2 are stopped at a location short of the unworked area (headland E2b or E2c) which is included in the agricultural field and in which the automatic operation is not to be performed (YES in S20) when the travel of the agricultural machine 1 and the agricultural job performed by the working device 2 are stopped (S19), the automatic operation controller 61 causes the lifting device 8 to keep the working device 2 in the work position P1 (S21), and the automatic operation of the agricultural machine 1 is completed. The automatic operation controller 61 causes the notifier 51g to provide a notification indicating that the working device 2 is in the work position P1 (S22). In so doing, for example, as illustrated in FIG. 10B, the notifier 51g causes the display operation interface 52 to display, on the "travel control" screen D8, a notification U1 indicating that the working device 2 is in the work position P1.

Thus, the automatic operation of the agricultural machine 1 is completed at a location short of the unworked area, with the working device 2 (which is a first working device such as a tiller having performed a first agricultural job including leveling the agricultural field such as a tillage job) in the work position P1. In such a case, when the user thereafter performs the agricultural job on the unworked area (headland E2b or E2c) which is included in the agricultural field and in which the automatic operation is not to be performed, the user manually operates the agricultural machine 1 immediately using the manual operator 62 to cause the agricultural machine 1 to travel and cause the working device 2 to perform the agricultural job on the unworked area in which the automatic operation is not to be performed (S34). That is, the user manually operates the agricultural machine 1 to cause the working device 2 to perform the agricultural job on the unworked area (headland E2b or E2c) which is included in the agricultural field and in which the automatic operation is not to be performed, without raising or lowering the working device 2 with the lifting device 8.

With this, the lifting device 8 keeps the working device 2 in the work position P1 even when the working device 2 which performs a first agricultural job (such as a tillage job) reaches the goal point Pg and the automatic operation of the agricultural machine 1 is completed (S21 in FIG. 16B). Therefore, when the user thereafter manually operates the agricultural machine 1 to cause the working device 2 to perform the agricultural job on the unworked area (headland E2b or E2c) which is included in the agricultural field and in which the automatic operation is not to be performed (which is located ahead (forward) of the stop location at which the working device 2 stopped when the automatic operation was completed), it is possible to immediately resume the agricultural job without having to raise or lower the working device 2 with the lifting device 8. Furthermore, the mark V1 which would otherwise result from the contact/separation of the working device 2 with/from the soil K2 is not left on the soil K2, there is little or no reduction in quality of the finished agricultural job (such as a tillage job), and there is little or no increase in the number of steps of the manual operation.

If a non-work area in which the agricultural job is not to be performed is present ahead (forward) of the stop location instead of the unworked area in which the automatic operation is not to be performed when the working device 2 performing a first agricultural job (such as a tillage job) reaches the goal point Pg and the automatic operation of the agricultural machine 1 is completed, the lifting device 8 raises the working device 2 to place the working device 2 in the non-work position P2 (S17 in FIG. 16B). Therefore, the user thereafter can manually operate the agricultural machine 1 and stably move the agricultural machine 1 and the working device 2 to an intended place without having to perform an operation to raise the working device 2.

The foregoing preferred embodiments provide examples in which, when the distance Dx to the end of the agricultural field detected by the detector 64 is equal to or less than the threshold Ds during the automatic operation of the agricultural machine 1 (YES in S6 in FIG. 12A), the travel of the agricultural machine 1 and the agricultural job performed by the working device 2 are stopped (S9 and S12 in FIG. 12B) and the lifting device 8 moves the working device 2 to the non-work position P3 or P4 (S10) or keeps the working device 2 in the work position P1 (S13) depending on whether the agricultural job includes leveling the agricultural field. However, when the agricultural machine 1 is traveling automatically based on a work route portion L1a or L1s of the travel route L1 other than the last work route portion L1s (the last straight route portion L1s with the goal point Pg at its end) in the headland area E1, the agricultural machine 1 does not approach ridges because there are the headlands E2b and E2c located outward of the work route portion L1a or L1s (located closer to the outline of the agricultural field than the work route portion L1a or L1s is to the outline). Therefore, the agricultural machine 1 may operate as shown in, for example, FIG. 17.

Figure 17:
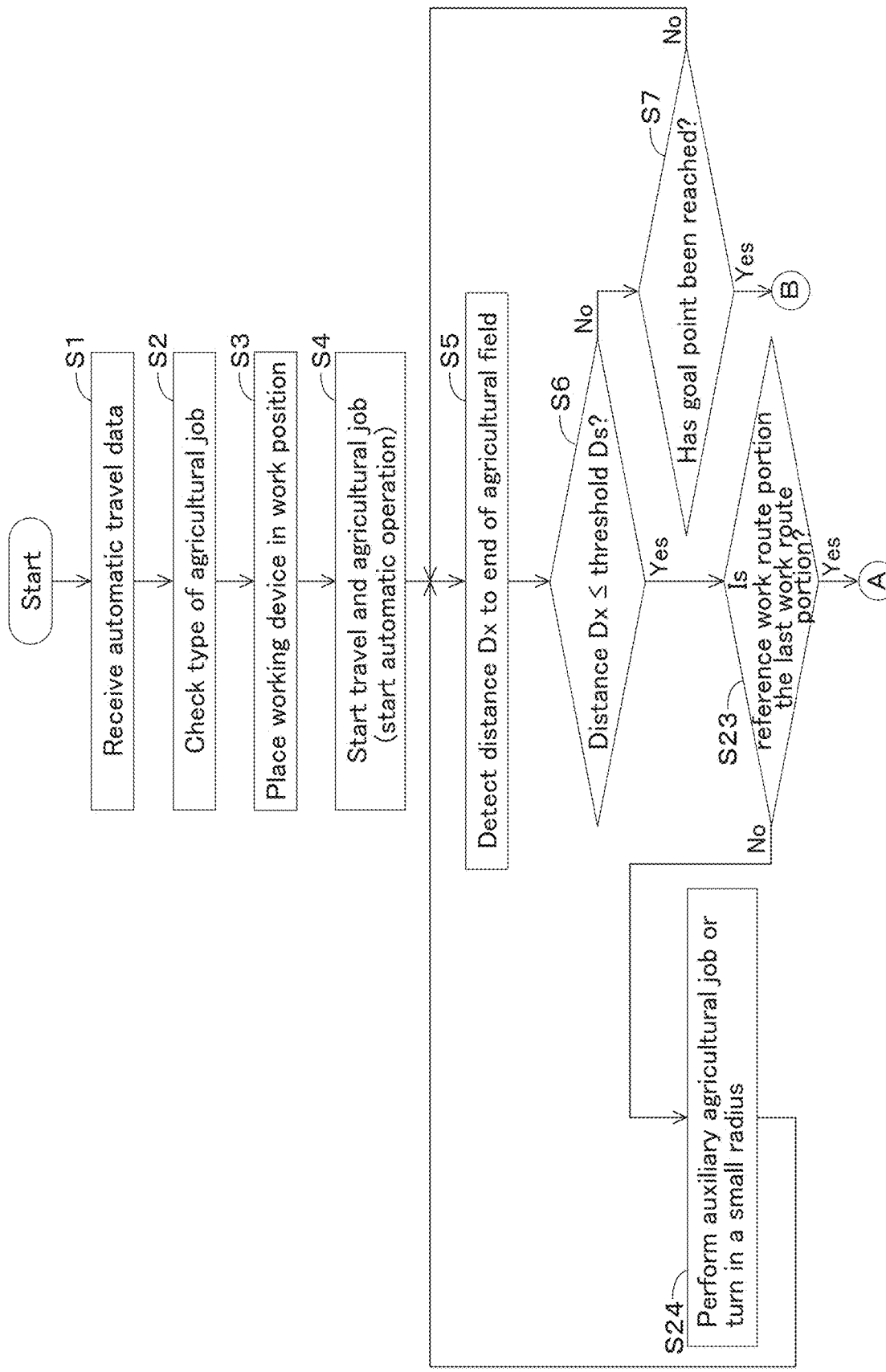
FIG. 17 is a flowchart showing a further example of the operation of the agricultural machine.

FIG. 17 is a flowchart showing a further example of the operation of the agricultural machine 1. In FIG. 17, after the automatic operation of the agricultural machine 1 is started (S4), when the distance Dx to the end of the agricultural field detected by the detector 64 is equal to or less than the threshold Ds (YES in S6), the automatic operation controller 61 may determine based on which work route portion the automatic operation controller 61 is performing automatic steering to cause the agricultural machine 1 (traveling vehicle body 3) to travel automatically. Next, if such a reference work route portion is the last work route portion L1s (the last straight route portion L1s created in the headland E2a) which is included in the travel route L1 and which is connected to the goal point Pg (YES in S23), the automatic operation controller 61 may determine whether or not the current agricultural job includes leveling the agricultural field in step S8 in FIG. 12B or 16A and, depending on whether or not the current agricultural job includes leveling the agricultural field, the automatic operation controller 61 may stop the travel of the agricultural machine 1 and the agricultural job performed by the working device 2 (S9, S12) and cause the lifting device 8 to move the working device 2 to the non-work position P3 or P4 (S10) or keep the working device 2 in the work position P1 (S13).

In the example in FIG. 17, if the reference work route portion for the automatic steering of the agricultural machine 1 is not the last work route portion L1s (NO in S23), the automatic operation controller 61 controls the travel and steering of the agricultural machine 1 in a predetermined manner different from the usual manner to cause the working device 2 to perform an auxiliary agricultural job or causes the agricultural machine 1 to turn (S24). After that, the automatic operation controller 61 repeats step S5 and subsequent steps.

Figure 18A:
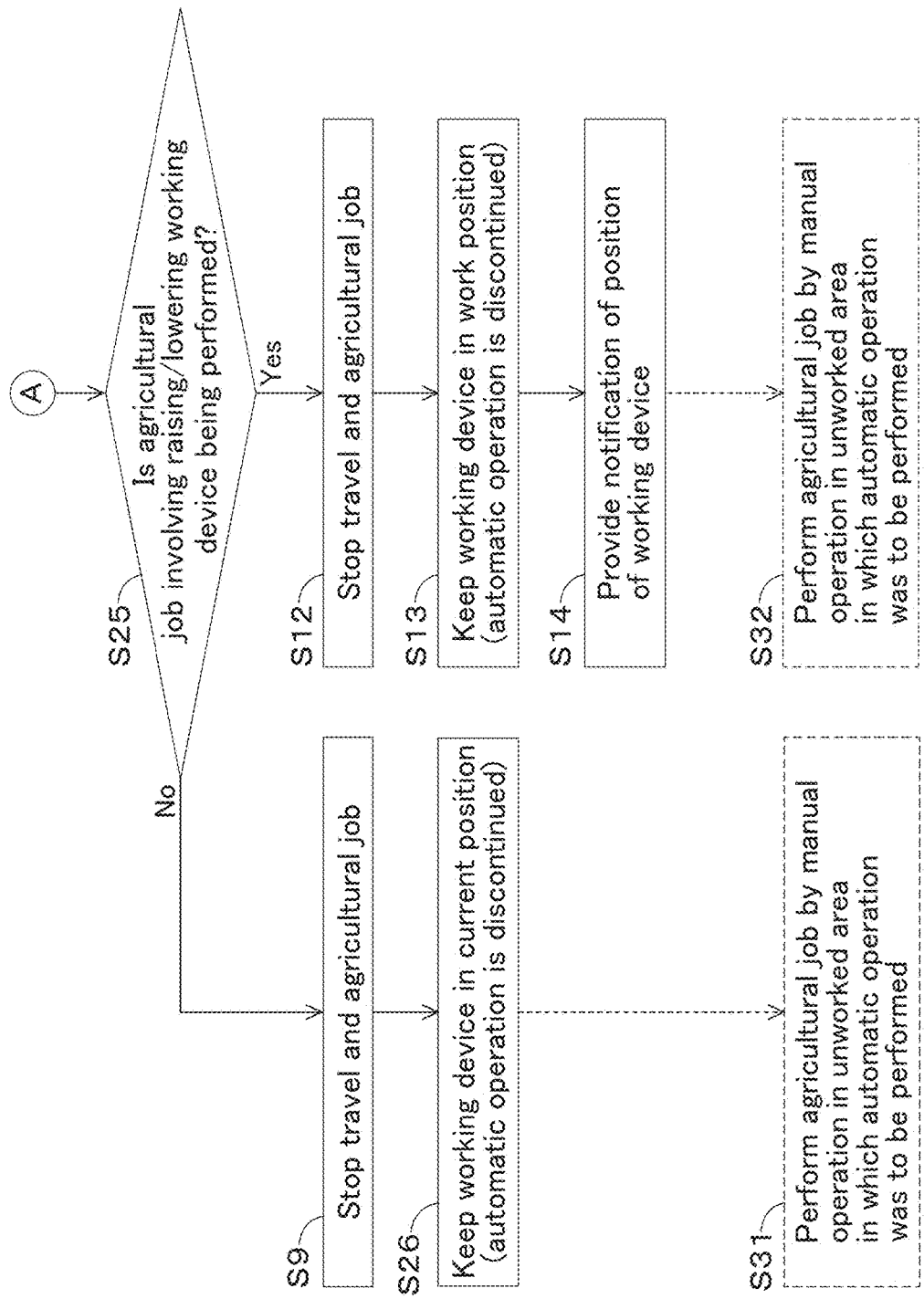
FIG. 18A is a flowchart showing a further example of the operation of the agricultural machine.
Figure 18B:
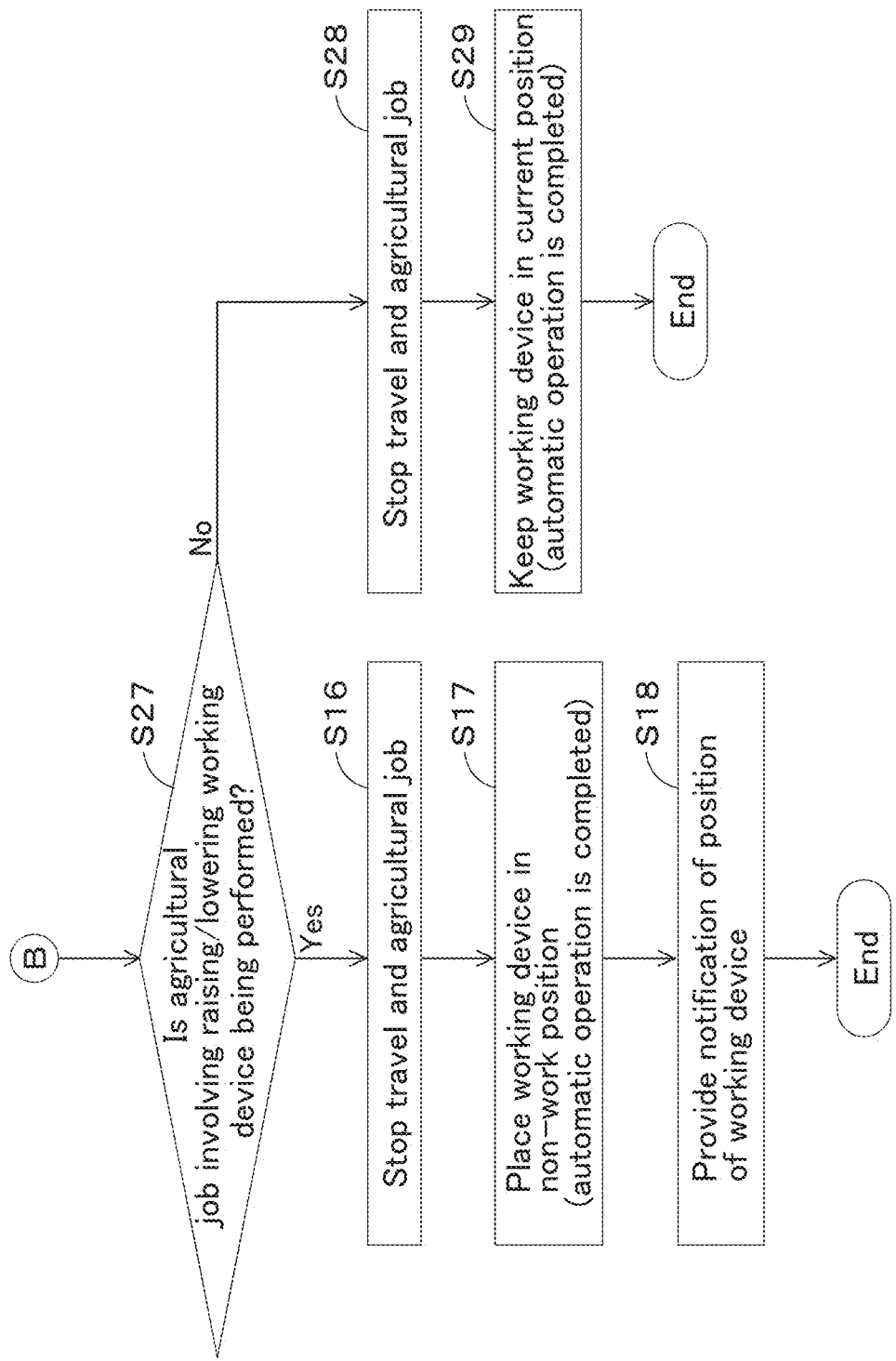
FIG. 18B is a flowchart showing a further example of the operation of the agricultural machine.

For example, as shown in FIGS. 18A and 18B, during the automatic operation of the agricultural machine 1, the working device 2 may be placed in the work position or the non-work position depending on whether or not an agricultural job involving raising and lowering of the working device 2 is being performed. FIGS. 18A and 18B are flowcharts showing still a further example of the operation of the agricultural machine 1. Specifically, FIGS. 18A and 18B are flowcharts continuing from the foregoing FIG. 12A or FIG. 17.

When the distance Dx to the end of the agricultural field is equal to or less than the threshold Ds (YES in S6) in FIG. 12A or when the reference work route portion for steering control of the agricultural machine 1 is the last work route portion L1s (YES in S23) in FIG. 17, the automatic operation controller 61 determines whether or not an agricultural job involving raising and lowering of the working device 2 is being performed. In such a case, if the agricultural job being performed is an agricultural job not involving raising or lowering of the working device 2 such as a spreading job (NO in S25), the automatic operation controller 61 stops the travel of the agricultural machine 1 and the agricultural job performed by the working device 2 (S9) and causes the lifting device 8 to keep the current position of the working device 2 (S26). Thus, the automatic operation of the agricultural machine 1 is discontinued (terminated). In such a case, because the working device 2 is, for example, the spreader 2B (FIG. 20) having the work position and the non-work position which are the same position P3, the working device 2 is kept in the current position P3. After that, the automatic operation controller 61 may cause the notifier 51g to provide a notification indicating that the working device 2 is in the position P3 as the work position and the non-work position. Alternatively, the automatic operation controller 61 may not provide the notification.

In contrast, when the agricultural job being performed is an agricultural job involving raising and lowering of the working device 2 such as a tillage job (YES in S25), the automatic operation controller 61 stops the travel of the agricultural machine 1 and the agricultural job performed by the working device 2 (S12) and causes the lifting device 8 to keep the working device 2 in the work position P1 (S13). Thus, the automatic operation of the agricultural machine 1 is discontinued. The automatic operation controller 61 causes the notifier 51g to provide a notification indicating that the working device 2 is in the work position P1 (S14).

In FIGS. 12A and 17, also when the agricultural machine 1 and the working device 2 reach the goal point Pg (YES in S7) before the distance Dx to the end of the agricultural field becomes equal to or less than the threshold Ds (NO in S6), the automatic operation controller 61 determines whether or not an agricultural job involving raising and lowering of the working device 2 is being performed. It is noted here that if an agricultural job involving raising and lowering of the working device 2 such as a tillage job is being performed (YES in S27 in FIG. 18B), the automatic operation controller 61 stops the travel of the agricultural machine 1 and the agricultural job performed by the working device 2 (S16). In such a case, because the unworked area in which the automatic operation was to be performed does not exist anymore in the agricultural field, the automatic operation controller 61 causes the lifting device 8 to place the working device 2 in the non-work position P2, P3, or P4 (S17). Thus, the automatic operation of the agricultural machine 1 is completed (ended entirely). The automatic operation controller 61 causes the notifier 51g and the display operation interface 52 to provide a notification indicating that the working device 2 is in the non-work position P2, P3, or P4 (S18).

On the contrary, if an agricultural job not involving raising or lowering of the working device 2 such as a spreading job is being performed (NO in S27), the automatic operation controller 61 stops the travel of the agricultural machine 1 and the agricultural job performed by the working device 2 (S28) and causes the lifting device 8 to keep the working device 2 in the current position (S29). Thus, the automatic operation of the agricultural machine 1 is completed (ended entirely). That is, because the working device 2 is, for example, the spreader 2B, the working device 2 is kept in the position P3 as the work position and the non-work position. After that, the automatic operation controller 61 may cause the notifier 51g to provide a notification indicating that the working device 2 is in the position P3 as the work position and the non-work position. Alternatively, the automatic operation controller 61 may not provide the notification. Furthermore, because the unworked area in which the automatic operation was to be performed does not exist anymore in the agricultural field, the agricultural job on the agricultural field is ended. Alternatively, if an unworked area (headland(s) E2b and/or E2c) in which the automatic operation is not to be performed is present in the agricultural field, the user may manually operate the agricultural machine 1 and the working device 2 to perform the agricultural job on the unworked area in which the automatic operation is not to be performed.

Whether to perform a series of the steps in each of FIGS. 12A to 18B may be selected by the user depending on, for example, an intended quality of the finished agricultural job in the agricultural field, content (category) of the agricultural job, and/or specifications (type) of the working device 2. The manual operator 62 of the agricultural machine 1 and/or the display screen of the display operation interface 52 of the agricultural assistance apparatus 50 may include operation key(s) such as switch(es) and/or button(s) for the selection.

FIGS. 19A to 21B show examples of the work positions P1, P3, and P5 and the non-work positions P2, P3, and P4 of the working devices 2. Note, however, that the work position and the non-work position of the working device 2 are not limited to such examples. For example, the working device 2 may have one or more work positions and one or more non-work positions depending on the category of the working device 2, specifications of the working device 2, the category of the agricultural job, and/or the like. The notification of the position of the working device 2 may be displayed on the screen of the display operation interface 52 when, for example, automatic operation of the agricultural machine 1 is started, is being performed, and/or is ended, and/or when the position of the working device 2 is changed.

The agricultural machine 1 and the agricultural assistance system 100 of preferred embodiments as discussed above include the following feature(s) and achieve the following effect(s).

An agricultural machine 1 according to one or more preferred embodiments includes a traveling vehicle body 3 to travel, a position detector 40 to detect a position of the traveling vehicle body 3, a lifting device 8 to link a working device 2 to the traveling vehicle body 3 and to raise and lower the working device 2, and an automatic operation controller 61 to perform an automatic operation to cause the traveling vehicle body 3 to travel and cause the working device 2 to perform an agricultural job on an agricultural field based on a prepared travel route L1 and the position of the traveling vehicle body 3 detected by the position detector 40, wherein the lifting device 8 is operable to, during the automatic operation, place the working device 2 in a heightwise work position P1 in which the working device 2 performs the agricultural job, and the automatic operation controller 61 is configured or programmed to cause the lifting device 8 to keep the working device 2 in the work position P1 even after stopping the traveling vehicle body 3 and/or the working device 2 to end the automatic operation at a location short of an unworked area J1 of the agricultural field.

An agricultural assistance system 100 according to one or more preferred embodiments includes a position detector 40 to detect a position of an agricultural machine 1, a lifting device 8 to link a working device 2 to the agricultural machine 1 and to raise and lower the working device 2, and an automatic operation controller 61 to perform an automatic operation to cause the agricultural machine 1 to travel and cause the working device 2 to perform an agricultural job on an agricultural field based on a prepared travel route L1 and the position of the agricultural machine 1 detected by the position detector 40, wherein the lifting device 8 is operable to, during the automatic operation, place the working device 2 in a heightwise work position P1 in which the working device 2 performs the agricultural job, and the automatic operation controller 61 is configured or programmed to cause the lifting device 8 to keep the working device 2 in the work position P1 even after stopping the agricultural machine 1 and/or the working device 2 to end the automatic operation at a location short of an unworked area J1 of the agricultural field.

With the above configuration, when the automatic operation of the agricultural machine 1 is ended, if an unworked area (an unworked area J1 which is included in the agricultural filed and in which automatic operation was to be performed or an unworked area in which automatic operation is not to be performed) is present forward of the agricultural machine 1 or the working device 2, the working device 2 is kept in the work position P1. Therefore, when the user thereafter manually operates the agricultural machine 1 to cause the working device 2 to perform the agricultural job on the unworked area, it is possible to immediately resume the agricultural job without having to raise or lower the working device 2 with the lifting device 8. Furthermore, the working device 2 is not separated from and then brought into contact with the soil K in the agricultural field by the lifting device 8 during a period from when the automatic operation of the agricultural machine 1 is ended to when the manual operation is started, and therefore a mark V1 which would otherwise result from the separation/contact of the working device 2 from/with the soil K is not left on the soil K, causing little or no reduction in quality of the finished agricultural job. Furthermore, it is not necessary to manually operate the agricultural machine 1 and the working device 2 to travel rearward from the stop location Pm of the automatic operation to a worked area J2 to make the mark V1 disappear, causing little or no increase in the number of steps of the manual operation. This makes it possible, when the agricultural machine 1 operates automatically and the working device 2 performs an agricultural job on an agricultural field and then the agricultural machine 1 is manually operated and the working device 2 performs the agricultural job, to improve the efficiency of the agricultural job.

In one or more preferred embodiments, the automatic operation controller 61 may be configured or programmed to cause the lifting device 8 to keep the working device 2 in the work position P1 even after stopping travel of the traveling vehicle body 3 during the automatic operation to discontinue the automatic operation before the traveling vehicle body 3 and the working device 2 reach an end point Pg of the travel route L1. With this, when the automatic operation of the agricultural machine 1 is discontinued (terminated), the working device 2 is kept in the work position P1, and therefore, when the user thereafter manually operates the agricultural machine 1 to cause the working device 2 to perform the agricultural job on the unworked area J1, it is possible to immediately resume the agricultural job, making it possible to improve work efficiency.

In one or more preferred embodiments, the travel route L1 may include work route portions L1a, L1s on which the working device 2 performs the agricultural job during the travel of the traveling vehicle body 3. The automatic operation controller 61 may be configured or programmed to, if a reference work route portion based on which the traveling vehicle body 3 was traveling before the automatic operation was discontinued is the last one L1s of the work route portions L1a, L1s of the travel route L1, cause the lifting device 8 to keep the working device 2 in the work position P1 even after discontinuing the automatic operation. With this, when the automatic operation of the agricultural machine 1 is discontinued at a location short of the goal point Pg at which the automatic operation based on the travel route L1 is to be completed, the working device 2 is kept in the work position P1, and therefore, when the user thereafter manually operates the agricultural machine 1 to cause the working device 2 to perform the agricultural job on the unworked area J1, it is possible to immediately resume the agricultural job, making it possible to improve work efficiency.

In one or more preferred embodiments, the agricultural machine 1 and the agricultural assistance system 100 may each further include a detector 64 to detect a distance Dx from the traveling vehicle body 3 (agricultural machine 1) to an end of the agricultural field in a direction of travel of the traveling vehicle body 3. The automatic operation controller 61 may be configured or programmed to stop travel of the traveling vehicle body 3 (agricultural machine 1) to discontinue the automatic operation when the distance Dx detected by the detector 64 during the automatic operation is equal to or less than a predetermined threshold Ds. This makes it possible to eliminate or reduce the likelihood that the agricultural machine 1 or the working device 2 will go beyond the boundary of the agricultural field during the automatic operation of the agricultural machine 1. Furthermore, with regard to an unworked area J1 resulting from the discontinuation of the automatic operation, the user can thereafter manually operate the agricultural machine 1 and immediately start the agricultural job, making it possible to improve work efficiency.

In one or more preferred embodiments, the automatic operation controller 61 may be configured or programmed to cause the lifting device 8 to keep the working device 2 in the work position P1 from when the automatic operation is ended to when travel of the traveling vehicle body 3 and the agricultural job performed by the working device 2 are resumed by manual operation. This makes it possible to prevent the working device 2 from being raised and lowered by the lifting device 8 and separated from and then brought into contact with the soil K2 in the agricultural field during a period from when the automatic operation of the agricultural machine 1 is completed to when the manual operation is started, making it possible to achieve good quality of the finished agricultural job.

In one or more preferred embodiments, the automatic operation controller 61 may be configured or programmed to, if the agricultural job that was being performed before the automatic operation was ended is a first agricultural job including leveling the agricultural field, cause the lifting device 8 to keep the working device 2 in the work position P1 even after ending the automatic operation, and if the agricultural job that was being performed before the automatic operation was ended is a second agricultural job not including leveling the agricultural field, cause the lifting device 8 to place the working device 2 in a non-work position P3, P4 in which the working device 2 does not perform the second agricultural job upon ending of the automatic operation.

With this, when the agricultural machine 1 automatically operates and the working device 2 performs a first agricultural job including leveling the agricultural filed in the agricultural filed and then the agricultural machine 1 is manually operated and the working device 2 performs the agricultural job, it is not necessary to move the working device 2 using the lifting device 8, making it possible to improve the efficiency of the first agricultural job and achieve good quality of the finished first agricultural job. Furthermore, when the agricultural machine 1 automatically operates in the agricultural field and a second agricultural job not including leveling the agricultural field is ended, the working device 2 is placed in the non-work position P3, P4, making it unnecessary for the user to thereafter move the working device 2 to the non-work position P3, P4 using the lifting device 8. This makes it possible to manually operate the agricultural machine 1 immediately and to stably move the agricultural machine 1 and the working device 2 to any location such as a location at which the second agricultural job is performed next.

In one or more preferred embodiments, the automatic operation controller 61 may be configured or programmed to, if travel of the traveling vehicle body 3 in the automatic operation is stopped at a stop location Pm not short of the unworked area J1 of the agricultural field, cause the lifting device 8 to place the working device 2 in a non-work position P2 in which the working device 2 does not perform the agricultural job. With this, the user thereafter can manually operate the agricultural machine 1 immediately, and stably move the agricultural machine 1 and the working device 2 to any location such as a location at which an agricultural job is performed next.

In one or more preferred embodiments, the agricultural machine 1 and the agricultural assistance system 100 may each further include a notifier 51*g* to provide a notification of a heightwise position of the working device 2. This allows the user to easily recognize the position of the working device 2, and manually operate the agricultural machine 1 to cause the working device 2 to appropriately perform the agricultural job and to appropriately move the agricultural machine 1 and the working device 2.

In one or more preferred embodiments, the automatic operation controller 61 may be configured or programmed to, if the working device 2 is a first working device 2 to perform a first agricultural job including leveling the agricultural field, cause the lifting device 8 to lower the first working device 2 to place the first working device 2 in the work position P1 in which the first working device 2 contacts soil K2 in the agricultural field and performs the first agricultural job, and cause the lifting device 8 to raise the first working device 2 to place the first working device 2 in a non-work position P2 in which the first working device 2 is spaced from the soil K2 in the agricultural field and does not perform the first agricultural job.

With this, the working device 2 is maintained by the lifting device 8 in the work position P1 from when the automatic operation of the agricultural machine 1 for the first agricultural job including leveling the agricultural field is ended to when the manual operation of the agricultural machine 1 is started, and therefore, when the agricultural machine 1 is thereafter manually operated and the working device 2 resumes the first agricultural job, it is not necessary to lower the working device 2 using the lifting device 8, making it possible to immediately resume the agricultural job and improve work efficiency. Furthermore, the mark V1 which would otherwise result from the separation/contact of the working device 2 from/with the soil K2 by the raising/lowering of the working device 2 is not left on the soil K2, causing little or no reduction in quality of the finished first agricultural job. Furthermore, the agricultural machine 1 is manually operated after the first working device is raised by the lifting device 8 to the non-work position P2 in which the first working device is spaced from the soil K2, and therefore the agricultural machine 1 and the first working device can be moved stably.

In one or more preferred embodiments, if the working device 2 is a second working device 2 to perform a second agricultural job not including leveling the agricultural field, the second working device 2 may be placed by the lifting device 8 in the work position P3, P5 in which the second working device 2 contacts or is separated from soil K2 in the agricultural field and performs the second agricultural job, or the second working device 2 may be placed by the lifting device 8 in a non-work position P3, P4 in which the second working device 2 is spaced from the soil K2 in the agricultural field and does not perform the second agricultural job. With this, because the second working device is placed in the work position P3, P5 by the lifting device 8, it is possible to perform a second agricultural job not including leveling the agricultural field by automatically or manually operating the agricultural machine 1. Furthermore, because the second working device is placed in the non-work position P3, P4 by the lifting device 8, it is possible to stably move the agricultural machine 1 and the second working device by manually operating the agricultural machine 1.

In one or more preferred embodiments, the automatic operation controller 61 may be configured or programmed to, if the agricultural job involving raising and lowering of the working device 2 was being performed before the automatic operation was ended, cause the lifting device 8 to keep the working device 2 in the work position P1 even after ending the automatic operation, and if the agricultural job not involving raising or lowering of the working device 2 was being performed before the automatic operation was ended, cause the lifting device 8 to keep a heightwise position P3 of the working device 2 even after ending the automatic operation. With this, when an agricultural job involving raising and lowering the working device 2 is performed by the working device 2 by automatic operation of the agricultural machine 1 in the agricultural field and thereafter the agricultural job is performed by the working device 2 by manual operation of the agricultural machine 1, it is not necessary to move the working device 2 using the lifting device 8. This makes it possible to improve efficiency of the first agricultural job and achieve good quality of the finished first agricultural job. Also after the end of an agricultural job not involving raising or lowering the working device 2 performed by automatic operation of the agricultural machine 1 in the agricultural field, it is not necessary to move the working device 2 using the lifting device 8, and therefore the user thereafter can manually operate the agricultural machine 1 immediately and move the agricultural machine 1 and the working device 2 to a desired place.

In one or more preferred embodiments, the working device 2 may be one of working devices including a first working device 2 to perform a first agricultural job including leveling the agricultural field. The first agricultural job may be one of jobs including a tillage job. The first working device 2 may be one of devices including a tiller 2A. With this, the automatic operation controller 61 causes the lifting device 8 to keep the tiller 2A in the work position P1 when the automatic operation of the agricultural machine 1 is ended, and therefore the user thereafter can manually operate the agricultural machine 1 immediately and resume the tillage job using the tiller 2A, making it possible to improve work efficiency and achieve good quality of the finished tillage job.

In one or more preferred embodiments, the working device 2 may be one of working devices including a second working device 2 to perform a second agricultural job not including leveling the agricultural field. The second agricultural job may be one of jobs including a stubble cultivation job and a spreading job. The second working device 2 may be one of devices including a stubble cultivator 2C and a spreader 2B. In cases of a second agricultural job such as a stubble cultivation job, even if a second working device such as a stubble cultivator is separated from and then brought into contact with the soil K2 in the agricultural field leaving a mark on the soil K2, this would not affect the quality of the finished second agricultural job. In cases of a second agricultural job such as a spreading job, such a second agricultural job is performed by a second working device such as a spreader 2B spaced from the soil K2 in the agricultural field, and therefore the second working device does not leave a mark on the soil K2. Therefore, the automatic operation controller 61 causes the lifting device 8 to place the second working device in the non-work position P3, P4 when the automatic operation of the agricultural machine 1 is ended, thus making it possible for the user to thereafter manually operate the agricultural machine 1 to stably move the agricultural machine 1 to a desired placed immediately.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural machine comprising:
a traveling vehicle body to travel;
a position detector to detect a position of the traveling vehicle body using a satellite positioning system;
a lifting device to link a working device to the traveling vehicle body and to raise and lower the working device, the lifting device including a three-point linkage;
an automatic operation controller to perform an automatic operation to cause the traveling vehicle body to travel based on a prepared travel route and the position of the traveling vehicle body detected by the position detector and cause the working device, which is linked to the lifting device, to perform an agricultural job on an agricultural field; and
a detector to detect a distance from the traveling vehicle body to an end of the agricultural field in a direction of travel of the traveling vehicle body; wherein
the automatic operation controller is configured or programmed to, during the automatic operation:
cause the lifting device to place the working device in a heightwise work position in which the working device performs the agricultural job; and
when the distance detected by the detector is equal to or less than a predetermined threshold, stop travel of the traveling vehicle body to stop the working device at a location short of an unworked area of the agricultural field to discontinue the automatic operation and cause the lifting device to keep the working device in the work position without raising or lowering the working device, the unworked area being an area in which the agricultural job is to be performed by the automatic operation.

2. The agricultural machine according to claim 1, wherein the automatic operation controller is configured or programmed to cause the lifting device to keep the working device in the work position without raising or lowering the working device when, during the automatic operation, discontinuing the automatic operation before the working device reaches an end point of the travel route.

3. The agricultural machine according to claim 2, wherein the travel route includes work route portions on which the working device performs the agricultural job during the travel of the traveling vehicle body; and
the automatic operation controller is configured or programmed to, if a reference work route portion based on which the traveling vehicle body was traveling before the automatic operation was discontinued is the last one of the work route portions of the travel route, cause the lifting device to keep the working device in the work position without raising or lowering the working device when discontinuing the automatic operation.

4. The agricultural machine according to claim 1, wherein the automatic operation controller is configured or programmed to cause the lifting device to keep the working device in the work position without raising or lowering the working device, from when the automatic operation is discontinued to when travel of the traveling vehicle body and the agricultural job performed by the working device are resumed by manual operation.

5. The agricultural machine according to claim 1, further comprising:
an operation interface to receive input of information relating to the agricultural job performed by the working device, wherein
the automatic operation controller is configured or programmed to:
detect a category of the agricultural job based on the information inputted via the operation interface;
if the agricultural job that was being performed before the automatic operation was discontinued is a first agricultural job including leveling the agricultural field, cause the lifting device to keep the working device in the work position without raising or lowering the working device when discontinuing the automatic operation; and
if the agricultural job that was being performed before the automatic operation was discontinued is a second agricultural job not including leveling the agricultural field, cause the lifting device to place the working device in a non-work position in which the working device does not perform the second agricultural job upon discontinuing of the automatic operation.

6. The agricultural machine according to claim 1, wherein the automatic operation controller is configured or programmed to, if travel of the traveling vehicle body in the automatic operation is stopped at a stop location not short of the unworked area of the agricultural field, cause the lifting device to place the working device in a non-work position in which the working device does not perform the agricultural job.

7. The agricultural machine according to claim 1, further comprising:
a display; wherein
the automatic operation controller is configured or programmed to, after causing the lifting device to place the working device in the work position or in a non-work position in which the working device does not perform the agricultural job, cause the display to display information including a notification of whether the working device is in the work position or in the non-work position.

8. The agricultural machine according to claim 1, further comprising:
an operation interface to receive input of information relating to the working device; wherein
the automatic operation controller is configured or programmed to;
detect a category of the agricultural job and a category of the working device based on the information inputted via the operation interface; and
if the working device is a first working device to perform a first agricultural job including leveling the agricultural field:
cause the lifting device to lower the first working device to place the first working device in the work position in which the first working device contacts soil in the agricultural field and performs the first agricultural job; and
cause the lifting device to raise the first working device to place the first working device in a non-work position in which the first working device is spaced from the soil in the agricultural field and does not perform the first agricultural job.

9. The agricultural machine according to claim 8, wherein, if the working device is a second working device to perform a second agricultural job not including leveling the agricultural field:
the second working device is placed by the lifting device in the work position in which the second working device contacts or is separated from the soil in the agricultural field and performs the second agricultural job; or
the second working device is placed by the lifting device in a non-work position in which the second working device is spaced from the soil in the agricultural field and does not perform the second agricultural job.

10. The agricultural machine according to claim 1, further comprising:
an operation interface to receive input of information relating to the agricultural job performed by the working device; wherein
the automatic operation controller is configured or programmed to:
detect a category of the agricultural job based on the information inputted via the operation interface;

if the agricultural job involving raising and lowering of the working device was being performed before the automatic operation was discontinued, cause the lifting device to keep the working device in the work position without raising or lowering the working device when discontinuing the automatic operation; and
if the agricultural job not involving raising or lowering of the working device was being performed before the automatic operation was discontinued, cause the lifting device to keep a heightwise position of the working device when discontinuing the automatic operation.

11. An agricultural assistance system comprising:
a position detector to detect a position of an agricultural machine using a satellite positioning system;
a lifting device to link a working device to the agricultural machine and to raise and lower the working device, the lifting device including a three-point linkage; and
an automatic operation controller to perform an automatic operation to cause the agricultural machine to travel based on a prepared travel route and the position of the agricultural machine detected by the position detector and cause the working device, which is linked to the lifting device, to perform an agricultural job on an agricultural field; and
a detector to detect a distance from a traveling vehicle body to an end of the agricultural field in a direction of travel of the traveling vehicle body, the traveling vehicle body included in the agricultural machine to travel; wherein
the automatic operation controller is configured or programmed to, during the automatic operation;
cause the lifting device to place the working device in a heightwise work position in which the working device performs the agricultural job; and
when the distance detected by the detector is equal to or less than a predetermined threshold, stop travel of the traveling vehicle body to stop the working device at a location short of an unworked area of the agricultural field to discontinue the automatic operation and cause the lifting device to keep the working device in the work position without raising or lowering the working device, the unworked area being an area in which the agricultural job is to be Performed by the automatic operation.

12. The agricultural assistance system according to claim 11, further comprising:
a display; wherein
the automatic operation controller is configured or Programmed to, after causing the lifting device to place the working device in the work position or in a non-work position in which the working device does not perform the agricultural job, cause the display to display information including a notification of whether the working device is in the work position or in the non-work position.

13. The agricultural assistance system according to claim 11, wherein:
the working device is one of working devices including a first working device to perform a first agricultural job and a second working device to perform a second agricultural job, the first agricultural job including leveling the agricultural field, the second agricultural job not including leveling the agricultural field;
the first agricultural job is one of jobs including a tillage job;

the first working device is one of devices including a tiller;

the second agricultural job is one of jobs including a stubble cultivation job and a spreading job; and the second working device is one of devices including a stubble cultivator and a spreader.

14. The agricultural machine according to claim 3, wherein the automatic operation controller is configured or programmed to:

cause the traveling vehicle body to travel in the automatic operation based on the work route portions and based on the position of the traveling vehicle body, and cause the working device to perform the agricultural job in a central portion of the agricultural field and in one or more headlands located outward of the central portion and inward of an outline of the agricultural field; and if the reference work route portion is the last one of the work route portions based on which the agricultural job is performed in the one or more headlands, cause the lifting device to keep the working device in the work position without raising or lowering the working device when the automatic operation is discontinued.

* * * * *